US009065786B2

(12) United States Patent
Plotkin

(10) Patent No.: US 9,065,786 B2
(45) Date of Patent: Jun. 23, 2015

(54) CONTEXT-SENSITIVE AUTO-RESPONDER

(71) Applicant: Yagi Corp., Concord, MA (US)

(72) Inventor: Robert Plotkin, Concord, MA (US)

(73) Assignee: Yagi Corp., Barre, MA (US)

( * ) Notice: Subject to any disclaimer, the term of this patent is extended or adjusted under 35 U.S.C. 154(b) by 0 days.

(21) Appl. No.: 13/709,017

(22) Filed: Dec. 9, 2012

(65) Prior Publication Data
US 2013/0097269 A1 Apr. 18, 2013

Related U.S. Application Data

(63) Continuation-in-part of application No. 13/244,206, filed on Sep. 23, 2011, and a continuation-in-part of application No. 13/291,688, filed on Nov. 8, 2011, and a continuation-in-part of application No. 13/292,032, filed on Nov. 8, 2011, and a continuation-in-part of application No. 13/244,206.

(60) Provisional application No. 61/386,030, filed on Sep. 24, 2010, provisional application No. 61/411,068, filed on Nov. 8, 2010.

(51) Int. Cl.
H04L 12/58 (2006.01)
H04M 1/725 (2006.01)

(52) U.S. Cl.
CPC ........... *H04L 51/02* (2013.01); *H04M 1/72547* (2013.01); *H04M 1/72563* (2013.01); *H04M 1/72577* (2013.01); *H04L 51/043* (2013.01); *H04M 1/72597* (2013.01); *H04M 2250/12* (2013.01)

(58) Field of Classification Search
USPC ................................................. 709/223–226
See application file for complete search history.

(56) References Cited

U.S. PATENT DOCUMENTS

| 6,246,889 | B1 | 6/2001 | Boltz |
| 6,400,810 | B1 * | 6/2002 | Skladman et al. ......... 379/93.24 |
| 6,415,026 | B1 | 7/2002 | Flood |
| 6,442,589 | B1 * | 8/2002 | Takahashi et al. ............ 709/203 |
| 6,883,017 | B1 | 4/2005 | Ujigawa |
| 7,143,356 | B1 | 11/2006 | Shafrir |
| 7,231,232 | B2 * | 6/2007 | Osann, Jr. ..................... 455/567 |
| 7,263,545 | B2 | 8/2007 | Digate |
| 7,272,662 | B2 * | 9/2007 | Chesnais et al. .............. 709/246 |
| 7,475,109 | B1 * | 1/2009 | Fletcher et al. ............... 709/204 |

(Continued)

OTHER PUBLICATIONS

"How to Use the Out of Office Assistant in Outlook," Microsoft Office Help, Retrieved Dec. 9, 2012, 3 pages. Available at: http://support.microsoft.com/kb/290846.

(Continued)

*Primary Examiner* — Backhean Tiv
(74) *Attorney, Agent, or Firm* — Robert Plotkin, P.C.

(57) ABSTRACT

In response to detecting an incoming message (such as an email message, a text message, or a voice message) sent by a sender to a recipient, a computer system determines whether a current context of the recipient satisfies a condition. If the current context of the recipient satisfies the condition, then the system selects a response message based on the current context and sends the response message to the sender. The system's decision about whether to respond automatically to subsequent messages sent to the recipient may vary as the recipient's context changes. Furthermore, the system may select and send different response messages based on changes in the recipient's context.

34 Claims, 28 Drawing Sheets

(56) References Cited

U.S. PATENT DOCUMENTS

| Patent/Pub. No. | Date | Name | Class |
|---|---|---|---|
| 7,490,122 B2* | 2/2009 | Horvitz et al. | 709/200 |
| 7,568,001 B2 | 7/2009 | McPartlan | |
| 7,587,032 B1 | 9/2009 | deWaal | |
| 7,831,679 B2* | 11/2010 | Apacible et al. | 709/209 |
| 7,886,232 B2 | 2/2011 | Fish | |
| 7,945,612 B2 | 5/2011 | Raghav | |
| 8,032,601 B2* | 10/2011 | O'Donovan | 709/206 |
| 8,205,163 B2* | 6/2012 | Shaffer et al. | 715/764 |
| 8,296,370 B2* | 10/2012 | Adams et al. | 709/206 |
| 8,370,756 B2* | 2/2013 | Malik et al. | 715/752 |
| 8,375,034 B2* | 2/2013 | Norton et al. | 707/748 |
| 8,406,745 B1* | 3/2013 | Upadhyay et al. | 455/413 |
| 8,532,069 B2 | 9/2013 | Balwani | |
| 8,897,822 B2 | 11/2014 | Martin | |
| 2002/0002590 A1 | 1/2002 | King | |
| 2002/0087704 A1* | 7/2002 | Chesnais et al. | 709/228 |
| 2002/0090069 A1* | 7/2002 | Yaker | 379/88.17 |
| 2002/0194331 A1 | 12/2002 | Lewis | |
| 2003/0014491 A1* | 1/2003 | Horvitz et al. | 709/206 |
| 2003/0046421 A1 | 3/2003 | Horvitz | |
| 2003/0126216 A1 | 7/2003 | Avila | |
| 2003/0153364 A1 | 8/2003 | Osann | |
| 2004/0078795 A1 | 4/2004 | Alverson | |
| 2004/0146144 A1 | 7/2004 | Gao | |
| 2005/0021636 A1* | 1/2005 | Kumar | 709/206 |
| 2005/0047562 A1* | 3/2005 | Holz et al. | 379/88.22 |
| 2005/0198545 A1 | 9/2005 | Wieck | |
| 2005/0227740 A1 | 10/2005 | Orbach | |
| 2006/0010206 A1* | 1/2006 | Apacible et al. | 709/205 |
| 2006/0031326 A1* | 2/2006 | Ovenden | 709/206 |
| 2006/0036688 A1 | 2/2006 | McMahan | |
| 2006/0040643 A1 | 2/2006 | O'Connor | |
| 2006/0052061 A1* | 3/2006 | Klassen et al. | 455/67.11 |
| 2006/0069580 A1* | 3/2006 | Mason et al. | 705/1 |
| 2006/0168045 A1* | 7/2006 | Pickover | 709/206 |
| 2006/0168057 A1* | 7/2006 | Warren et al. | 709/206 |
| 2006/0189301 A1 | 8/2006 | VanderVeen | |
| 2006/0210034 A1 | 9/2006 | Beadle | |
| 2006/0211443 A1 | 9/2006 | Wegman | |
| 2006/0248183 A1 | 11/2006 | Barton | |
| 2007/0011367 A1 | 1/2007 | Scott | |
| 2007/0016867 A1 | 1/2007 | Nickell | |
| 2007/0117558 A1 | 5/2007 | Balwani | |
| 2007/0147596 A1* | 6/2007 | Moser | 379/207.02 |
| 2007/0179953 A1 | 8/2007 | Mahoney | |
| 2007/0207727 A1 | 9/2007 | Song | |
| 2007/0239869 A1 | 10/2007 | Raghav | |
| 2007/0263659 A1 | 11/2007 | Wang | |
| 2007/0294358 A1* | 12/2007 | Kelley et al. | 709/206 |
| 2008/0002820 A1* | 1/2008 | Shtiegman et al. | 379/211.02 |
| 2008/0040177 A1* | 2/2008 | Vuong et al. | 705/8 |
| 2008/0040485 A1 | 2/2008 | Glasgow | |
| 2008/0085687 A1 | 4/2008 | Brekke | |
| 2008/0104169 A1* | 5/2008 | Combel et al. | 709/204 |
| 2008/0104175 A1* | 5/2008 | Keohane et al. | 709/206 |
| 2008/0127204 A1* | 5/2008 | Dai et al. | 719/313 |
| 2008/0133302 A1* | 6/2008 | Brauninger et al. | 705/8 |
| 2008/0139119 A1 | 6/2008 | Behzad | |
| 2008/0139199 A1 | 6/2008 | Plestid | |
| 2008/0159522 A1 | 7/2008 | Ericson | |
| 2008/0184267 A1 | 7/2008 | Hochmuth | |
| 2008/0207263 A1 | 8/2008 | May | |
| 2008/0208984 A1* | 8/2008 | Rosenberg et al. | 709/206 |
| 2008/0227494 A1* | 9/2008 | Abramson et al. | 455/560 |
| 2008/0274694 A1 | 11/2008 | Castell | |
| 2008/0304634 A1 | 12/2008 | Gao | |
| 2009/0003542 A1* | 1/2009 | Ramanathan et al. | 379/88.13 |
| 2009/0036148 A1 | 2/2009 | Yach | |
| 2009/0077183 A1* | 3/2009 | Bruce et al. | 709/206 |
| 2009/0083742 A1 | 3/2009 | Ramanathan | |
| 2009/0089381 A1 | 4/2009 | Anderson | |
| 2009/0092234 A1* | 4/2009 | St. Onge et al. | 379/88.13 |
| 2009/0112996 A1 | 4/2009 | Baker | |
| 2009/0150500 A1* | 6/2009 | Kumar et al. | 709/206 |
| 2009/0170480 A1* | 7/2009 | Lee | 455/414.1 |
| 2009/0198783 A1* | 8/2009 | Bloomer et al. | 709/206 |
| 2009/0249247 A1* | 10/2009 | Tseng et al. | 715/808 |
| 2010/0157980 A1* | 6/2010 | Ellsworth et al. | 370/352 |
| 2010/0159995 A1 | 6/2010 | Stallings | |
| 2010/0174896 A1* | 7/2010 | Gupta | 713/100 |
| 2010/0227600 A1 | 9/2010 | VanderVeen | |
| 2010/0303220 A1 | 12/2010 | Brooks | |
| 2010/0316207 A1 | 12/2010 | Brunson | |
| 2011/0009107 A1 | 1/2011 | Guba | |
| 2011/0010218 A1* | 1/2011 | Gupta | 705/9 |
| 2011/0029616 A1* | 2/2011 | Wang et al. | 709/206 |
| 2011/0093542 A1 | 4/2011 | Lau | |
| 2011/0111735 A1* | 5/2011 | Pietrow | 455/414.1 |
| 2011/0117886 A1 | 5/2011 | Travis | |
| 2011/0153753 A1 | 6/2011 | Childress | |
| 2011/0173271 A1* | 7/2011 | De la Rosa et al. | 709/206 |
| 2011/0320960 A1* | 12/2011 | Cai et al. | 715/752 |
| 2012/0021717 A1 | 1/2012 | Schmidt | |
| 2012/0083260 A1 | 4/2012 | Arriola | |
| 2012/0117489 A1* | 5/2012 | Bank et al. | 715/753 |
| 2012/0297000 A1* | 11/2012 | DellaFera et al. | 709/206 |
| 2012/0315880 A1* | 12/2012 | Peitrow et al. | 455/412.1 |
| 2013/0005361 A1 | 1/2013 | Fish | |
| 2013/0007665 A1* | 1/2013 | Chaudhri et al. | 715/830 |
| 2013/0067000 A1 | 3/2013 | Brauninger | |
| 2013/0122878 A1 | 5/2013 | Selph | |

OTHER PUBLICATIONS

"Drive Back to School Safely with New Mobile App Designed to Curb Texting Behind the Wheel," Aug. 30, 2011, 2 pages, Retrieved Jan. 5, 2015. Available at: http://www.att.com/gen/press-room?pid=20882&cdvn=news&newsarticleid=32644&mapcode=.

"New "Safely Go" Safe Driving App by Verizon Wireless—STOP Texting & Driving," Sep. 20, 2012, 1 page, Retrieved Jan. 9, 2015. Available at: http://www.couponersunited.com/new-safely-go-safe-driving-app-by-verizon-wireless-stop-.

* cited by examiner

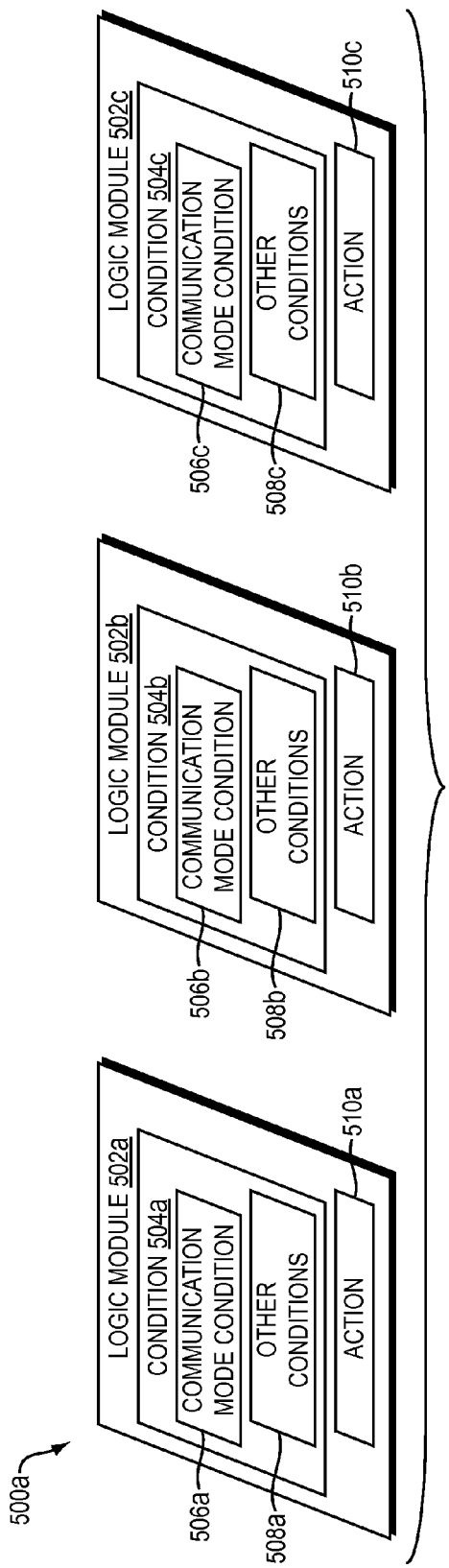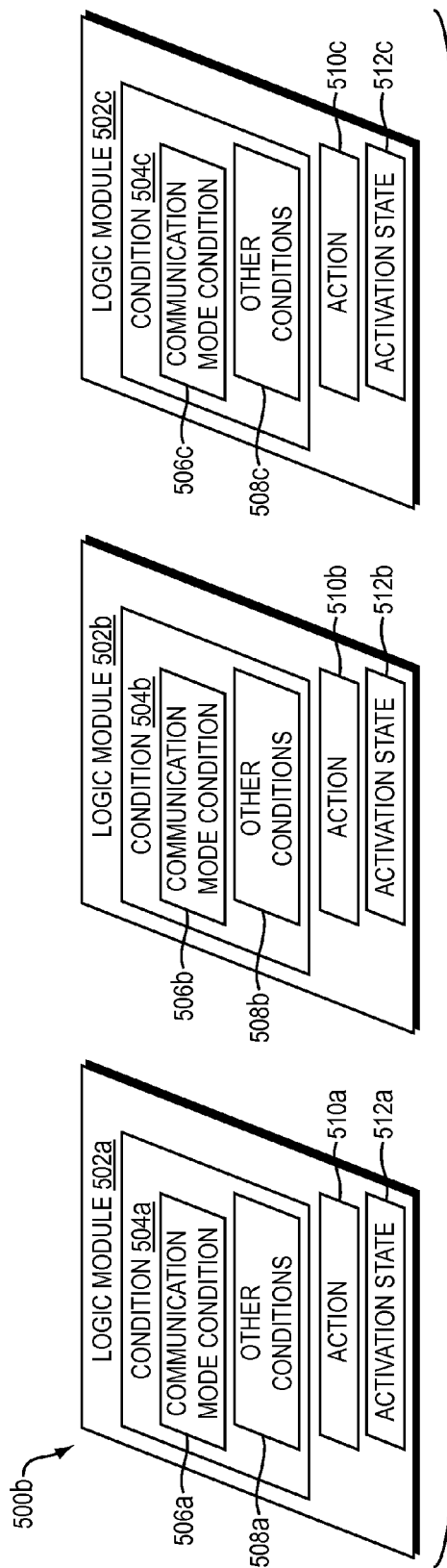

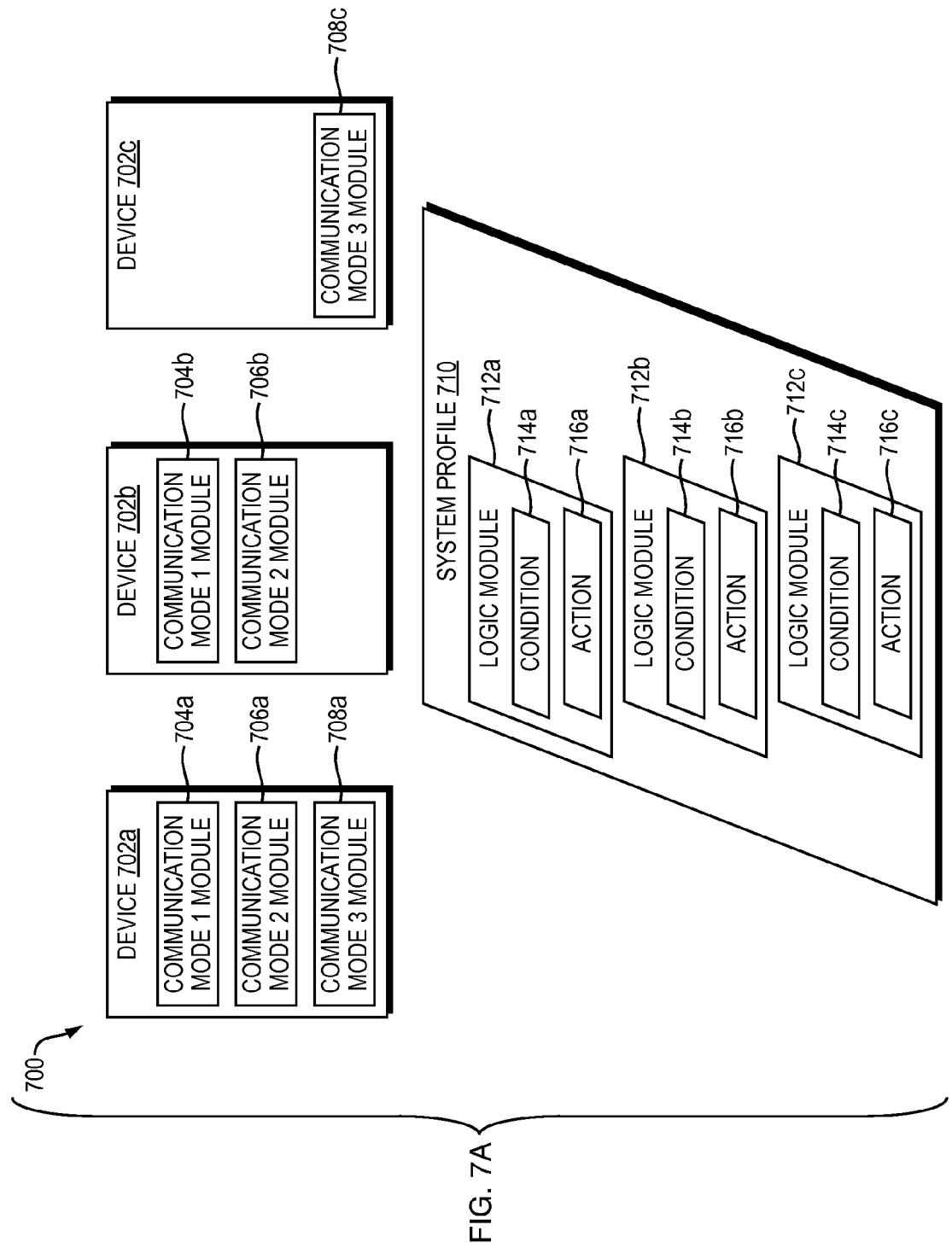

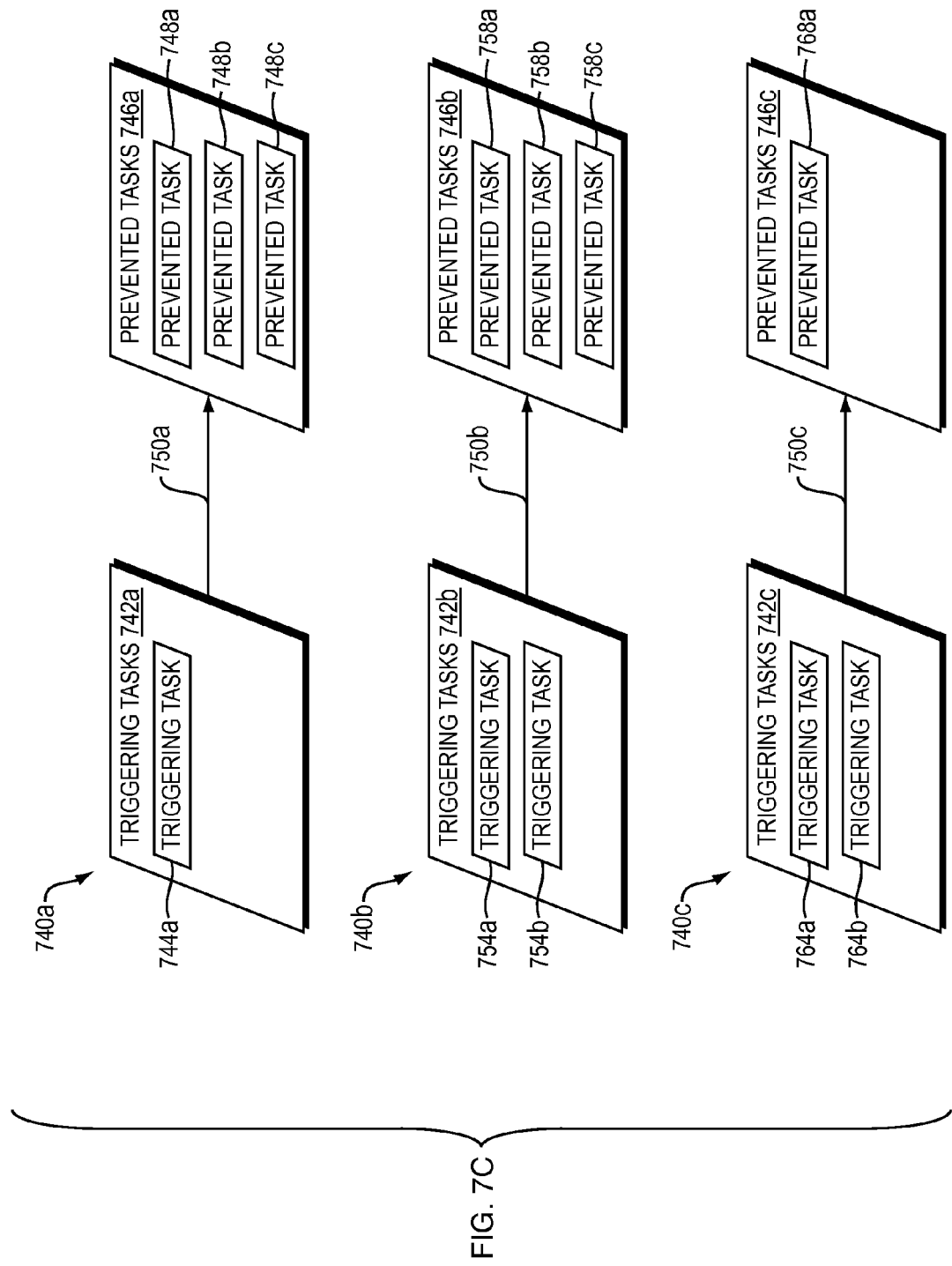

CONTEXT-SENSITIVE AUTO-RESPONDER

CROSS-REFERENCE TO RELATED APPLICATIONS

This application is a continuation-in-part of the following co-pending patent applications, all of which are incorporated by reference herein:

U.S. patent application Ser. No. 13/244,206, filed on Sep. 23, 2011, entitled, "Profile-Based Message Control"
U.S. patent application Ser. No. 13/291,688, filed on Nov. 8, 2011, entitled, "Time-Based Computer Control"
U.S. patent application Ser. No. 13/292,032, filed on Nov. 8, 2011, entitled, "Enforced Unitasking in Multitasking Systems"

This application is related to a concurrently-filed patent application entitled, "Conditional Auto-Responder" Ser. No. 13/709,018 which is hereby incorporated by reference herein.

BACKGROUND

Today's computer users are faced with a continuous barrage of incoming information in the form of email messages, text messages, voice messages and live voice calls, and messages transmitted via social networking systems, to name a few. Similarly, users are expected and sometimes required to create and transmit an equally high volume of outgoing messages as part of their work and social commitments. Such a constant stream of communication can make it difficult for computer users to concentrate on tasks requiring deep, sustained thought while using computers.

Although many recognize the potential harm of increasingly distracted computer and Internet use, as evidenced by pejorative terms such as "Crackberry addict" to describe someone who compulsively sends and receives email using a Blackberry mobile computing device, the blame for such harms typically is laid at the feet of the computer user for failing to exercise sufficient self-control. The solution most commonly proposed to this problem is for computer users to unilaterally change their usage habits, such as by leaving their computers at home while on vacation or manually turning off their smartphones while in restaurants.

SUMMARY

In response to detecting an incoming message (such as an email message, a text message, or a voice message) sent by a sender to a recipient, a computer system determines whether a current context of the recipient satisfies a condition. If the current context of the recipient satisfies the condition, then the system selects a response message based on the current context and sends the response message to the sender. The system's decision about whether to respond automatically to subsequent messages sent to the recipient may vary as the recipient's context changes. Furthermore, the system may select and send different response messages based on changes in the recipient's context.

BRIEF DESCRIPTION OF THE DRAWINGS

FIGS. 5A-5D are diagrams illustrating the use of activation states with profiles and logic modules according to embodiments of the present invention;
FIG. 7A is a diagram illustrating use of an embodiment of the present invention to enforce communication unitasking among one or more devices according to one embodiment of the present invention;
FIG. 7C is a diagram illustrating a plurality of unitasking specifiers according to one embodiment of the present invention.

DETAILED DESCRIPTION

Figure 1A:
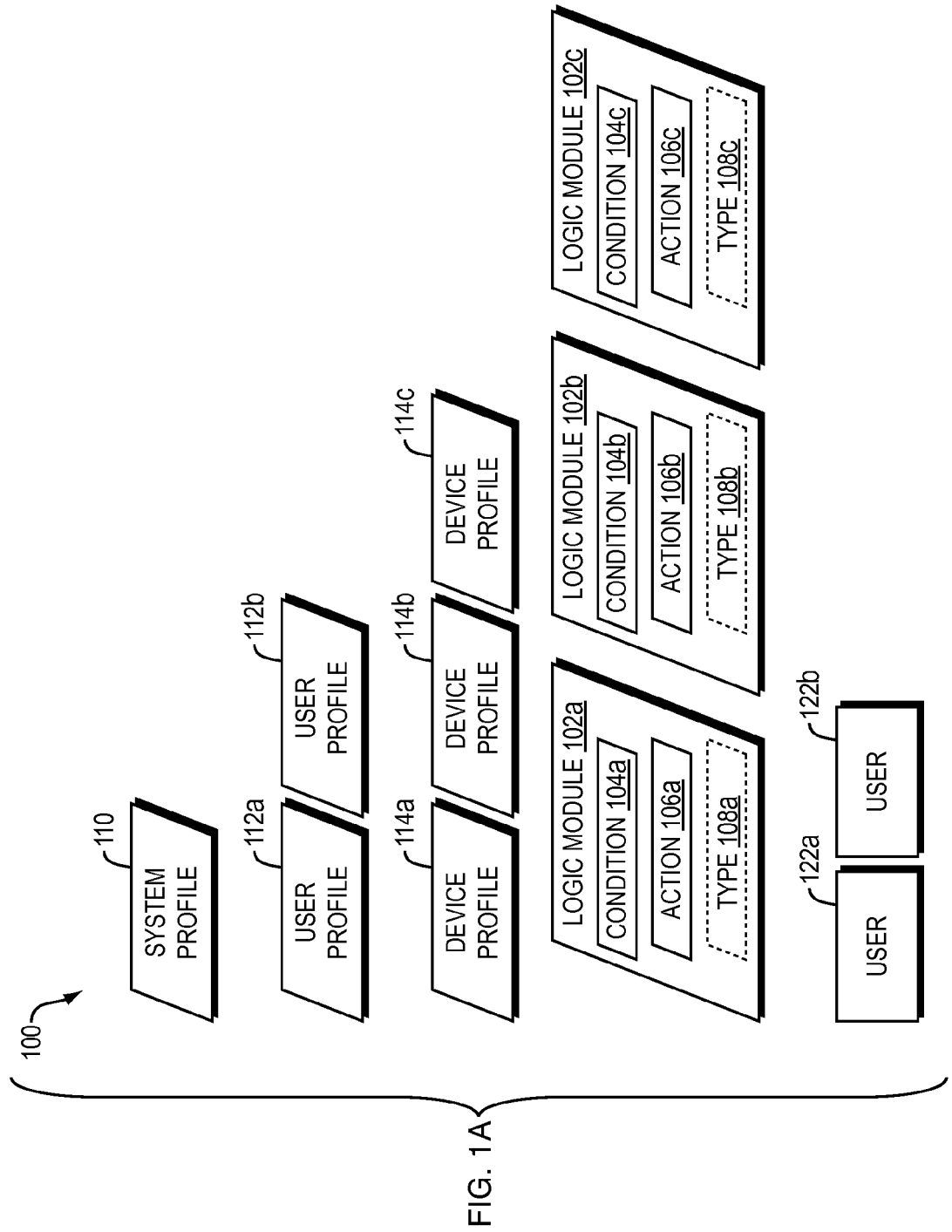
FIG. 1A is a dataflow diagram of a computer control system according to one embodiment of the present invention.

Referring to FIG. 1A, a dataflow diagram is shown of a computer control system 100 implemented according to one embodiment of the present invention. In general, the system 100 includes one or more profiles that define actions to be taken by the system 100 in response to satisfaction of conditions defined by the profiles. As will be described in more detail below, such conditions and actions may be defined in ways that control the extent to which users of the system 100 are distracted by devices within the system 100 and by other devices used by such users.

The system 100 includes one or more logic modules 102a-c. Although three logic modules 102a-c are shown in FIG. 1A as an example, the system 100 may include any number of logic modules. In general, each of the logic modules 102a-c defines a condition and a corresponding action. As will be described in more detail below, the system 100 or other embodiment of the present invention may perform the action defined by a logic module if the condition defined by the logic module is satisfied by the current context of the system 100. For example, logic module 102a includes condition specifier 104a (which specifies a first condition) and action specifier 106a (which specifies a first action); logic module 102b includes condition specifier 104b (which specifies a second condition) and action specifier 106b (which specifies a second action); and logic module 102c includes condition specifier 104c (which specifies a third condition) and action specifier 106c (which specifies a third action).

The condition and action specified by a particular logic module may implement a rule, such that the system 100 necessarily performs the action in response to determining that the condition is satisfied. Logic modules 102a-c need not, however, implement rules. Alternatively, for example, logic modules 102a-c may implement statistical methods such that the action specified by a logic module may or may not be performed in response to detecting that the condition specified by the logic module is satisfied in a particular instance. For example, a logic module may be implemented such that the action specified by the logic module is performed with a likelihood of 50% in response to determining that the condition specified by the logic module is satisfied, with the decision in a particular instance being implemented using a pseudo-random number generator. Various examples disclosed herein, however, will describe logic modules 102a-c as implementing rules for ease of explanation.

Each of condition specifiers 104a-c may specify a simple condition, such as a condition including only a single premise, such as "TIME=11:00," or a complex condition including a plurality of premises joined by one or more Boolean operators (e.g., AND, OR, XOR, NOT) in any combination. Therefore, any reference herein to a "condition" includes simple conditions and/or complex conditions. More generally, a condition may be implemented using any process that produces an output (e.g., a binary output) to determine whether to perform the corresponding action.

Similarly, each of action specifiers 106a-c may specify a simple action, such as an action to block receipt of an email message, or a complex action including a plurality of actions. Therefore, any reference herein to an "action" includes simple actions and/or complex actions. More generally, an action may be implemented using any process.

An action specifier may specify an action at any level of generality. For example, an action specifier may specify a particular action to be performed by the hardware of a device. As another example, an action specifier may specify a type of action, such as "block." In such a case, the specified action may be performed by identifying one or more specific acts that implement the specified action, and by performing the one or more specific acts. For example, a "block" action may be performed by performing a first set of acts to block an incoming email message, by performing a second set of acts to block an outgoing email message, and a third set of acts to block an incoming voice call, where the first, second, and third sets of acts differ from each other. The particular act(s) to perform in a particular instance to implement the "block" action may be determined dynamically and on-the-fly.

More generally, an action specifier may specify an action that is defined by any process, function, algorithm, or other set of acts. For example, an action specifier may specify a process which, when performed, receives input from some or all of the context data described below. As a result, the acts performed when executing a particular action specifier may vary from case to case depending on the current context data.

Any two of the condition specifiers 104a-c may specify the same or different conditions from each other. Similarly, any two of the action specifiers 106a-c may specify the same or different actions from each other. For example, no two of the condition specifiers 104a-c may specify the same condition as each other. As another example, condition specifiers 104a and 104b may specify the same conditions as each other, but condition specifier 104c may specify a condition that differs from the conditions specified by condition specifier 104a and condition specifier 104b. Similarly, for example, no two of the action specifiers 106a-c may specify actions that are the same as each other. As another example, action specifiers 106a and 1046b may specify the same actions as each other, but action specifier 106c may specify an action that differs from the actions specified by both action specifier 106a and action specifier 106b.

The system 100 also includes various profiles. In general, the term "profile" is used herein to refer to any set of data, such as a set of data that includes parameters, where each parameter has both a type and a value. For example, one parameter may have a type of "time" and a value that represents the current time (e.g., 11:00).

The system 100 includes, for example, one or more system profiles. In general, a system profile includes data representing information related to the system 100 as a whole. A single system profile 110 is shown in FIG. 1A. The system 100 may, however, include more than one system profile.

The system 100 also includes, for example, one or more user profiles. In general, a user profile includes data representing information related to a particular human user. In the example of FIG. 1A, the system 100 includes two user profiles 112a and 112b, which include data representing information related to users 122a and 122b, respectively. The system 100 may, however, include any number of user profiles.

The system 100 also includes, for example, one or more device profiles. In general, a device profile includes data representing information related to a particular device, such as a computing device or a communication device. In the example of FIG. 1A, the system 100 includes three device profiles 114a-c, which include data representing information related to devices 124a-c, respectively. The system 100 may, however, include any number of device profiles.

The system 100 need not include all of the types of profiles shown in FIG. 1A, where examples of profile types are system, user, and device. Rather, for example, the system 100 may solely include one or more profiles of a single type. For example, the system 100 may solely include a system profile, or solely include a user profile, or solely include a device profile. More generally, the system 100 may include one or more profiles of each of one or more of the types shown in FIG. 1A, so that the system 100 includes at least one profile of at least one type.

Figure 1B:
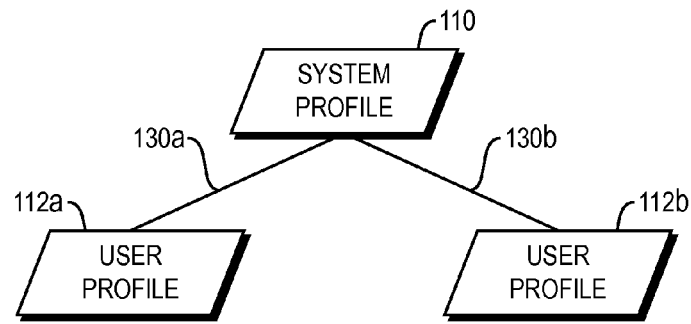
FIGS. 1B-1D are diagrams illustrating profiles and relationships among profiles according to embodiments of the present invention.

Profiles may be associated with each other in various ways. For example, a system profile may be associated with one or more user profiles. Referring to FIG. 1B, an example is shown in which system profile 110 is associated with user profiles 112a and 112b, as indicated by associations 130a and 130b, respectively. Although in the example of FIG. 1B the system profile 110 is associated with all of the user profiles 112a-b in the system 100, this is not required; the system profile 110 may alternatively be associated with fewer than all of the user profiles 112a-b in the system 100.

Figure 1C:
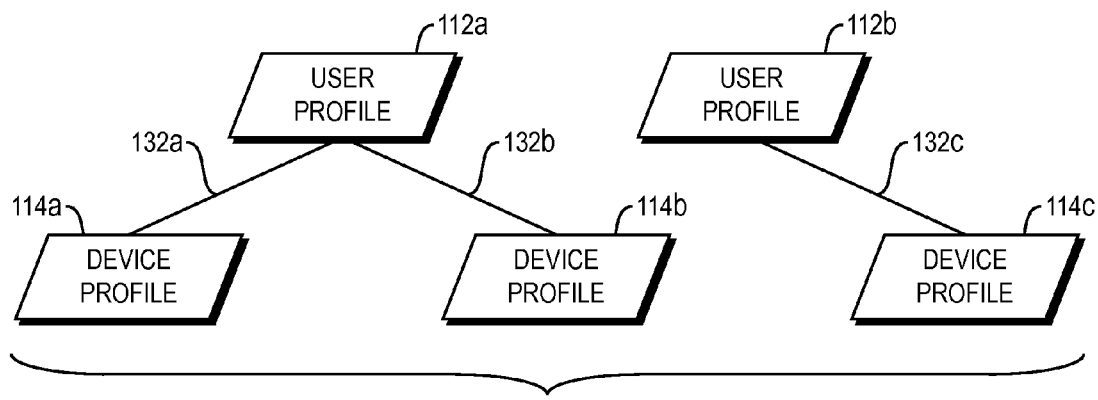

Referring to FIG. 1C, an example is shown in which: (1) user profile 112a is associated with device profiles 114a and 114b, as indicated by associations 132a and 132b, respectively; and (2) user profile 112b is associated with device profile 114c, as indicated by association 132c. As these examples illustrate, a user profile may be associated with any number of device profiles. Furthermore, although not shown in FIG. 1C, two user profiles may be associated with the same device profile. For example, this would occur in FIG. 1C if the user profile 112b were additionally associated with device profile 114b.

Figure 1D:
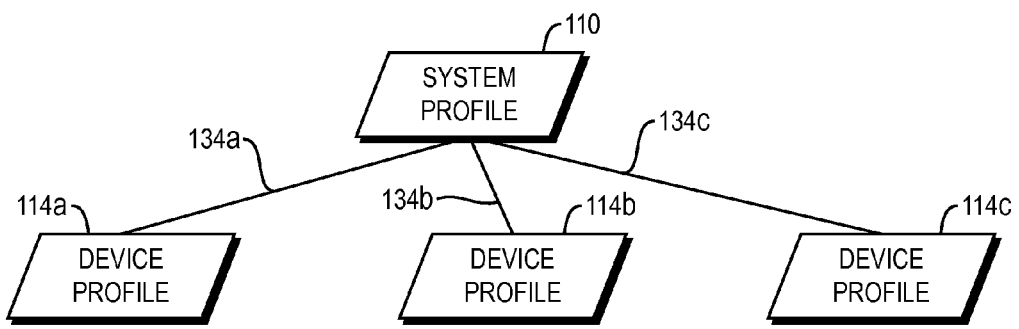

Referring to FIG. 1D, an example is shown in which system profile 110 is associated with device profiles 114a-c, as indicated by associations 134a-c, respectively. Although in the example of FIG. 1D the system profile 110 is associated with all of the device profiles 114a-c in the system 100, this is not required; the system profile 110 may alternatively be associated with fewer than all of the device profiles 114a-b in the system 100.

Any profile of any type may be associated with more or more logic modules. For example, referring to FIG. 1E, an example is shown in which system profile 110 is associated with logic module 102a (as indicated by association 136a); user profile 112a is associated with logic module 102a (as indicated by association 136b) and logic module 102b (as indicated by association 136c); user profile 112b is associated with logic module 102c (as indicated by association 136d); device profile 114a is associated with logic module 102a (as indicated by association 136e); device profile 114b is associated with logic module 102a (as indicated by association 136f) and logic module 102c (as indicated by association 136g); and device profile 114c is not associated with any logic module.

Figure 1E:
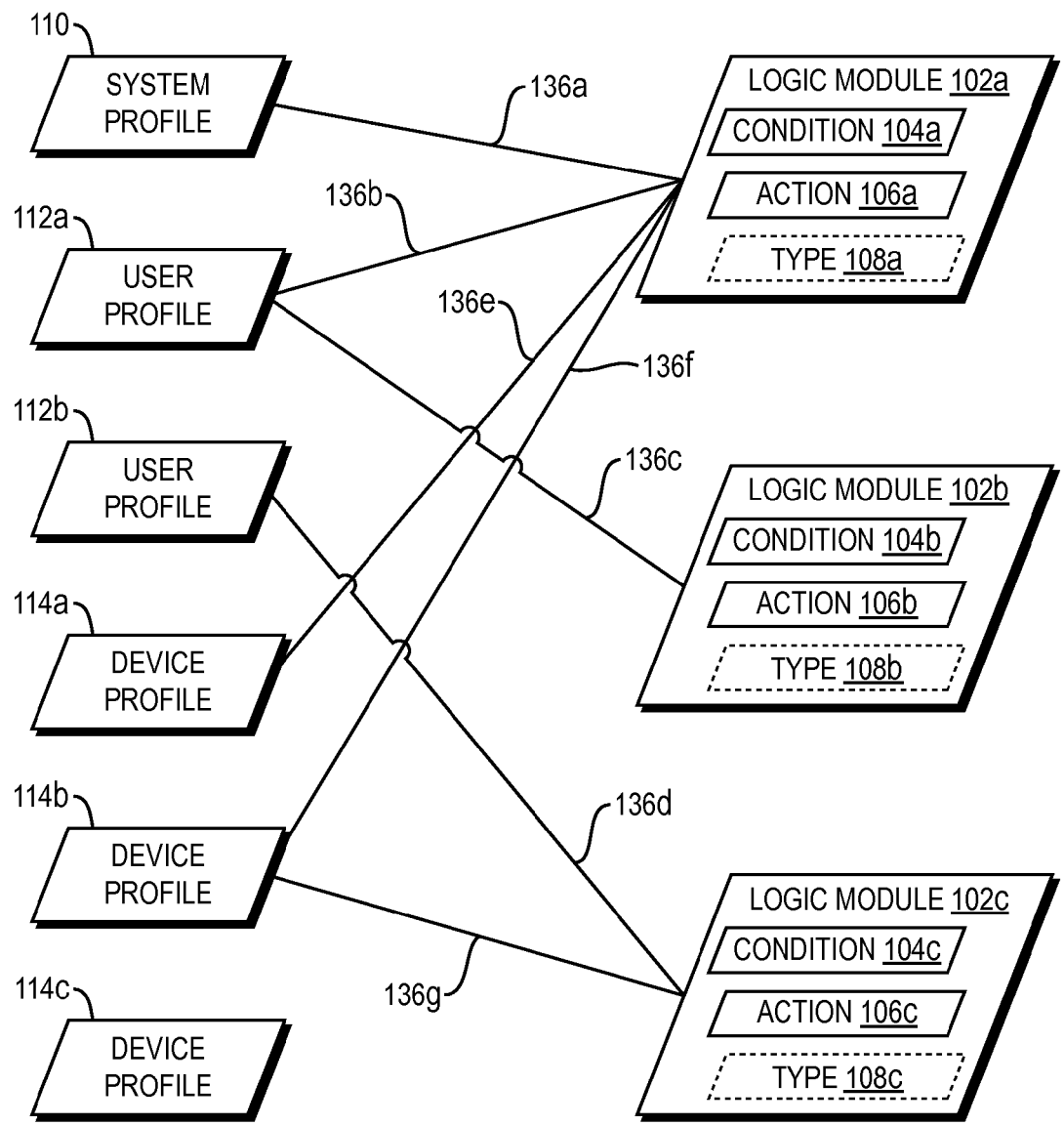
FIG. 1E is a diagram illustrating relationships between profiles and logic modules according to one embodiment of the present invention.

As illustrated in FIG. 1E, any profile of any type may be associated with any number (i.e., zero or more) of logic modules. One logic module may be associated with multiple profiles, e.g., multiple profiles of the same type or of different types. Furthermore, although in the example of FIG. 1E at least one profile of each type (system, user, and device) is associated with at least one logic module, this is not a requirement. Instead, for example, the system profile 110 may not be associated with any of the logic modules 102a-c. As another example, neither of the user modules 112a-b may be associated with any of the logic modules 102a-c. As yet another example, none of the device modules 114a-c may be associated with any of the logic modules 102a-c. All that is required is that at least one profile in the system 100 be associated with at least one of the logic modules 102a-c.

Figure 2:
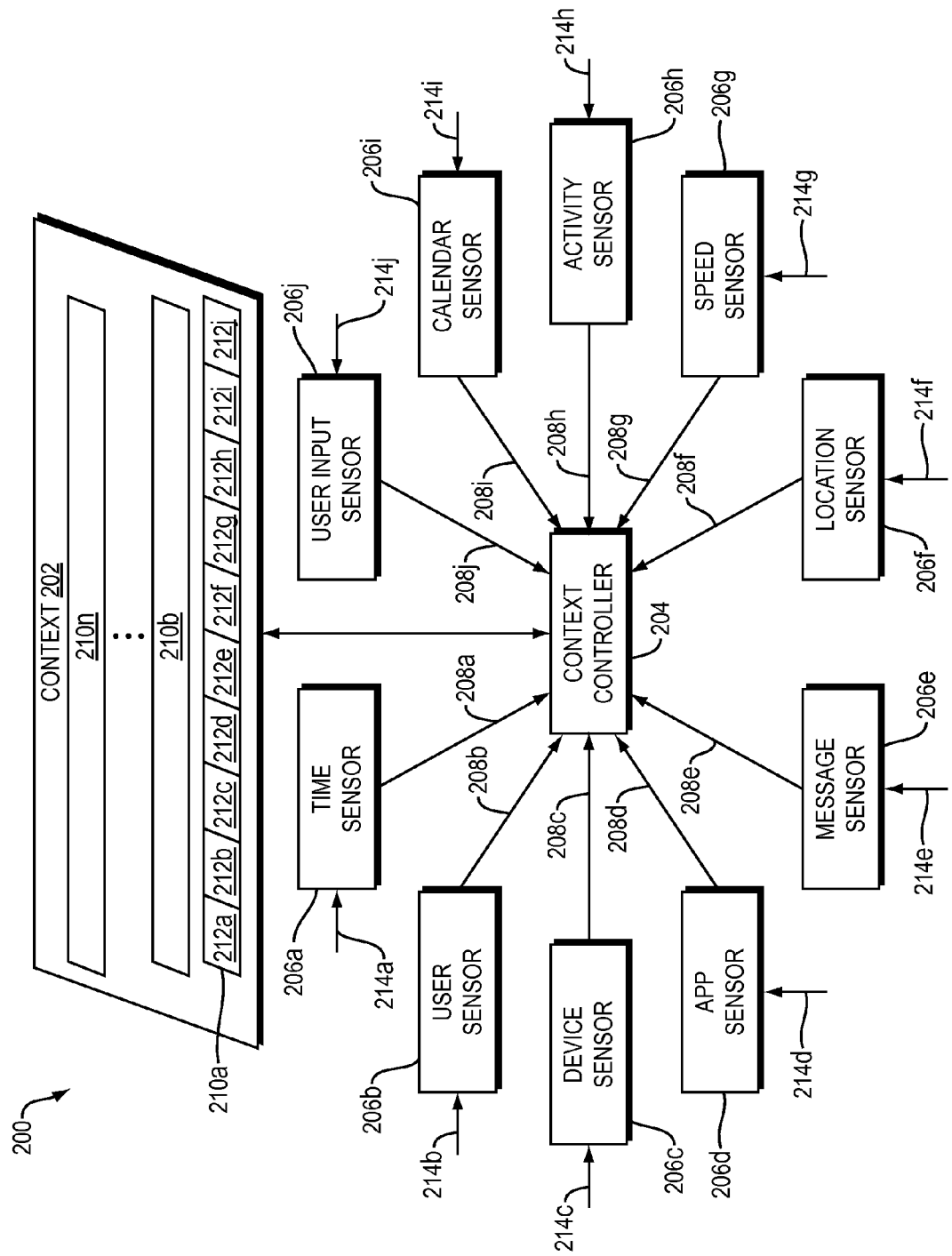
FIG. 2 is a diagram of a context controller for obtaining and synthesizing context data according to one embodiment of the present invention.

Referring to FIG. 2, a dataflow diagram is shown of a system 200 for obtaining and storing context data 202. Context data 202 is also referred to herein as "context." Context data 202 may, for example, represent information about an activity currently engaged in by one of the users 122a-b of the system 100, information about appointments on a user's calendar, or information about messages currently being transmitted by the system 100.

The system 200 includes a plurality of context sensors 206a-j. In general context sensors 206a-j obtain sensor inputs 214a-j, respectively, and generate outputs 208a-j, respectively. The outputs 208a-j of context sensors 206a-j are provided to and received by context controller 204, which generates and stores context data 202 based on the received outputs 208a-j. Context data 202 may, for example, include a context data record 210a, which includes fields 212a-j corresponding to and representing sensor outputs 208a-j, respectively. More specifically, field 212a may represent sensor output 208a, field 212b may represent sensor output 208b, and so on.

Although not shown in FIG. 2, context controller may be used to read the context data 202. For example, context controller 204 may provide output representing some or all of context data 202, e.g., in response to a request from another component for such data. Furthermore, context controller 204 may receive a request from another component to modify some or all of context data 202 and, in response to such a request, may make the requested modification to the context data 202.

Context controller 204 may sample the outputs 208a-j repeatedly, e.g., periodically (e.g., every millisecond, every second, or every minute), or in response to detecting a change in one or more of the outputs 208a-j. The context controller 204 may generate and store multiple context data records 210a-n, each of which represents a distinct sample of some or all of the sensor outputs 208a-j. Such repeated sampling and storage may, for example, be used to store a record of the history of context data generated by the context controller 204 within the context data 202 itself. Alternatively, for example, the context controller 204 may store only a single context data record 212a within the context data 202, and overwrite the values in the context data record 212a based on the outputs 208a-j received most recently from the sensors 206a-j.

Each of the sensors 206a-j may provide, as its output, an output that is identical to or a copy of the sensor's input, or an output that is generated based on the sensor's input but which differs from the sensor's input in any of a variety of ways, such as in its format and/or value. Furthermore, inputs 214a-j are optional; they may be omitted from the system 200 or integrated into their corresponding sensors. Any one or more of the sensors 206a-j may receive multiple inputs and derive output from such multiple inputs in any way.

Sensor 206a is a time sensor, which receives time sensor input 214a, such as data generated by a clock representing a current time. Time sensor 206a may, for example, generate output 208a representing a current time (e.g., the time at or around the time at which the sensor output 208a is generated). Such a time may be any kind of time, such as a real time (e.g., Jan. 1, 2011 at 11:00AM) or a system time (e.g., a number of clock cycles since a device was booted), represented to any degree of accuracy.

Storing a value that is equal to or based on the time sensor output 208a in the context records 210a-n effectively marks such records with timestamps that may later be used to associate any particular record with the time stored in the record's time field 212a, which may represent the actual or approximate time at which the record was created. The context controller 204 may sample all of the sensor outputs 208a-j at or near the time represented by the time sensor output 208a and generate a corresponding context record based on such sampled outputs, so that each of the context records 212a-n generated by the context controller 204a contains data representing context information that is valid for a single point in time or a relatively short period of time overlapping with or near the time represented by the record's time field 212a, and so that the record's time field 212a may subsequently be used to identify the actual or approximate time(s) for which the information represented by the other fields 212b-i in the same record is valid.

Any references below to the "current sample period" in connection with the set of sensor outputs 208a-j therefore refers to a point in time or period of time defined by reference to the time represented by time sensor output 208a, such as the exact point in time represented by time sensor output 208a or a time period beginning with or otherwise including the point in time represented by time sensor output 208a. Similarly, any use of the terms "current" or "currently" below should be understood to refer to a time or time period defined by reference to the time represented by the time sensor output 208a. For example, in the context of a particular set of sensor outputs 208a-j within the current sample period, "the current user" should be understood to refer to the user represented by output 208b of user sensor 206b at or around the time represented by time sensor output 208a.

Sensor 206b is a user sensor, which receives user sensor input 214b and generates, based on input 214b, output 208b representing a user, such as a current user of one of the devices 124a-c or the system 100 as a whole. The sensor 206b may, for example, obtain input 214b representing user login credentials (e.g., username and/or password) or biometric information, and provide user output 208b uniquely identifying the user specified by the input to the sensor 206b. The user output 208b is not limited to output representing the identity of the user, but more generally may represent any data relating to the user.

Sensor 206c is a device sensor, which receives device input 214c and generates, based on input 214c, output 208c representing a device, such as one of the devices 124a-c of the system 100. The device output 208c during a particular sample period may, for example, represent a device currently used by the user represented by the output 208b of user identification sensor 206b during the sample period. The device sensor 206c may, for example, obtain input 214c representing a device serial number or other unique identifier of the device, and provide device output 208c uniquely identifying the device. The device output 208c is not limited to output representing the identity of the device, but more generally may represent any data relating to the device, such as data representing any aspect of the device's current configuration, such as audio volume, screen brightness, and whether any particular input or output components of the device currently are enabled or disabled.

Sensor 206d is an application sensor, which receives application input 214d and generates, based on input 214d, output 208d representing the state of one or more software applications (which includes any kind of software, such as operating systems, application programs, and web-based applications). For example, the application sensor output 208d during a particular sample period may, for example, represent the state of one or more software applications executing on a device. The application output 208d during a particular sample period may, for example, represent the state of one or more software applications executing on the device represented by the output 208c of device sensor 206c, or the state of one or more software applications being executed by or on behalf of the user represented by the output 208b of the user sensor 206b, during the same sample period. The application sensor output 208d may, for example, indicate which applications currently are executing, which application(s) is/are in the foreground, which application has the input focus, which application(s) currently is/are providing user output, and which application(s) currently is/are receiving user input. The application sensor 206d may obtain input 214d from any source, such as an operating system of the device represented by device sensor output 208c, or from applications by using application program interface (API) calls to such applications.

Sensor 206e is a message sensor, which receives message input 214e and, based on input 214e, generates output 208e representing information relating to one or more messages. Output 208e may, for example, represent a communication mode of the message (e.g., whether the message is an email message, a text message, or a live voice call), data from the message (such as the body of an email message, audio from a voice call, or text transcribed from a voice message), metadata of the message (such as a message header or metatag), the composition state of the message (e.g., whether the message currently is being composed or has already been composed), the manifestation state of the message (e.g., whether the message currently is being manifested), the transmission state of the message (e.g., whether the message currently is queued for transmission, attempted to be transmitted, or being transmitted), and the transmission direction of the message (e.g., whether the message currently is being sent or received by the user, device, or application represented by output 208b, 208c, or 208d, respectively). The message sensor 206e may obtain input 214e from any source, such as an operating system of the device represented by device sensor output 208c or by using application program interface (API) calls to individual applications.

Sensor 206f is a location sensor, which receives location input 214f and, based on input 214f, generates output 208f representing information relating to a current location of either or both of the user represented by user output 208b and the device represented by device output 208c. The location sensor 206f may obtain input 214f from any source, such as a Global Positioning System (GPS) device, a radio frequency identification (RFID) tag, or manual user input. The location sensor output 208f may represent the current location in any of a variety of forms, such as a latitude-longitude combination, or by one or more labels representing one or more categories of location (e.g., work, home, theater, restaurant). The location sensor 206f may, alternatively or additionally, obtain input 214f relating to and provide output 208f representing the proximity of the user and/or device to another user and/or device. Proximity data may, for example, be received directly from another device using infrared (IR) signals, or by comparing locations of user or devices to each other. Proximity output 208f may represent, for example, any one or more of the following: the degree of proximity (e.g., distance) to another device, the identity of the proximate device, and whether the device represented by device output 208c is proximate to another device of interest.

Sensor 206g is a velocity sensor, which generates output 208g representing information relating to a current velocity of either or both of the user represented by user output 208b and the device represented by device output 208c. The velocity sensor 207g may obtain data from any source, such as any of the sources from which the location sensor 206f may obtain data. The velocity sensor 206g may, alternatively or additionally, obtain data relating to and provide output 208g representing the current acceleration of the current user and/or the current device.

Sensor 206h is an activity sensor, which receives activity input 206h and, based on input 206h, generates output 208h representing information relating to a current activity in which the current user and/or the current device is engaged. Examples of activities are writing a message, reading a message, writing a document, reading a document, engaging in a voice call, listening to a voice message, and providing input of any kind to the current device. The activity sensor 206h may obtain input 214h from any source, such as from any user input device (e.g., keyboard, mouse, touchpad, touchscreen, or microphone) or by making API calls to software such as operating systems, application programs, and device drivers.

Sensor 206i is a calendar sensor, which receives calendar input 214i and, based on input 214i, generates output 208i representing information relating to data stored in a calendar of the current user and/or a calendar of the current device. Calendar output 208i may represent, for example, the presence or absence of an appointment at or near the current time, and any information relating to any appointment at or near the current time, such as the appointment's start time, end time, duration, location, priority (e.g., high or low), category, and attendee list.

The calendar sensor 206i may obtain calendar input 214i from any source, such as a calendar application external to the system 200 (e.g., Microsoft Outlook, Apple iCal, Google calendar), a calendar internal to the system 200, or a combination of both. The calendar sensor 206i may obtain calendar input 214i from external calendar applications using application program interfaces (APIs) provided by such external calendar applications. In some embodiments, the calendar sensor 206i solely obtains calendar input 214i from one or more sources external to the system 200, in which case the system 200 may not create or edit data within the calendars maintained by such external sources.

In embodiments that use both a calendar internal to the system and one or more external calendars, such internal and external calendars may interact with each other in a variety of ways. For example, the internal calendar may override the external calendars in the case of a conflict between the two, or vice versa. As another example, the internal calendar may be combined with the external calendars, such as by aggregating the appointments on the internal calendar and external calendar into a single combined calendar.

Figure 10:
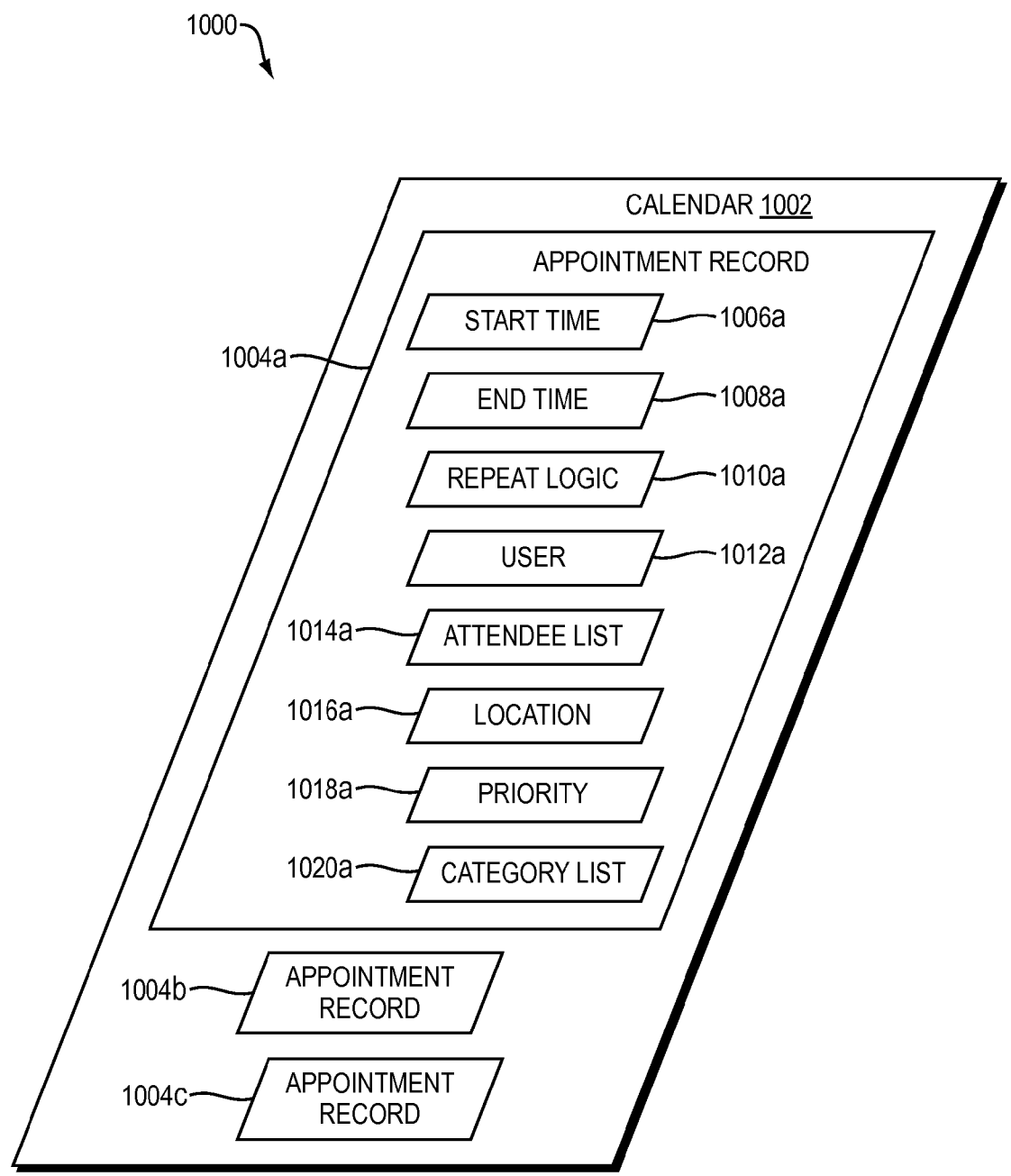
FIG. 10 is a diagram of a system including a calendar according to one embodiment of the present invention.

Referring to FIG. 10, a diagram is shown of a system 1000 including a calendar 1002 according to one embodiment of the present invention. The calendar 1002 may include one or more appointment records. Each appointment record represents a corresponding appointment. Three appointment records 1004a-c are shown in FIG. 10 as an example. Although for ease of explanation the appointment records 1004a-c may be referred to herein as the "appointments" that are represented by the appointment records 1004a-c, it should be understood that the appointment records 1004a-c may be tangibly stored in a computer-readable medium and contain data that represents the corresponding appointments. As a result, the elements of the appointment records 1004a-c may themselves be tangibly stored in a computer-readable medium and contain data that represents the information described below.

In the particular embodiment shown in FIG. 10, appointment 1004a includes a start time 1006a and an end time 1008a, which may alternatively be implemented, for example, using the start time 1006a and a duration (not shown). The appointment 1004a also includes a variety of optional elements, such as repeat logic 1010a (which specifies when the appointment 1004a should repeat), a user identifier 1012a to identify the user associated with the appointment 1004a (e.g., the user who created the appointment 1004a), an attendee list 1014a specifying one or more attendees of the appointment, a location identifier 1016a specifying a location of the appointment 1004a, a priority identifier 1018a specifying a priority of the appointment 1004a (e.g., high, medium, or low), and a category list 1020a specifying one or more categories associated with the appointment 1004a.

Although the other appointments 1004b-c may contain similar elements to the elements of the appointment 1004a, such elements are not shown in FIG. 10 for ease of illustration. The values of the elements of appointments 1004b-c, however, may differ from the values of corresponding elements of appointment 1004a. For example, the start time of appointment 1004b may differ from the start time 1006a of appointment 1004a.

The range of times associated with an appointment (such as the range of times defined by the difference between the start time 1006a and the end time 1008a) is referred to herein as the appointment's "time period." The term "time period," as used herein, may include one or more dates. For example, Nov. 1, 2011 from 10:00 am to 11:00 am is an example of a time period as that term is used herein. As another example, Nov. 1, 2011 at 10:00 am through Nov. 2, 2011 at 8:00 am is an example of a time period as that term is used herein. As yet another example, 1:00 pm through 3:00 pm is an example of a time period as that term is used herein.

Figure 11:
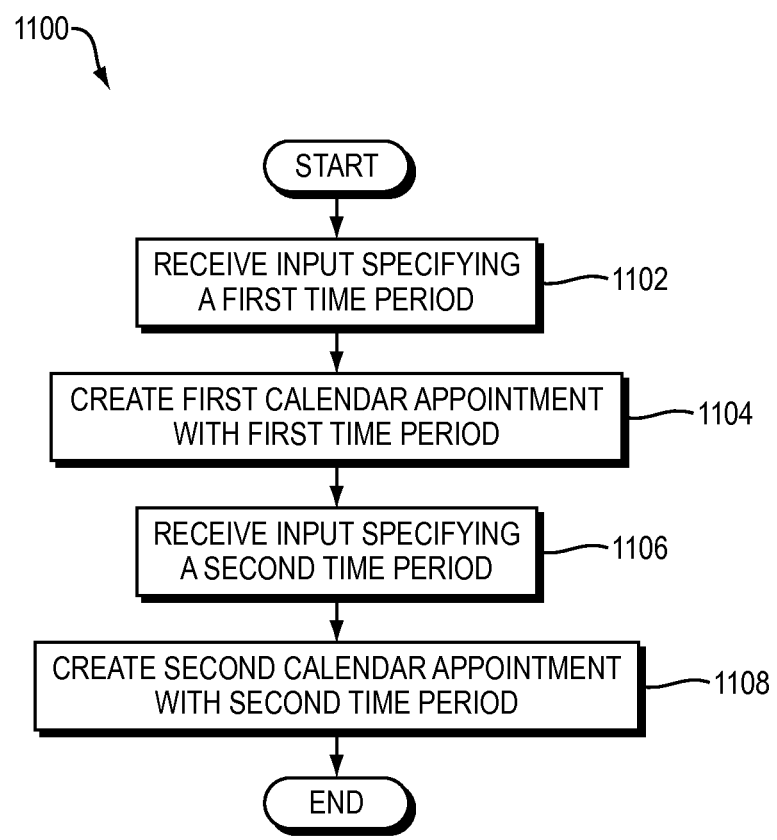
FIG. 11 is a flowchart of a method for creating appointments on a calendar according to one embodiment of the present invention.

Referring to FIG. 11, a flowchart is shown of a method 1100 for creating appointments on a calendar according to one embodiment of the present invention. The method 1100 receives first input specifying a first time period (operation 1102). The first input may, for example, be received from a user. The first time period may be selected arbitrarily by the user. In other words, the first time period need not be selected using an algorithm or fit any pattern, such as the pattern, "weekdays from 9:00 am to 5:00 pm." Instead, the first time period may be any range of times, such as Nov. 1, 2011 from 10:00 am to 11:00 am. The method 1100 creates a first appointment on a calendar, wherein the first appointment has the first time period (operation 1104).

The method 1100 receives second input specifying a second time period (operation 1106). The second input may, for example, be received from the same user as the first input. The second time period may be selected arbitrarily by the user. The method 1100 creates a second appointment on the calendar as the first appointment, wherein the second appointment has the second time period (operation 1108). The method 1100 may continue in a similar manner for any additional number of appointments.

The first and second time periods (associated with the first and second appointments, respectively) may be arbitrary in relation to each other. For example, the first and second time periods need not fit a pattern, such as "weekdays from 9:00 am to 5:00 pm." Either or both of the first and second appointments may be non-repeating (i.e., one-time) appointments, whether because such appointments lack repeat logic or because the repeat logic of such appointments specifies that such appointments do not repeat.

Although appointment times may, for example, be selected arbitrarily, an appointment may define its associated time period in any of a variety of ways. For example, an appointment may define its associated time period in terms of any one or more of the following:
- a particular date and a particular time range within that date (e.g., Nov. 1, 2011 from 10:00 am to 11:00 am);
- a time range (e.g., 9 am-5 pm), which may thereby specify that time range on every day;
- a start date (e.g., Nov. 1, 2011), a particular time range (e.g., 10:00 am to 11:00 am), and a repeating date function (e.g., daily, weekly, the first day of every month, the third Wednesday of every month); or
- a particular date, which may thereby specify all times during that date.

As mentioned above, the time sensor 206a may implement various functions related to timers. Such functions may be implemented, either alternatively or additionally, by the calendar sensor 206j. A condition of a logic module may define a particular timer, and the condition may be satisfied when the particular timer has expired, or when the particular timer has started running but not yet expired. The condition may, for example, specify a time at which the timer is to start running (such as by defining a condition, upon satisfaction of which the timer is to start running). Alternatively, for example, the timer may be started in response to user input at a user-selected time.

A timer is associated with a start time and either a duration or an end time. Although at least some timers may be implemented in the same way as calendar appointments, timers need not be implemented as calendar appointments. For example, a timer may be started at any time without adding an entry representing the timer to a calendar. Furthermore, a timer associated with a duration may be started and stopped any number of times. When the timer is first started (the timer's "initial start time"), the timer's "running time" may be initialized to zero and begin to accumulate in real time (i.e., to accumulate one second of running time for each second of real time). The timer's running time may stop accumulating if and in response to stopping the timer. If the timer is started again, the timer's running time may resume its real-time accumulation. The timer may only expire when its running time equals or exceeds its associated duration. Some timers may not be allowed to be stopped once they have started, in which case the timer's running time may be equal to the amount of real time that has elapsed since the timer's initial start time.

The total running time of a timer may be reset (e.g., to zero or some other number) upon the satisfaction of a condition. For example, the total running time of a timer may be reset after some predetermined amount of real time has elapsed since the timer's initial start time, since the timer was last reset (e.g., one minute, one hour, one day, or one week), or upon the occurrence of a real time that satisfies a condition (e.g., the beginning of a new calendar minute, hour, day, or week). Such timers may only expire if their total running time equals or exceeds their associated duration before they are reset.

Calendar appointments, such as appointments 1004a-c, may, but need not include or be associated with logic modules. For example, appointment 1004a may include or otherwise be associated with one or more logic modules, in which case such logic modules may only be applied during the time period of the appointment 1004a. In other words, the time period of the appointment 1004a may be treated as an implicit condition of the logic modules associated with the appointment.

Appointments need not, however, contain or otherwise be associated with logic modules. Even if an appointment does not contain and is not otherwise associated with a logic module, the application of the logic module may still be influenced by the appointment. For example, a condition of a logic module may be satisfied if the current real time (or other time 208a output by the time sensor 206a) falls within the time period of any appointment on a calendar (e.g., any calendar or a specified calendar). Such a condition will be satisfied, and thereby cause the corresponding action to be performed, in response to detecting that the current real time (or other time 208a output by the time sensor 206a) falls within the time period of any calendar appointment. Such a condition need not be contained within or otherwise reference any particular calendar appointment.

As another example, a condition of a logic module may be satisfied if the current real time (or other time 208a output by the time sensor 206a) falls outside the time period of any appointment on a calendar (e.g., any calendar or a specified calendar). Such a condition will be satisfied, and thereby cause the corresponding action to be performed, in response to detecting that the current real time (or other time 208a output by the time sensor 206a) falls outside the time period of any calendar appointment. Such a condition need not be contained within or otherwise reference any particular calendar appointment.

Any condition that requires the presence or absence of a calendar appointment may be further narrowed by additional conditions, such as conditions requiring the user, attendee list, location, priority, and/or category list of the appointment to satisfy one or more criteria. Examples of such compound calendar-related conditions are: "appointments within business hours," "appointments on weekends," "appointments having high priority," "appointments not having low priority," and "appointments in the marketing category." Although such compound conditions may be satisfied by one or more calendar appointments, they do not make specific reference to any particular calendar appointment (e.g., by name or other unique identifier).

As these examples illustrate, calendar appointments may be created, stored, and modified independently of the logic modules that are applied to such calendar appointments. The logic modules that are applied to calendar appointments may, for example, be stored separately from the calendar appointments themselves. One benefit of embodiments in which calendar appointments are independent of logic modules is that such embodiments may be implemented in connection with existing calendar applications without the need to require such applications to store logic modules within or in association with calendar appointments. As a result, users of such existing calendar applications may continue to use them in the existing manner, by adding, editing, and deleting calendar appointments without having to specify logic to apply to each calendar appointment. Instead, logic modules that were created (e.g., manually by the user) before the calendar appointments were created or that are created after the calendar appointments are created may be applied to such calendar appointments in any of the ways described above, even if: (1)

such logic modules are not contained within the calendar appointments; (2) the calendar appointments are not associated with the logic modules; and (3) the logic modules do not make specific reference to particular calendar appointments.

Calendar-based features of embodiments disclosed herein may be used in connection with any other embodiments disclosed herein. As a result, for example, in response to detection of the occurrence of an appointment scheduled on a calendar, embodiments of the present invention may perform actions in connection with messages transmissible via two or more different modes of communication (e.g., any two or more of an email message, a text message, and a live voice call). Calendar-based features of embodiments disclosed herein may, however, be used independently of various features disclosed herein. For example, calendar-based features of embodiments disclosed herein may be used in connection with profiles or without the use of profiles.

Figure 3A:
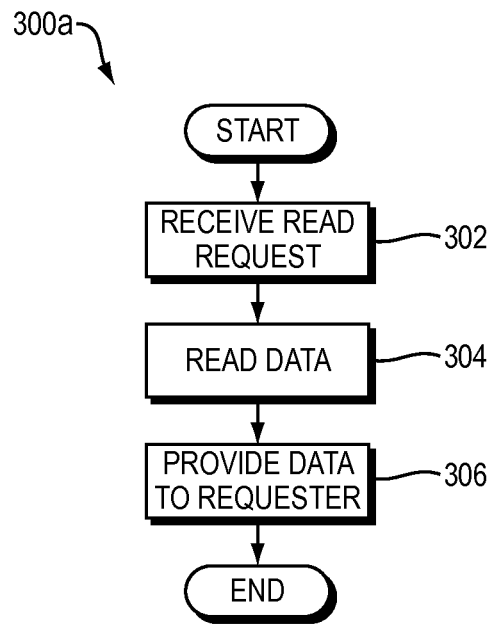
FIG. 3A is a flowchart of a method performed by the system of FIG. 1F according to one embodiment of the present invention.
Figure 3B:
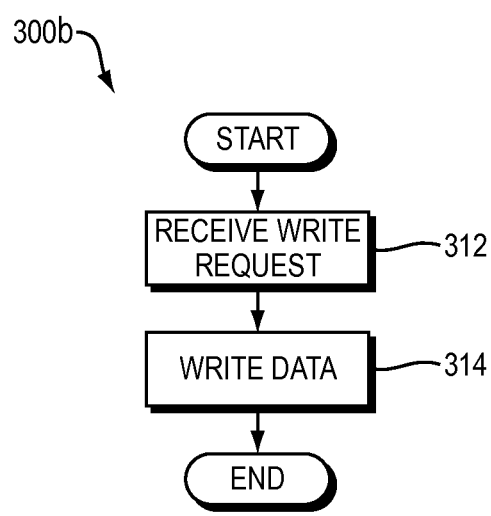
FIG. 3B is a flowchart of a method performed by the system of FIG. 1G according to one embodiment of the present invention.
Figure 3C:
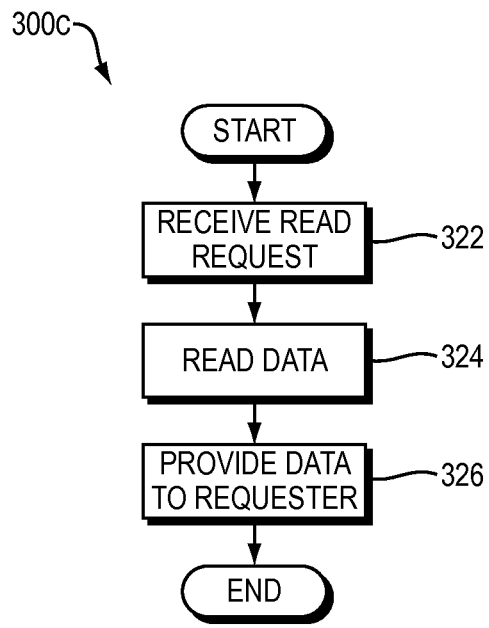
FIG. 3C is a flowchart of a method performed by the system of FIG. 1H according to one embodiment of the present invention.
Figure 3D:
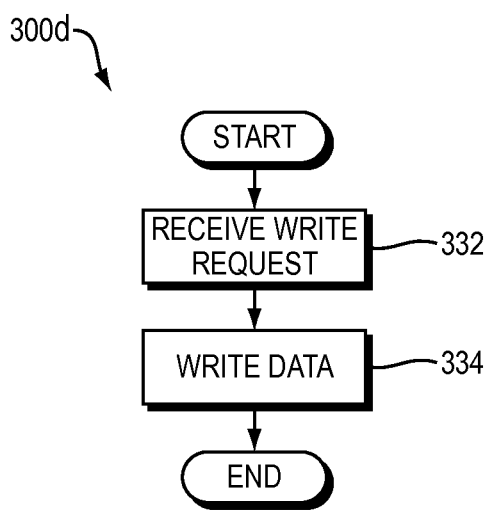
FIG. 3D is a flowchart of a method performed by the system of FIG. 1I according to one embodiment of the present invention.
Figure 3E:
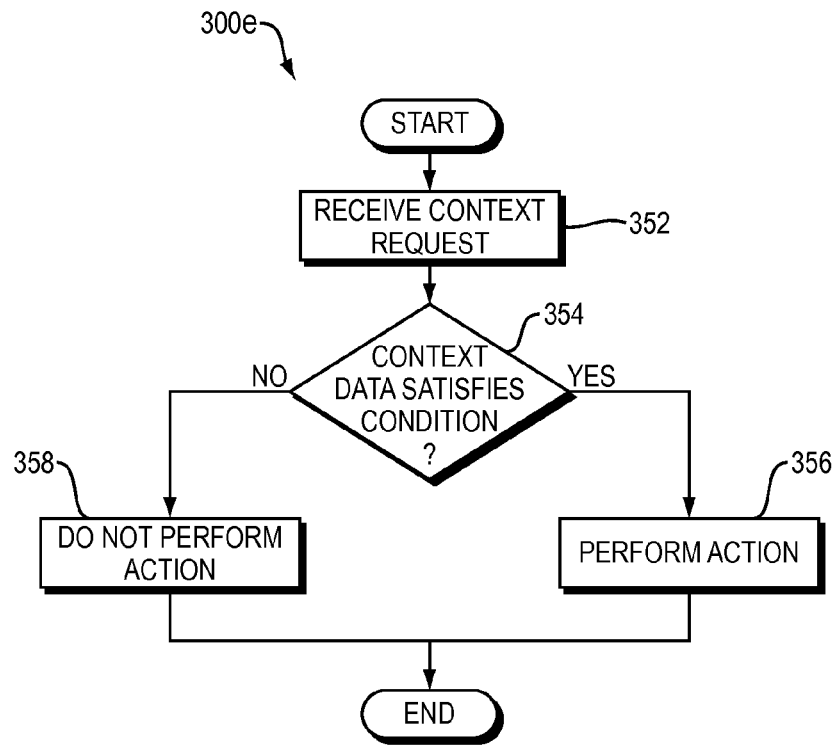
FIG. 3E is a flowchart of a method performed by the system of FIG. 1J according to one embodiment of the present invention.
Figure 3F:
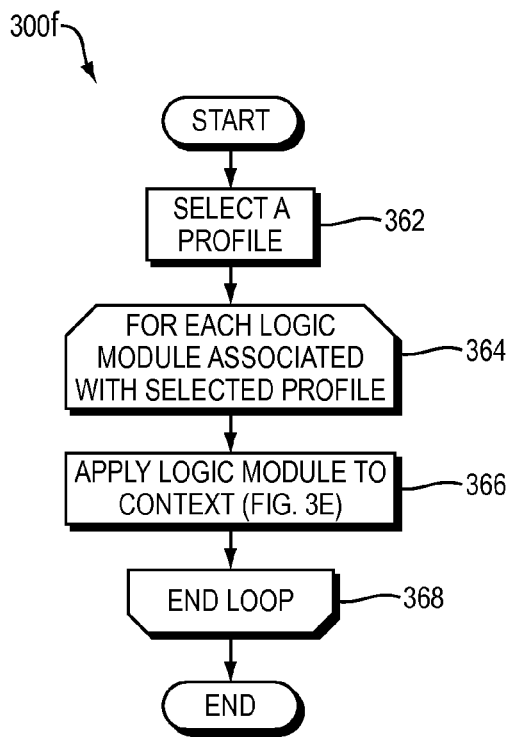
FIGS. 3F and 3G are flowcharts of methods performed by the system of FIG. 1K according to embodiments of the present invention.

The method 300f of FIG. 3F may be used to apply logic modules that are influenced by calendar appointments, i.e., logic modules that include a condition that is satisfied by the presence or absence of a calendar appointment. In operation 366 of method 300f, the method 300f may identify a current time, such as a current real time output by the time sensor 206a. Furthermore, operation 366 may include determining whether the identified current time falls within the time period of an appointment on a calendar. More generally, operation 366 may include determining whether the context data satisfies the condition of the current logic module, as described in more detail above in connection with operation 354 of FIG. 3E.

Figure 12:
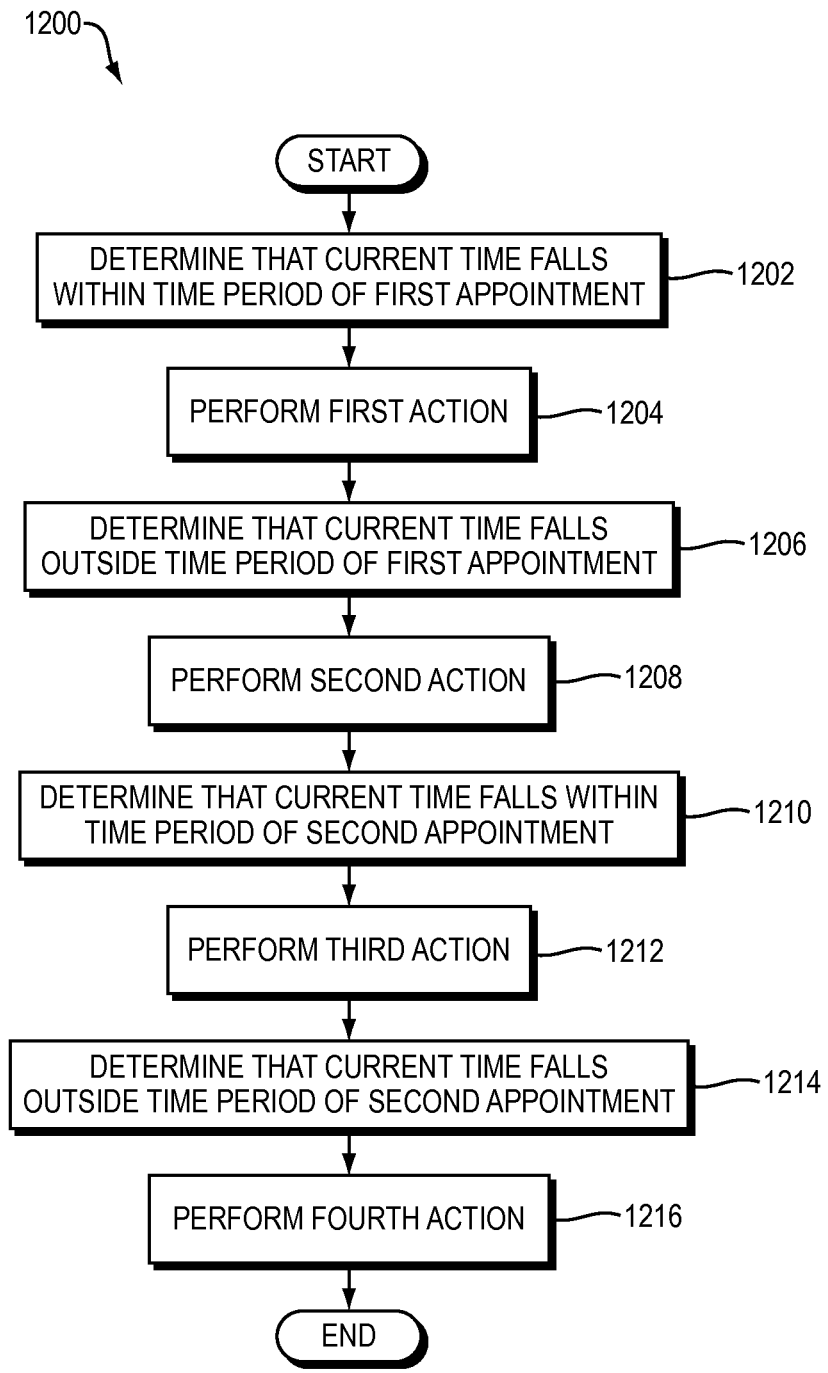
FIG. 12 is a flowchart of a method for applying logic modules to appointments on a calendar according to one embodiment of the present invention.

An example of a result of performing method 1100 (FIG. 11) and method 300f (FIG. 3F) is illustrated by the method 1200 of FIG. 12. The method 1200 determines that the current time (e.g., the current real time) falls within the time period of the first calendar appointment created in operation 1104 of FIG. 11 (operation 1202). Operation 1202 may include determining that the real time is equal to or later than the start time of the first appointment. In response to the determination of operation 1202, the method 1200 performs a first action, such as an action specified by a first logic module having a condition that is satisfied by the first appointment (operation 1204). Operation 1204 may include determining that the first logic module's condition is satisfied by the first appointment. Operation 1204 may be performed repeatedly and/or continuously until some other time, such as the determination described below in connection with operation 1206.

The method 1200 determines that the current time falls outside the time period of the first calendar appointment (operation 1206). Operation 1206 may include determining that the real time is equal to or later than the end time of the first appointment, or that the duration of the first appointment has elapsed. In response to the detection of operation 1206, the method 1200 performs a second action (operation 1208). Operation 1208 may include determining that the first logic module's condition is no longer satisfied.

Such a second action, may for example, be specified by the same first logic module that specified the first action. In this embodiment, the first action acts as a "start appointment action" that is performed upon detection of the start of the first appointment (and possibly for the duration of the first appointment), while the second action acts as an "end appointment action" that is performed upon detection of the end of the first appointment (and possibly for some period of time thereafter).

Instead of or in addition to performing the second action, operation 1208 may include terminating performance of the first action.

The method 1200 determines that the current time (e.g., the current real time) falls within the time period of the second calendar appointment created in operation 1108 of FIG. 11 (operation 1210). Operation 1210 may include detecting that the real time is equal to or later than the start time of the second appointment. In response to the determination of operation 1210, the method 1200 performs a third action, such as an action specified by a second logic module having a condition that is satisfied by the second appointment (operation 1212). Operation 1212 may include determining that the second logic module's condition is satisfied by the second appointment.

The method 1200 determines that the current time falls outside the time period of the second calendar appointment (operation 1214). Operation 1214 may include detecting that the real time is equal to or later than the end time of the second appointment, or that the duration of the second appointment has elapsed. In response to the determination of operation 1214, the method 1200 performs a fourth action (operation 1216). Operation 1216 may include determining that the first logic module's condition is no longer satisfied.

Such a fourth action, may for example, be specified by the same second logic module that specified the third action. Instead of or in addition to performing the fourth action, operation 1216 may include terminating performance of the third action.

The first and second actions may be any actions, such as block, allow, forward, defer, change mode, change contents, or respond actions. The first action may differ from the second action. The third action may differ from the fourth action. The third action may differ from the first action.

Various "out of office assistants" are well known. An out of office assistant typically sends an automated response (e.g., by email) to all of a user's incoming messages (e.g., email messages) while the out of office assistant is activated. Embodiments of the present invention may, for example, be used to implement a dynamic, context-sensitive, and multimodal out of office assistant. For example, conventional out of office assistants typically send a single response message (such as, "I am out of the office until Tuesday and will respond to email upon my return") in response to all incoming email messages. In contrast, embodiments of the present invention may select a response message that is dependent upon the current context. In other words, in response to receiving an incoming message (such as an email message), embodiments of the present invention may generate a response message based on the current context and then send the generated response message to the sender of the message. Such a message may, for example, state that "I am in a meeting until 4:00 pm and will not be able to respond to you until at least that time," where such a message is generated based on a calendar appointment that is scheduled to end at 4:00 pm.

As this example illustrates, such auto-response messages may vary depending on the context. As a result, embodiments of the present invention may: (1) receive a first message at a first time; (2) generate a first response message based on a first context at the first time; (3) send the first response message to the sender of the first message; (4) receive a second message at a second time; (5) generate a second response message based on a second context at the second time, wherein the second response message differs from the first response message; and (6) send the second response message to the sender of the second message.

As another example, conventional out of office assistants typically allow messages (e.g., email messages) to be received and for notifications of such messages to be generated to the recipient while the out of office assistant is activated. In contrast, embodiments of the present invention may perform actions, such as blocking or deferring, on incoming messages while the out of office assistant is active. Out of office assistants implemented according to embodiments of the present invention may, therefore, perform multiple actions on each incoming message (e.g., block and respond or defer and respond). As one particular example, out of office assistants implemented according to embodiments of the present invention may defer incoming messages while the out of office assistant is active and terminate deferral of incoming messages in response to deactivation of the out of office assistant. As a result, for example, messages that were withheld from the recipient's inbox while the out of office assistant was active may be inserted into the recipient's inbox in response to deactivation of the out of office assistant.

Out of office assistants implemented according to embodiments of the present invention may be applied to messages transmissible via any one or more communication modes. For example, a single out of office assistant may be applied to messages transmissible via two or more communication modes (e.g., any two or more of email, text messages, and live voice calls). An automatic response to an incoming message may, for example, be sent by a predetermined communication mode (e.g., email) regardless of the communication mode via which the incoming message was received, such that the out of office assistant responds to messages received via all communication modes using the predetermined communication mode. As another example, an automatic response to an incoming message may be sent by the communication mode by which the incoming message was received.

Figure 13:
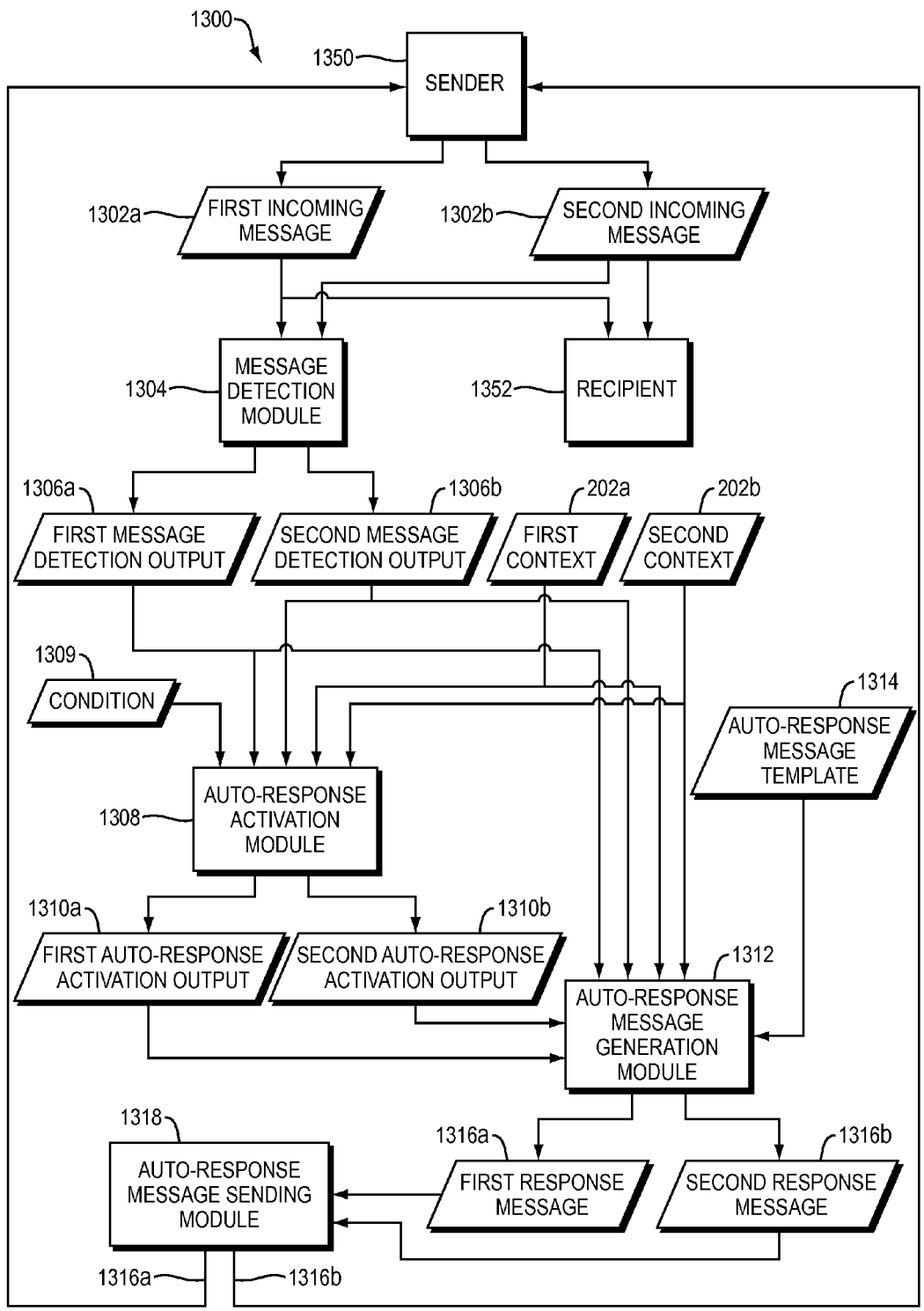
FIG. 13 is a dataflow diagram of a system for implementing an auto-responder according to one embodiment of the present invention.
Figure 14:
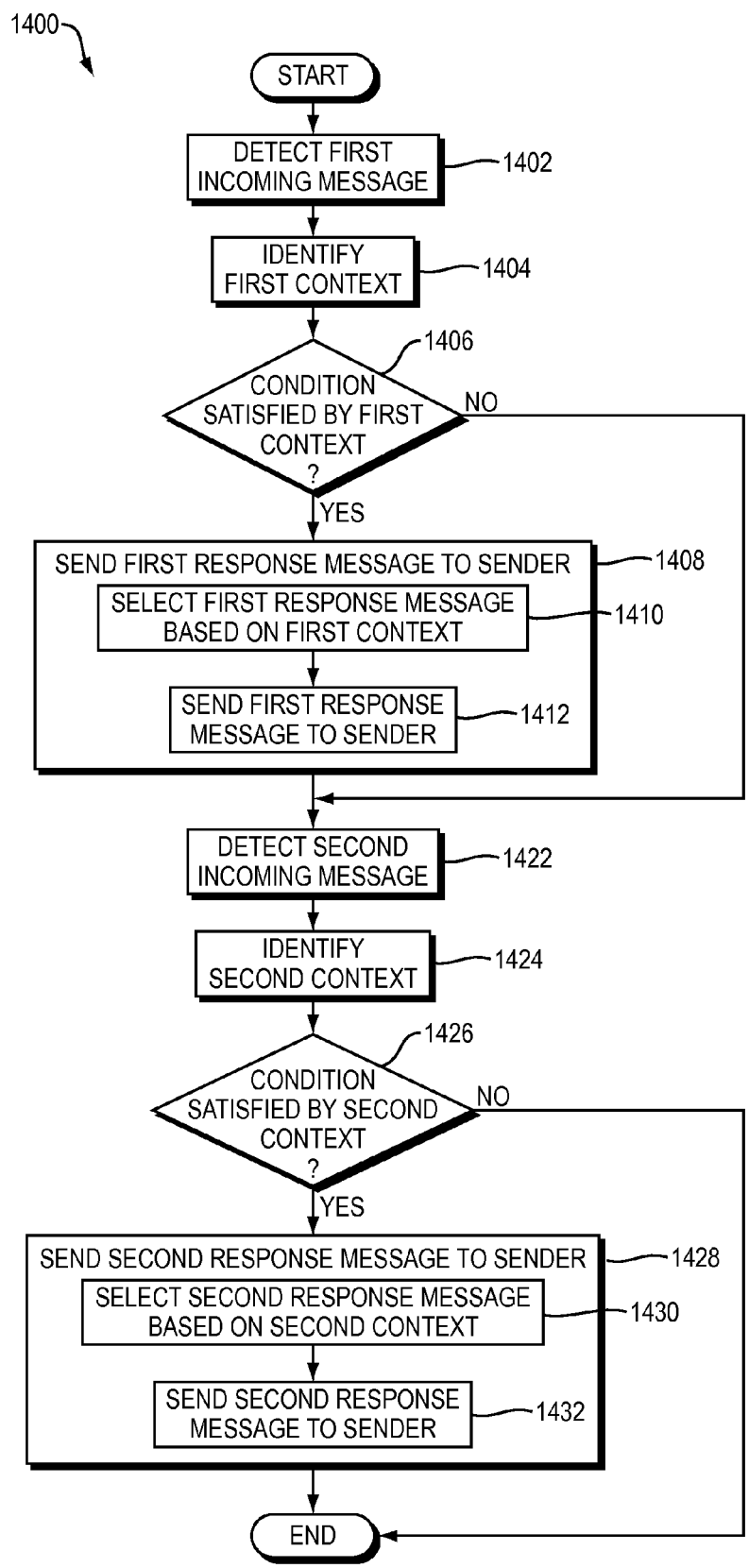
FIG. 14 is a flowchart of a method performed by the system of FIG. 13 according to one embodiment of the present invention.

Referring to FIG. 13, a dataflow diagram is shown of a system 1300 for implementing an out of office assistant, referred to more generally herein as an auto-responder, according to one embodiment of the present invention. Referring to FIG. 14, a flowchart is shown of a method 1400 performed by the system 1300 according to one embodiment of the present invention.

A sender 1350 sends a first incoming message 1302a. The sender 1350 may, for example, be a person, a computer, or a software application. The first incoming message 1302a may identify the sender 1350 in any of a variety of ways, such as by including or referencing an identifier of the sender 1350, such as an email address, telephone number, or IP address of the sender 1350. These are merely examples of ways in which the first incoming message 1302a may be associated with the sender 1350.

The incoming message 1302a may be addressed to a recipient 1352. The recipient 1352 may, for example, be a person, a computer, or a software application. The first incoming message 1302a may identify the recipient 1352 in any of a variety of ways, such as by including or referencing an identifier of the recipient 1352, such as an email address, telephone number, or IP address of the recipient 1352. These are merely examples of ways in which the first incoming message 1302a may be associated with the recipient 1352.

The first incoming message 1302a is an "incoming" message from the perspective of the recipient 1352. For example, the first incoming message 1302a may be received by, or attempted to be transmitted to, a server (e.g., email server or text message server) associated with the recipient 1352, a device associated with (e.g., owned and/or operated by) the recipient 1352, a software application (e.g., an email client application, text message client application, or VoIP client application) associated with the recipient 1352, or a user account (e.g., email account text message account, telephone number, VoIP handle, or social networking account) associated with the recipient 1352.

The system 1300 includes a message detection module 1304, which detects the first incoming message 1302a (FIG. 14, operation 1402). The message detection module 1304 may generate message detection output 1306a in response to the detection. The message detection output 1306a may, for example, indicate that the message detection module 1304 has detected the first incoming message 1302a. Additionally or alternatively, the message detection output 1306a may include some or all of the first incoming message 1302a and/or data derived from the first incoming message 1302a.

The system 1300 also includes context data 202a, which may include some or all of the context data 202 of FIG. 2 at a first time, such as the time at which the message detection module 1304 detects the first incoming message 1302a. For example, the context data 202a may include data representing the current context of the recipient 1352 at the first time. The system 1300 also includes an auto-response activation module 1308, which identifies (e.g., receives as input) the context data 202a (FIG. 14, operation 1404).

The auto-response activation module 1308 also determines whether a condition 1309 is satisfied by the context data 202a (FIG. 14, operation 1406). The condition 1309 may be of any kind disclosed herein, such as a condition associated with a profile, such as a system profile, a device profile, or a profile of the recipient 1352. For example, the auto-response activation module 1308 may, in operation 1406, determine whether:

- the first time falls within a first time period (such as a time period of an appointment in the recipient 1352's calendar, or a time that is before the expiration of a timer, such as a timer initiated in response to input from the recipient 1352);
- the first incoming message 1302a is transmitted via a particular communication mode (e.g., an email communication mode, a text message communication mode, or a voice call communication mode);
- a task performed by a device associated with the recipient 1352 at the first time satisfies the condition 1309;
- a location of a device associated with the recipient 1352 at the first time satisfies the condition 1309;
- a velocity of a device associated with the recipient 1352 at the first time satisfies the condition 1309;
- a profile associated with the recipient 1352 is active.

The auto-response activation module 1308 generates auto-response activation output 1310a indicating whether the condition 1309 is satisfied by the context data 202a.

Operation 1406 may include determining whether the message detection output 1306a satisfies the condition 1309. For example, the auto-response activation module 1308 may determine whether the first incoming message 1302a satisfies the condition 1309.

The auto-response activation module 1308 need not, however, receive as input or otherwise take into account the message detection output 1306a or the first incoming message 1302a when determining whether the condition 1309 is satisfied by the context data 202a. For example, the auto-response activation module 1308 may, in operation 1406, determine whether a subset of the context data 202a satisfies the condition 1309, where the subset does not include data representing any data or metadata of the first incoming message 1302a. For example, the subset may not include data representing any time associated with the first incoming message 1302a, such as the first incoming message 1302a's receipt time. As a result, the auto-response activation module may determine whether the condition 1309 is satisfied by the context data 202a independently of the receipt time of the first incoming message 1302a.

If the auto-response activation module 1308 determines that the condition 1309 is satisfied by the context data 202*a* then, in response to the determination, a response message sending module 1318 in the system 1300 may send a first response message 1316*a* to the sender 1350 (FIG. 14, operation 1408). The first response message 1316*a* may be selected and sent in any of a variety of ways. FIGS. 13 and 14 illustrate one example of a way in which the first response message 1316*a* may be selected and sent, but this example does not constitute a limitation of the present invention. In particular, although in the example of FIGS. 13 and 14 the first response message 1316*a* is dependent on and may vary based on the context data 202*a*, this is merely an example and does not constitute a limitation of the present invention. Alternatively, for example, some or all of the first response message 1316*a* may be fixed and therefore be independent of the context data 202*a*.

The system 1300 includes an auto-response message generation module 1312, which may select the first response message 1316*a* based on the context data 202*a* (FIG. 14, operation 1410). The response message sending module 1318 may then send the selected first response message 1316*a* to the sender 1350 (FIG. 14, operation 1412). Note that although operations 1408 and 1412 both involve sending the first response message 1316*a* to the sender 1350, this does not imply that the first response message 1316*a* is sent twice. Rather, FIG. 14 illustrates that, in one embodiment of the present invention, the overall operation of sending 1408 may include first selecting 1410 the first response message 1316*a* and then sending 1412 the first response message 1316*a*.

Some or all of operations 1402-1412 may be repeated for additional incoming messages. For example, assume that, after the sender 1350 sends the first incoming message 1302*a*, the sender 1350 sends a second incoming message 1302*b*, which may have any of the characteristics of the first incoming message 1302*a* described above. The content (data and/or metadata) of the second message 1302*b* may be the same as or differ from the content (data and/or metadata) of the first message 1302*a*. For ease of explanation but without limitation, in the following example the second incoming message is associated with (e.g., addressed to) the recipient 1352. The techniques disclosed herein, however, may alternatively be applied if the second incoming message 1302*b* is sent to a recipient other than the recipient 1352. Similarly, the techniques disclosed herein may alternatively be applied if the second incoming message 1302*b* is sent by a sender other than the sender 1350.

The message detection module 1304 detects the second incoming message 1302*a* (FIG. 14, operation 1422). The message detection module 1304 may generate message detection output 1306*b* in response to the detection. The message detection output 1306*b* may, for example, indicate that the message detection module 1304 has detected the second incoming message 1202*b*. Additionally or alternatively, the message detection output 1306*b* may include some or all of the second incoming message 1302*b* and/or data derived from the second incoming message 1302*b*.

The system 1300 also includes context data 202*b*. For example, context data 202*a* of FIG. 13 may represent a state of (or record in) the context data 202 of FIG. 2 at a first time, such as the time at which the message detection module 1304 detects the first incoming message 1302*a*, and the context data 202*b* of FIG. 13 may represent a state of (or record in) the context data 202 of FIG. 2 at a second time, such as the time at which the message detection module 1304 detects the second incoming message 1302*b*. The auto-response activation module 1308 identifies (e.g., receives as input) the context data 202*b* (FIG. 14, operation 1424).

The auto-response activation module 1308 determines whether condition 1309 is satisfied by the context data 202*b* (FIG. 14, operation 1426). The auto-response activation module 1308 generates auto-response activation output 1310*b* indicating whether the condition 1309 is satisfied by the context data 202*b*.

Operation 1426 may include determining whether the message detection output 1306*b* satisfies the condition 1309. For example, the auto-response activation module 1308 may determine whether the second incoming message 1302*b* satisfies the condition 1309.

The auto-response activation module 1308 need not, however, receive as input or otherwise take into account the message detection output 1306*b* or the first incoming message 1302*b* when determining whether the condition 1309 is satisfied by the context data 202*b*. For example, the auto-response activation module 1308 may, in operation 1426, determine whether a subset of the context data 202*b* satisfies the condition 1309, where the subset does not include data representing any data or metadata of the second incoming message 1302*b*. For example, the subset may not include data representing any time associated with the second incoming message 1302*b*, such as the second incoming message 1302*b*'s receipt time. As a result, the auto-response activation module may determine whether the condition 1309 is satisfied by the context data 202*b* independently of the receipt time of the second incoming message 1302*b*.

If the auto-response activation module 1308 determines that the condition 1309 is satisfied by the context data 202*b* then, in response to the determination, the response message sending module 1318 may send a second response message 1316*b* to the sender 1350 (FIG. 14, operation 1428). The second response message 1316*b* may be selected and sent in any of the variety of ways disclosed above in connection with selection and sending of the first response message 1316*a*.

Auto-response message generation module 1312 may select the second response message 1316*b* based on the context data 202*b* (FIG. 14, operation 1430). The response message sending module 1318 may then send the selected second response message 1316*b* to the sender 1350 (FIG. 14, operation 1432).

As the description above implies, if the context data 202 changes (e.g., if context data 202*a* differs from context data 202*b*), the outcomes produced by operations 1402-1412 may differ from the outcomes produced by operations 1422-1432. For example, the system 1300 may send the first response message 1316*a* in response to the first context data 202*a*, but not send the second response message 1316*b* in response to the second context data 202*b*. As another example, the first response message 1316*a* may differ from the second response message 1316*b* based on differences between the first context data 202*a* and the second context data 202*b*. These are merely examples, however, and do not constitute limitations of the present invention. Alternatively, for example, the first response message 1316*a* may not differ from the second response message 1316*b*.

The auto-response activation module 1308 is optional. For example, if the auto-response activation module 1308 is omitted from the system 1300, then the auto-response message generation module 1312 and the response message sending module 1318 may perform the operations disclosed herein whether or not the context data 202*a* satisfies the condition 1309, and whether or not the context data 202*b* satisfies the condition 1309.

The auto-response message generation module 1312 may select the first and second response messages 1316a-b in any of a variety of ways. Although for ease of explanation the description below will describe examples of ways in which the first response message 1316a may be selected, the same techniques may be applied to select the second response message 1316b. The auto-response message generation module 1312 may, for example select the first response message 1316a independently of content of the first incoming message 1302a. Such content may include, for example, any one or more of the following: data identifying the sender 1250 (e.g., the sender's email address and/or IP address), subject of the message 1302a, and body of the message 1302a.

The auto-response message generation module 1312 may select the first response message 1316a from a plurality of response messages based on the context data 202a. The auto-response message generation module 1312 may, for example, have access to a repository (not shown) of response messages, such as response messages previously input by a user, such as the recipient 1352, and then select the first response message 1316a from such a repository.

Alternatively, for example, the auto-response message generation module 1312 may generate the first response message 1316a based on the context data 202a. The auto-response message generation module 1312 may, for example, include data derived from the context data 202a in the first response message 1316a. For example, if the context data 202a indicates that the recipient 1352 is scheduled to be in a meeting until 4:00 pm, the auto-response message generation module 1312 may include the text "4:00 pm" in the first response message 1316a. For example, the first response message 1316a may be, "I am in a meeting until 4:00 pm and will return your message as soon as possible after the meeting is over."

As this example illustrates, the auto-response message generation module 1312 may also include data not derived from the context data 202a in the first response message 1316a. In the example above, the text "I am in a meeting until" and "and will return your message as soon as possible after the meeting is over" are examples of data that are included in the first response message 1316a and which are not derived from the context data 202a.

Such a message, which includes both data derived from the context data 202a and data not derived from the context data 202a, may, for example, be generated by the auto-response message generation module 1312 as follows. The system 1300 may include an auto-response message template 1314. Although only one auto-response message template 1314 is shown in FIG. 13, the system 1300 may include any number of auto-response message templates.

In general, the auto-response message template 1314 contains both fixed content specification data and variable content specification data. The fixed content specification data specifies content that is independent of context. In the example above, the text "I am in a meeting until" and "and will return your message as soon as possible after the meeting is over" are examples of fixed content specification data. The variable content specification data specifies content that varies depending on context.

The auto-response message template 1314 may take any of a variety of forms. For example, the auto-response message template 1314 may take the form of a text string in which the fixed content specification data is represented by non-delimited text and in which the variable content specification data is represented by one or more tokens in the form of delimited text. An example of such a text string is the following: "I am in a meeting until <CurrentAppointment.EndTime> and will return your message as soon as possible after the meeting is over." In this example, the token "<CurrentAppointment.EndTime>" is delimited text (which is delimited by the delimiters "<" and ">") representing the end time of the current appointment in the calendar of the recipient 1352 (e.g., the appointment occurring at the time of detection of the first incoming message 1302a).

To generate the first response message 1316a based on the context data 202a and the auto-response message template 1314, the auto-response generation module 1312 may make a copy of the auto-response message template 1314 and substitute, for each token in the template 1314, data derived from the context data 202a and the token. In the example above, the text "4:00 pm" is an example of data derived from the context data 202a and the token "<CurrentAppointment.EndTime>". As a result, the auto-response message generation module 1312 may include, in the first response message 1316a: (1) data derived from the fixed context specification data independently of the context data 202a (e.g., the text "I am in a meeting until" and "and will return your message as soon as possible after the meeting is over"); and (2) data derived from the variable content specification data and the context data 202a.

The system 1300 may generate or otherwise obtain the auto-response message template 1314 in any of a variety of ways. For example, a user (such as the recipient 1352) may provide input representing the auto-response message template 1314, thereby enabling the system 1300 to generate the template 1314 from such user input.

As mentioned above, the auto-response generation module 1312 may select the first response message 1316a based on some or all of the context data 202a. For example, the auto-response generation module 1312 may select the first response message 1316a based on one or more of the following: a time associated with the first context data 202a (e.g., the time at which the first incoming message 1302a is detected), an appointment associated with the recipient 1352, a communication mode via which the first incoming message 1302a is transmitted (e.g., an email communication mode, a text message communication mode, or a voice call communication mode), an identifier associated with the sender 1250, a task performed by a device associated with the recipient 1352 at the first time (e.g., composing a message from the recipient 1352 or manifesting a message to the recipient 1352), a location of the recipient 1352 at the first time, and a velocity of the recipient 1352 at the first time.

As described above, the content of the first response message 1316a may vary depending on the context data 202a. As particular examples:

- If the first incoming message 1302a is determined to be transmitted via an email communication protocol, then first content may be selected and included within the first response message 1316a. If the first incoming message is not determined to be transmitted via an email communication protocol, then second content may be selected and included within the first response message 1316a, wherein the first content differs from the second content.
- If the first incoming message 1302a is determined to be transmitted via a text message protocol, then first content may be selected and included within the first response message 1316a. If the first incoming message is not determined to be transmitted via a text message protocol, then second content may be selected and included within the first response message 1316a, wherein the first content differs from the second content.
- If the first incoming message 1302a is determined to be transmitted via a voice communication protocol, then first content may be selected and included within the first response message 1316a. If the first incoming message is not determined to be transmitted via a voice communication protocol, then second content may be selected and included within the first response message 1316a, wherein the first content differs from the second content.

The first response message 1316a may be transmitted via the same or different communication mode as the first incoming message 1302a. For example, if the sender 1350 sends the first incoming message 1302a via a first communication mode, then the response message sending module 1318 may send the first response message 1316a to the sender 1350 via the first communication mode, where the first communication mode may, for example, be an email communication mode, a text message communication mode, or a voice call communication mode.

Alternatively, for example, if the sender 1350 sends the first incoming message 1302a via a first communication mode, then the response message sending module 1318 may send the first response message 1316a to the sender 1350 via a second communication mode that differs from the first communication mode, where the first communication mode may, for example, be an email communication mode, a text message communication mode, or a voice call communication mode, and wherein the second communication mode may, for example, be an email communication mode, a text message communication mode, or a voice call communication mode.

The system 1300 may perform one or more actions in addition to sending the first response message 1316a to the sender 1350. For example, the system 1300 may perform such additional actions in response to determining that the context data 202a satisfies the condition 1309. One example of such additional actions are that: (1) the auto-response message generation module 1312 may generate a derived message (not shown) based on the first incoming message 1302a (such as a copy of the first incoming message 1302a), and (2) the response message sending module 1318 may transmit the derived message to a second recipient (not shown) via a second communication mode that differs from the first communication mode. Such additional actions may be useful, for example, for notifying an assistant of the recipient 1352 that the first incoming message 1302a has been sent to the recipient 1352 in the recipient 1352's absence, by effectively forwarding the first incoming message 1302a (or a message derived therefrom) to the assistant.

Another example of an additional action that the system 1300 may perform is to allow the first incoming message 1302a to be transmitted and/or manifested to the recipient 1352. Such allowance may, for example, include an affirmative action performed by the system 1300, such as transmitting and/or manifesting the first incoming message 1302a to the recipient 1352, possibly via a different communication mode than the communication mode via which the sender 1350 transmitted the first incoming message 1302a. Alternatively, for example, such allowance may not include any affirmative action performed by the system 1300, but instead, for example, involve not taking any action to prevent the first incoming message 1302a from being transmitted and/or manifested to the recipient 1352 (e.g., by an email client application).

Another example of an additional action that the system may perform is to defer one or more of the following: transmission of the first incoming message 1302a to the recipient 1352 (e.g., to a device associated with the recipient 1352), manifestation of the first incoming message 1302a to the recipient 1352, and generation of a notification of the first incoming message 1302a to the recipient 1352.

As mentioned above, the first incoming message 1202a may be detected in a first context data 202a and the second incoming message 1202a may be detected in a second context data 202b. The first and second contexts 202a and 202b may differ from each other in any of a variety of ways. For example:
- the first context data 202a may indicate that the recipient 1352 is at a first appointment at a first time, and the second context data 202b may not indicate that the recipient 1352 is at the first appointment at a second time;
- the first context data 202a may indicate that a device associated with the recipient 1352 is performing a first task at a first time, and the second context data 202b may not indicate that the device associated with the recipient 1352 is performing the first task at a second time;
- the first context data 202a may indicate that a device associated with the recipient 1352 is at a first location at a first time, and the second context data 202b may not indicate that the device associated with the recipient 1352 is at the first location at a second time;
- the first context data 202a may indicate that a device associated with the recipient 1352 is moving at a first velocity at a first time, and the second context data 202b may not indicate that the device associated with the recipient 1352 is moving at the first velocity at a second time.

Because information about calendar appointments in the future (e.g., outside of the current sample period) may be useful, the calendar sensor 206i is not limited to generating output 208i representing calendar appointments within the current sample period. Rather, for example, the calendar sensor 206i may receive input 214i and generate output 208i representing any number of calendar appointments at any time in the past or future, such as calendar appointments occurring during the current calendar hour, day, week, or month; calendar appointments overlapping with a period including the current sample period and extending for some amount of time into the future (e.g., one minute, ten minutes, 30 minutes, one hour, or four hours); or the next appointment on the calendar (i.e., the first appointment to appear on the calendar after the current sample period, but not including any appointment that overlaps with the current sample period).

Sensor 206j is a user input sensor, which receives user input 214j and, based on input 214j, generates output 208j representing input provided by a user, such as the current user, or any of the users 122a-b of the system. User input sensor 206j may obtain data directly or indirectly from any user input device (e.g., keyboard, mouse, touchpad, touchscreen, or microphone) in response to the user providing input to such a device.

The particular context sensors 206a-j shown in FIG. 2 are merely examples and not limitations of the present invention. Embodiments of the present invention may use fewer than all of the context sensors 206a-j, sensors other than the sensors 206a-j shown in FIG. 2, or any combination thereof.

In general, any of the profiles 110, 112a-b, and 114a-c of the system 100 of FIG. 1 may be controlled by a corresponding profile controller. For example, referring to the system of FIG. 1F and the method 300a of FIG. 3A, a profile controller 140 may receive a request 142 from a requester 144 to read data from a profile 146 controlled by the profile controller 140 (operation 302), in response to which the profile controller 140 may read the requested data 148 from the corresponding profile 146 (operation 304) and provide the requested data 148 (or output based on the requested data) to the requester 144 (operation 306). The request 142 may, for example, be a request to read all of the data in the profile 146 or a request to read a specified portion of the profile 146, such as the values of one or more specified parameters in the profile 146.

Figure 1F:
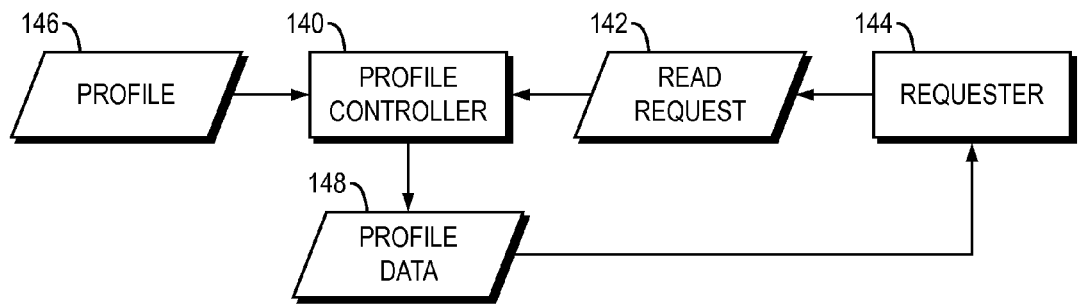
FIGS. 1F-1G are diagrams illustrating the operation of a profile controller according to one embodiment of the present invention.
Figure 1G:
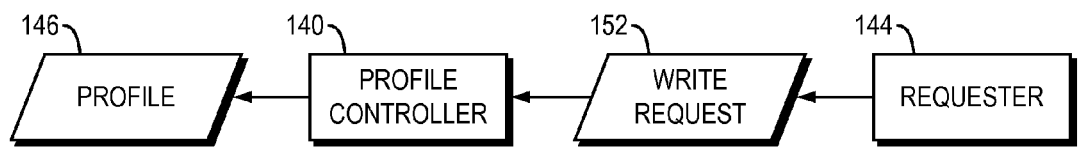

Similarly, referring to the system of FIG. 1G and the method 300b of FIG. 3B, the profile controller 140 may receive a request 152 from the requester to write data specified by the request 152 to the corresponding profile 146 (operation 312), in response to which the profile controller 140 may write the requested data to the corresponding profile 146 (operation 314), thereby modifying the profile 146 as requested by the request 152. The request 152 may, for example, be a request to write data to the entire profile 146 or a request to write data to a specified portion of the profile 146, such as a request to write a specified value to a specified parameter of the profile 146.

In the case of FIGS. 1F and 1G, the requester may, for example, be a human user, a computer program, or a hardware component. Although only the generic profile controller 140 is shown in FIGS. 1F and 1G, it should be understood that controllers specific to the system profile 110, user profiles 112a-b, and device profiles 114a-c of FIG. 1A may be implemented in accordance with the techniques disclosed in connection with FIGS. 1F and 1G.

Modifying (e.g., writing a value to) a profile may cause changes to be made outside of the profile. For example, a device profile may include a parameter whose current value represents a current state of a feature of the device associated with the device profile. If the profile controller 140 changes the value of such a parameter, the profile controller 140 may also make a corresponding change to the state of the feature of the associated device, or cause such a change to be made. For example, a device profile associated with a telephone may include a "ring volume" parameter whose current value represents the current ring volume of the telephone. If the profile controller 140 changes the value of the "ring volume" parameter (such as by increasing the value to a higher value), the profile controller 140 may also make a corresponding change (e.g., increase) to the device's ring volume, or cause such a change to be made. For example, the device may include a mechanism that responds automatically to any change in the device's profile by making an appropriate corresponding change to a state of a feature of the device.

In general, any of the logic modules 102a-c of the system 100 of FIG. 1 may be controlled by a corresponding logic module controller. For example, referring to the system of FIG. 1h and the method 300C of FIG. 3C, a logic module controller 160 may receive a request 162 from a requester 164 to read data from a logic module 166 controlled by the logic module controller 160 (operation 322), in response to which the logic module controller 160 may read the requested data 168 from the corresponding logic module 166 (operation 324) and provide the requested data 168 (or output based on the requested data) to the requester 164 (operation 336). The request 164 may, for example, be a request to read one or more of the condition specifiers in the logic module 166 and/or a request to read one or more of the action specifiers in the logic module 166. The output data 168, therefore, may represent one or more of the condition specifiers in the logic module 166 and/or a request to read one or more of the action specifiers in the logic module 166.

Figure 1H:
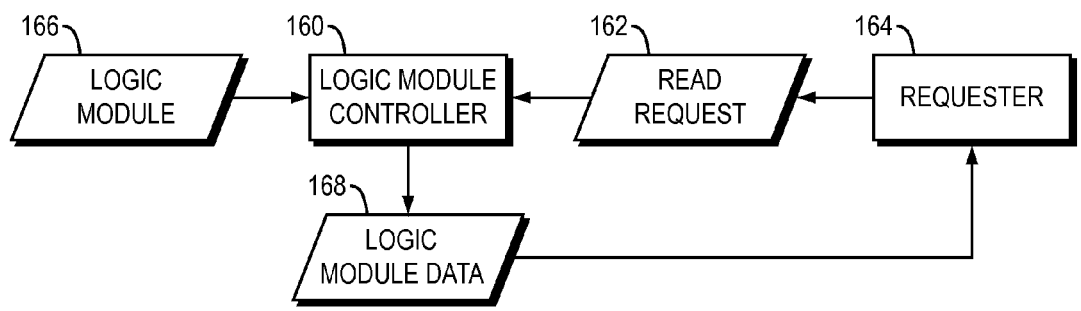
FIGS. 1H-1I are diagrams illustrating the operation of a logic module controller according to one embodiment of the present invention.
Figure 1I:
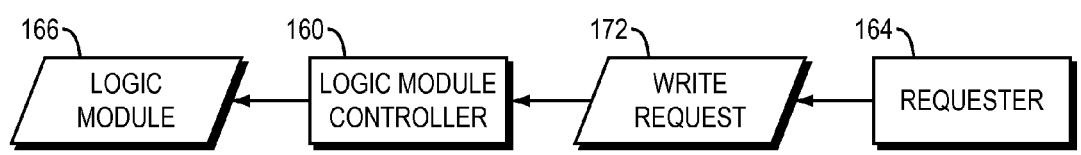
Figure 1J:
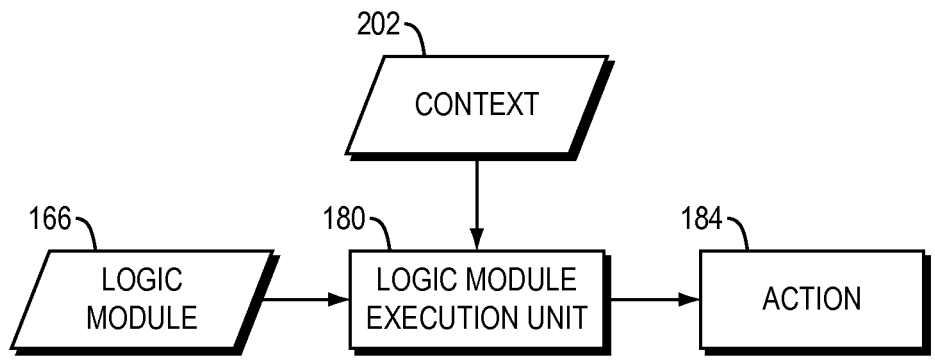
FIG. 1J is a diagram illustrating the operation of a logic module execution unit according to one embodiment of the present invention.

Similarly, referring to the system of FIG. 1I and the method 300d of FIG. 3D, the logic module controller 160 may receive a request 172 from the requester 164 to write data specified by the request 172 to the corresponding logic module 166 (operation 332), in response to which the logic module controller 160 may write the requested data to the corresponding logic module 166 (operation 334), thereby modifying the logic module 166 as requested by the request 172. The request 172 may, for example, be a request to modify/delete/add a condition specifier and/or to modify/delete/add an action specifier in the logic module 166.

In the case of FIGS. 1H and 1I, the requester 164 may, for example, be a human user, a computer program, or a hardware component. For example, the read request 162 and/or write request 172 may be input generated in response to the manual action of a human user.

Logic modules 102a-c may be applied to the context data 202 to perform the actions 106a-c specified by the logic modules 102a-c if the context data 202 satisfies the conditions 104a-c specified by the logic modules 102a-c. For example, referring to the system of FIG. 1J and the method 300e of FIG. 3E, a logic module execution unit 180 may be associated with logic module 102a. Although not shown in FIG. 1J, similar logic module execution units may be associated with logic modules 102b-c.

Logic module execution unit 180 receives some or all of context data 202 as input (operation 352). Logic module execution unit 180 may, for example, receive: (1) only a single one of the records 210a-n within context data 202 as input, such as most recently-generated record, or the record whose time field 212a represents a time that is closest to the current real time; (2) only a subset of the records 210a-n associated with a particular one of the users 122a-b; or (3) only a subset of the records 210a-n associated with a particular one of the devices 124a-c.

Logic module execution unit 180 determines whether the received context data 202 satisfies the condition specified by condition specifier 104a of logic module 102a (operation 354). If the logic module execution unit 180 determines that the received context data 202 satisfies the condition, then, in response to the determination, the logic module execution unit 180 performs the action specified by action specifier 106a of logic module 102a, or causes the action to be performed (operation 356). As mentioned above, action specifier 106a may specify an action type or otherwise specify an action in generic terms, in which case operation 356 may include: (1) identifying (e.g., based on the received context data 202) one or more acts; and (2) performing the identified act(s) to implement the action specified by action specifier 106a. As a result, performing operation 356 multiple times for the same action specifier 106a may cause the logic module execution unit 180 to perform different acts each time, based on differences in the context data 202 received each time.

If the logic module execution unit 180 does not determine that the received context data 202 satisfies the condition specified by condition specifier 104a, then the logic module execution unit 180 does not perform the action specified by action specifier 106a of logic module 102a (operation 358). The method 300e of FIG. 3E is an example of "applying" a logic module to context data, as the term "applying" is used herein.

The action 184 performed in response to the determination that the context data 202 satisfies the condition specified by the logic module 102a may be an action that modifies a profile (e.g., a system profile, a user profile, or a device profile) or an action that modifies a logic module (e.g., a condition specifier or an action specifier of a logic module). For example, the logic module execution unit 180 may be the requester 144 in FIGS. 1F and 1G, and the action 184 may be the read request 142 (FIG. 1F) or the write request 152 (FIG. 1G). Similarly, the logic module execution unit 180 may be the requester 164 in FIGS. 1H and 1I, and the action 184 may be the read request 162 (FIG. 1H) or the write request 172 (FIG. 1I). As a result, changes in the context data 202 may automatically trigger changes in profiles and in logic modules.

As described above, a profile may be associated with one or more logic modules. A profile may be "applied" (executed) by applying (executing) some or all of the logic modules associated with the profile. For example, referring to FIG. 1K, a profile execution unit 190 is shown. The profile execution unit 190 may execute (apply) a profile 192 (which may, for example, be any of the profiles shown in FIG. 1) by performing the method 300f of FIG. 3F in response to receipt of a trigger input 196. The trigger input 196 may be any input, such as any of the sensor inputs 214a-j, any of the context data 202, or manual user input provided using any input device. For example, if the trigger input 196 is time sensor input 206a, time sensor output 208b, or time field 212a, the profile execution unit 190 may perform method 300f periodically or according to a schedule.

The method 300f identifies the profile 192 (operation 392) in any of a variety of ways. For example, if the system 100 includes only a single profile, then operation 362 may select the single profile. As another example, operation 362 may select a profile based on user input. As another example, the method 300f may loop over a plurality of profiles (e.g., all profiles in the system 100, all profiles associated with a user, or all profiles associated with a device), and select a particular one of such profiles in operation 362.

Figure 1K:
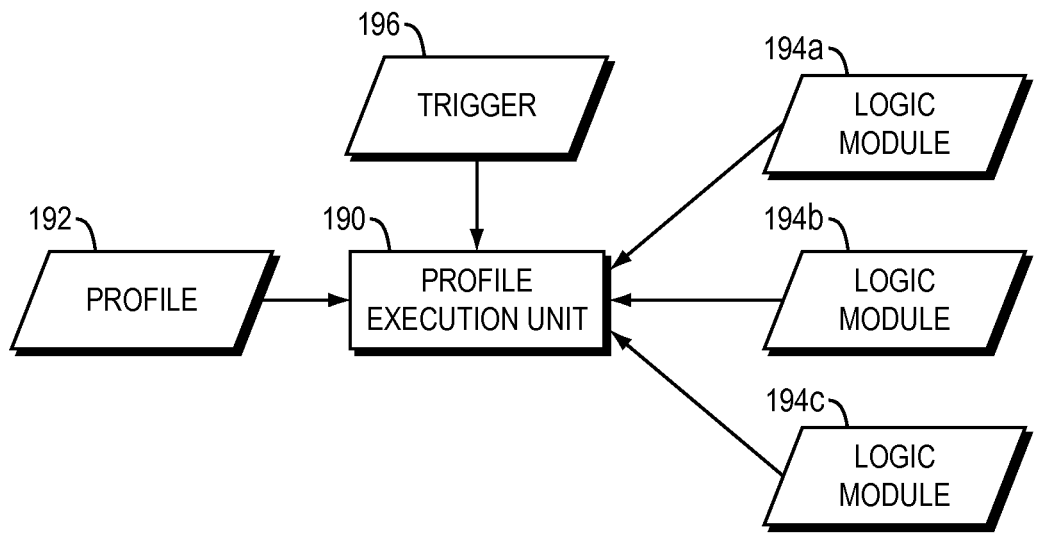
FIG. 1K is a diagram illustrating the operation of a profile execution unit according to one embodiment of the present invention.

The method 300f enters a loop over all logic modules 194a-c associated with profile 192 (operation 364). Such logic modules 194a-c may be identified, for example, using associations of the kind shown in FIG. 1E. For each such logic module (three of which are shown in FIG. 1K solely for purposes of example), the method 300f applies the logic module to the context data 202 in any of the manners disclosed above in connection with FIGS. 1J and 3E (operation 366). The method 300f repeats operation 366 for any remaining logic modules associated with the current profile (operation 368). The method 300f repeats operations 364-368 for any remaining profiles (operation 370).

Optionally, the system 100 may include two types of logic modules: action logic modules and trigger logic modules. An action logic module operates in the manner disclosed above, such as in connection with FIGS. 3E and 3F. A trigger logic module, like an action logic module, may specify a condition and an action, but additionally define a trigger. For example, referring again to FIG. 1A, logic modules 102a-c are shown with optional logic module types 108a-c, respectively. Logic module type 108a indicates whether logic module 102a is an action or trigger logic module; logic module type 108b indicates whether logic module 102b is an action or trigger logic module; and logic module type 108c indicates whether logic module 102c is an action or trigger logic module.

Figure 3G:
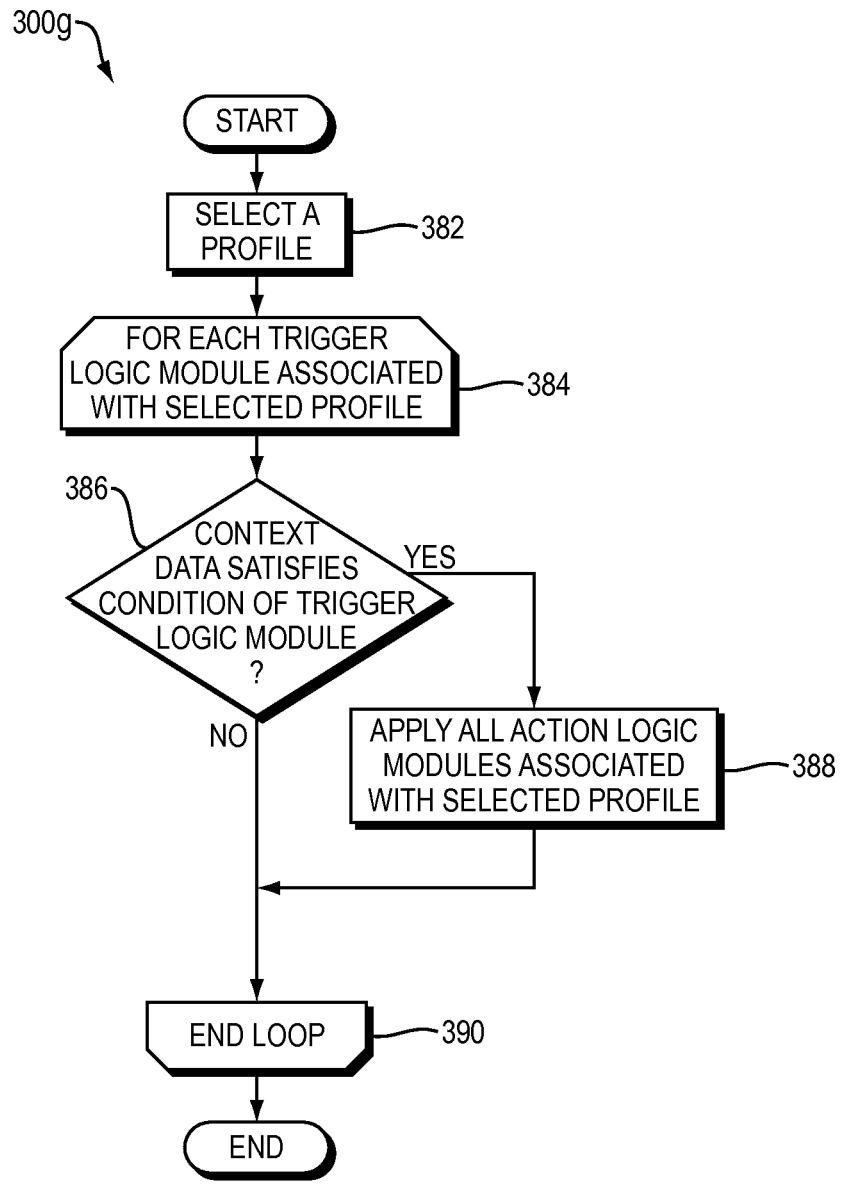

The purpose of these two logic module types may be understood by reference to their operation. Referring to FIG. 3G, a flowchart is shown of a method 300g for applying (executing) both types of profiles in the system 100. The method 300g selects a profile (operation 382) in any of the manners described above in connection with operation 362 of method 300f of FIG. 3F.

The method 300g enters a loop over any and all trigger logic modules associated with the current profile. Such logic modules may be identified, for example, using associations of the kind shown in FIG. 1E and by reference to the logic module type fields 108a-c of the logic modules 102a-c. In other words, the loop initiated at operation 384 is not a loop over all logic modules associated with the current profile, but only a loop over the trigger logic modules associated with the current profile. For each such trigger logic module, the method 300g determines whether the condition defined by the trigger logic module is satisfied by the context data 202, in any of the manners described above in connection with operation 354 of method 300e of FIG. 3E (operation 386). If the context data 202 satisfies the condition of the current trigger logic module, then the method 300g applies all action logic modules associated with the current profile, in any of the manners disclosed above in connection with FIGS. 1J and 3E (operation 388). Otherwise, the method 300g does not apply the action logic modules associated with the current profile to the context data 202. The method 300g repeats the operations described above for any remaining trigger logic modules associated with the current profile (operation 390).

As the description above makes clear, the use of trigger logic modules may eliminate the need to apply (execute) action logic modules that do not, or are not likely to, satisfy the context data 202. As a result, the use of trigger logic modules may enable embodiments of the present invention to be implemented more efficiently than embodiments which require that all logic modules associated with a profile be applied to the context data 202.

For example, as will be described in more detail below, a profile may be associated with a trigger logic module that defines a condition that is satisfied only when a message is detected, or only when a message transmissible via a particular communication mode is transmitted. The same profile may be associated with one or more action logic modules that define conditions that may be satisfied by particular features of messages transmissible via the particular communication mode. Use of a trigger logic module eliminates the need to apply the action logic modules in circumstances in which their conditions are not satisfied.

The various components shown in FIGS. 1A-1K and FIG. 2, and the various methods shown in FIGS. 3A-3G, may be implemented in various physical systems. For example, such components and methods may be integrated into a single device or distributed across multiple devices in any of a variety of ways. For example, FIG. 4A shows a system 400a in which various functions disclosed herein are implemented in a single device 402, such as a desktop computer, handheld computer, cell phone, or other computing device or communication device.

Figure 4A:
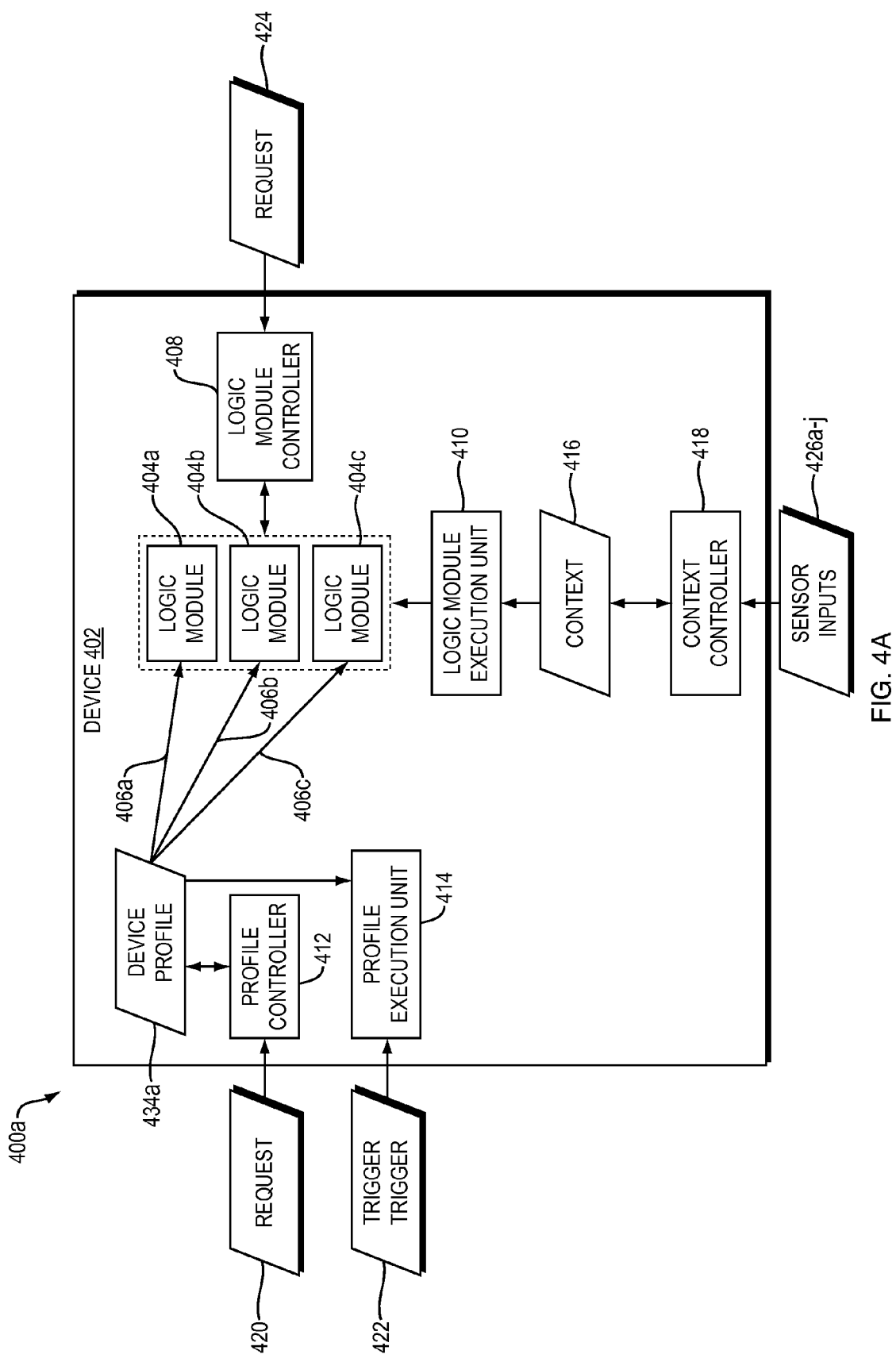
FIG. 4A is a diagram of a computer control system implemented on a single device according to one embodiment of the present invention.

For example, referring to FIG. 4A, a diagram is shown of one example of a system 400a that implements various features disclosed above. The system 400a includes a device 402, which includes a single device profile 404. The device 402 also includes three logic modules 404a-c which are associated 406a-c with device profile 404. The device 402 includes a single logic module controller 408 for controlling the logic modules 404a-c, and a single logic module execution unit 410 for executing all of the logic modules 404a-c. The device 402 includes a profile controller 412 for controlling the device profile 404, and a profile execution unit 414 for executing the device profile 404. The device 402 includes context data 416 and a context controller 418 for controlling the context data 416.

The elements of the device 402 may operate in the manner previously described. For example, profile controller 412 may read data from and write data to the device profile 404 in response to requests 420, the profile execution unit 414 may execute the device profile 404 in response to a trigger 422, logic module controller 408 may read data from and write data to logic modules 404a-c in response to requests 424, logic module execution unit 410 may execute the logic modules 404a-c based on the context data 416, and context controller 418 may read data from and write data to the context data 416 based on sensor inputs 426.

Although device 402 may receive inputs (e.g., request 420, trigger 422, request 424, and sensor inputs 426) from any source, one such source is a human user who provides one or more such inputs manually using any one or more input devices within and/or connected to the device 402. Any of such inputs may, for example, be generated in response to and based on one or more gestures by the human user, such as a single gesture (e.g., a single mouse click, a single keypress, a single touch, or a single spoken word). The same is true of any inputs disclosed herein in connection with any device.

Figure 4B:
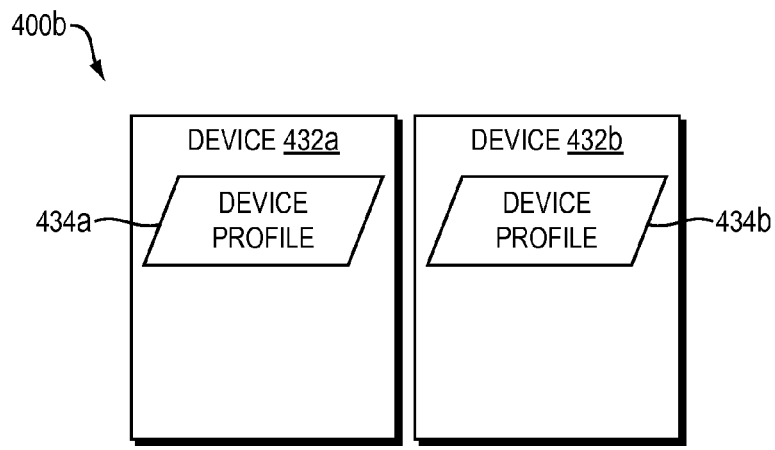
FIG. 4B is a diagram illustrating a physical implementation of device profiles according to one embodiment of the present invention.

As another example, referring to FIG. 4B, a diagram is shown of one example of another system 400b that implements various features disclosed above. The system 400a includes two devices 432a and 432b, each of which may contain the same or similar components as the device 402 of FIG. 4A. Therefore, for ease of illustration, various components from FIG. 4A are not shown within the devices 432a-b of FIG. 4B. Instead, FIG. 4B illustrates that device 432a includes a first device profile 434a and device 432b includes a second device profile 434b that differs from the first device profile 432a. The first device profile 434a may, for example, be associated with a first set of logic modules (not shown), while the second device profile 434b may, for example, be associated with a second set of logic modules (not shown) that differs from the first set of logic modules. As a result, even if the two devices 432a-b are provided with the same context data 416 as input, the two devices 432a-b may take different actions in response to such context data 416 due to differences in their device profiles 434a-b. Alternatively, for example, the devices 432a-b may contain identical device profiles, or no device profiles, but contain user profiles that differ from each other, thereby causing the devices 432a-b to take different actions in response to the same context data 416.

Figure 4C:
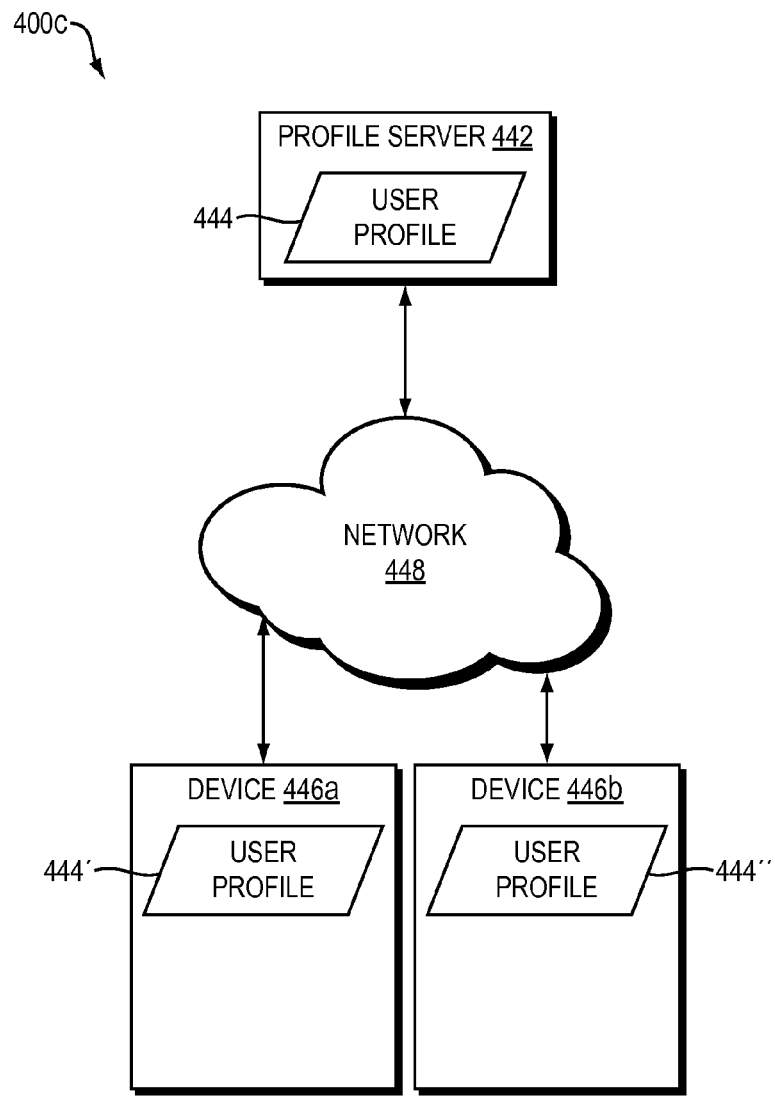
FIG. 4C is a diagram illustrating a physical implementation of user profiles according to one embodiment of the present invention.

As another example, referring to FIG. 4C, a diagram is shown of one example of a system 400c that implements various features disclosed above. The system 400c includes a profile server 442, which may be any kind of computing device, and which includes a user profile 444 associated with a human user (not shown). The system 400c also includes devices 446a and 446b, each of which may contain the same or similar components as the device 402 of FIG. 4A. Device 446a includes user profile 444', which is identical in content to user profile 444 on the server 442. Similarly, device 446b includes user profile 444", which is identical in content to user profile 444 on server 442. If a modification is made to the user profile 444 at the server 442, the server 444 may, in response, automatically transmit signals over a network 448 (such as the Internet) to both device 446a and device 446b sufficient to cause the modification to be reflected in user profiles 444' and 444". Similarly, if a modification is made to the user profile 444' at the device 446a, the device 446a may, in response, automatically transmit signals over network 448 to server 442 sufficient to cause the modification to be reflected in user profile 444; in response to which the server 442 may automatically transmit signals over network 448 to device 446b sufficient to cause the modification to be reflected in user profile 444". The system 400c may take similar action in response to a modification made to user profile 444".

Similar techniques may be applied to system profiles and device profiles that are replicated across multiple devices. Similar techniques may also be applied to profiles of any kind that are distributed across multiple devices, i.e., in which a first portion of one profile is stored on and applied by a first device and in which a second portion of the same profile is stored on and applied by a second device.

As these examples illustrate, a "device" profile may, but need not, be stored on the device associated with the profile. For example, the device profile associated with a device may be stored solely on a server, which contains a device profile controller that controls the device profile and uses the output of the device profile to control the device accordingly. As another example, the server may contain the device profile, while the device may contain the device profile controller, which may access the device profile remotely at the server.

Various execution modules, such as the profile controller 412, profile execution unit 414, context controller 418, logic module controller 408, and logic module execution unit 410, may also be replicated across multiple devices (including, e.g., clients and/or servers) and/or distributed across multiple devices. In particular, any particular execution module may execute on one device but process data located on another device. For example, in the system 400c of FIG. 4C, the profile server 442 may contain a user profile controller (not shown) that controls both the user profile 444 and the user profiles 444' and 444", in which case the devices 446a and 446b may not include user profile controllers. Similarly, any particular execution module may execute on one device and provide output to another device.

One or more of the associations disclosed herein, such as the associations 136a-g shown in FIG. 1E, may be implemented in records tangibly stored on one or more non-transitory computer-readable media. For example, in FIG. 4A, associations 406a-c between device profile 404 and logic modules 404a-c may be stored on one or more computer-readable media within the device 402. Associations may be replicated and/or distributed across devices. Associations between two components may be implemented by storing one element within the other. For example, an association between a logic module and a profile may be implemented by storing the logic module (or a copy thereof) within the profile.

Any profile or logic module may have an activation state. An activation state has is a parameter that has two permissible value: active and inactive. For ease of explanation, an activation state whose value is active is referred to herein as an active activation state, while an activation state who value is inactive is referred to herein as an inactive activation state. Similarly, a component (profile or logic module) whose activation state is active is referred to herein as an active component, while a component whose activation state is inactive is referred to herein as an inactive component. If a component is active, then the component's controller applies (executes) the component in any of the ways disclosed herein. If a component is inactive, then the component's controller may either not apply (execute) the component, or may apply the component but not generate any output from the component. For example, if a logic module is inactive, then the logic module's controller may either not execute the logic module even if the context data satisfies the logic module's condition, or the logic module's controller may execute the logic module but not perform the action specified by the logic module even if the context data satisfies the logic module's condition.

An activation state may, for example, be implemented as a special kind of logic module condition that takes precedence over any other conditions specified by the logic module. In other words, the logic module's execution unit may, as part of determining whether the context data satisfies the logic module's conditions, treat the logic module's activation state as if it were part of the context data and determine whether the logic module's activation state is active before determining whether any of the logic module's other conditions (if any) are satisfied by the context data. As a result, if the logic module's activation state is inactive, the logic module's execution unit will not attempt to determine whether any of the logic module's other conditions are satisfied by the context data, even if one or more other conditions are satisfied by the context data.

The values of the activation states of distinct components may differ from each other. As with any other data disclosed herein, the activation state of a component may be tangibly stored in a non-transitory computer-readable medium, whether within the component itself or elsewhere. A component's controller may be used to read the value of a component's activation state and to write a value to (e.g., modify the value of) the component's activation state in any of the ways disclosed herein. For example, a component's controller may change a component's activation state from active to inactive or from inactive to active in response to manual user input, such as manual user input specifying the desired activation state value, or manual user input indicating that the activation state value should be toggled.

If multiple profiles are associated with a system, device, or user, any one or more of such profiles may be active simultaneously. It may be useful, however, for only one profile associated with a system, device, or user to be active at any particular time. In such a case, the profile that is active is referred to herein as "the active profile" or "the current profile" in connection with the system, device, or user. Embodiments of the present invention may enforce such a scheme by determining that a particular profile associated with a system, device, or user has become active and, in response to the determination, deactivating all of the other profiles associated with the system, device, or user. As described below, a profile associated with a system, device, or user may become the active profile in response to any of a variety of inputs, such as manual user input selecting the profile as the active profile.

Certain embodiments of the present invention may be used in connection with the transmission of messages. For example, the conditions specified by logic modules may be satisfied by the detection of messages, by particular message content, or by the identities of message senders and/or recipients. As another example, the actions specified by logic modules may be actions performed on messages, such as blocking, allowing, forwarding, or deferring messages.

For example, FIG. 5A shows an embodiment of a system 500a which may include any of the elements disclosed above (e.g., in FIGS. 1A-1K and FIG. 2), but which only shows elements of interest for ease of illustration. The system 500a includes a first logic module 502a and a second logic module 502b. The first logic module 502a includes one or more condition specifiers 504a and an action specifier 510a. More specifically, the first logic module 502a includes a first communication mode condition specifier 506a that specifies a condition that is satisfied by messages transmissible via a first communication mode, and the second logic module 502b includes a second communication mode condition specifier 506b that specifies a condition that is satisfied by messages transmissible via a second communication mode that differs from the first communication mode.

The first logic module 504a may, but need not, include one or more additional condition specifiers 508a that may specify any of the conditions disclosed herein. Similarly, the second logic module 504b may, but need not, include one or more additional condition specifiers 508b that may specify any of the conditions disclosed herein. Although either or both of the additional conditions 508a-b in FIG. 5A may include an activation state, FIG. 5B explicitly shows an example of a system 500b in which logic modules 502a-b contain activation states 512a-b.

The system 500a may, but need not, also include any number of additional similar logic modules, such as a third logic module 502c that includes one or more condition specifiers 504c and a third action specifier 510c. The third condition specifiers 504c may include a third communication mode condition specifier 506c that specifies a condition that is satisfied by messages transmissible via a third communication mode that differs from both the first communication mode and the second communication mode. The third logic module 504c may, but need not, include one or more additional condition specifiers 508c that may specify any of the conditions disclosed herein (including an activation state, such as the activation state 512c shown in FIG. 5C).

Each of the first, second, and third action specifiers 510a-c may specify any action. The action specified by the first action specifier 510b may differ from the action specified by the second action specifier 510b and from the action specified by the third action specifier 510c. For example, no two of the actions specified by action specifiers 510a-c may be the same as each other.

Figure 5C:
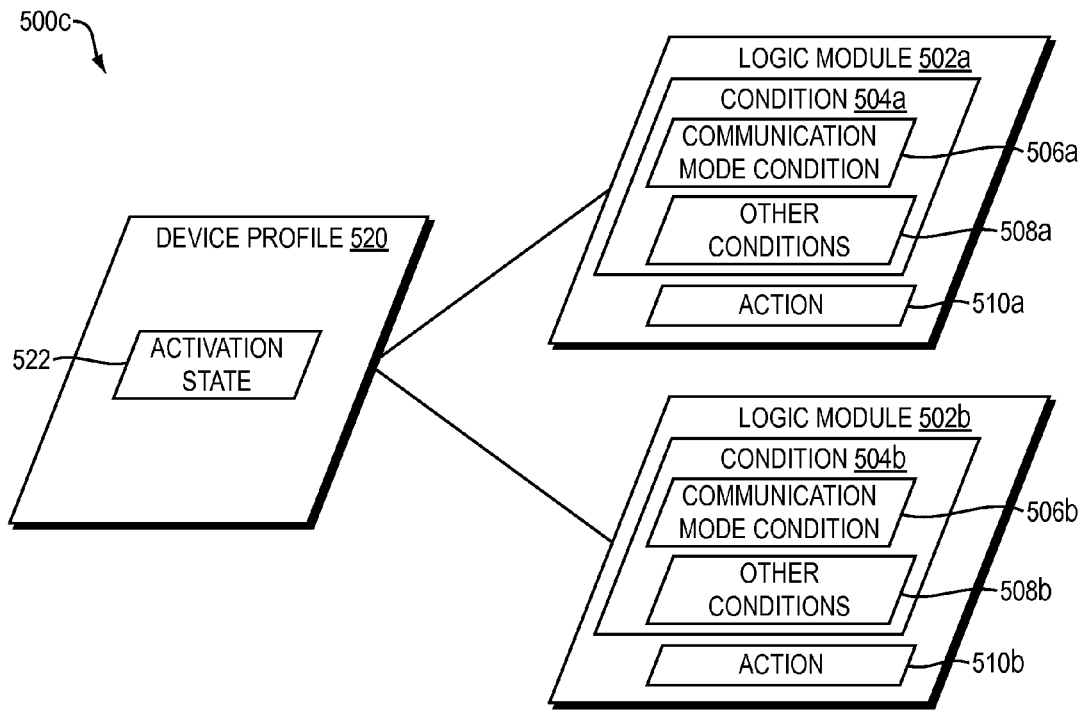

FIG. 5C shows an example of a system 500c in which a device profile 520 associated with logic modules 502a-c includes an activation state 522, but in which the logic modules 502a-c do not include activation states. As a result, when the device profile 520 is active, applying the device profile 520 necessarily includes applying the logic modules 502a-c; when the device profile 520 is inactive, applying the device profile 520 does not include applying the logic modules 502a-c.

Figure 5D:
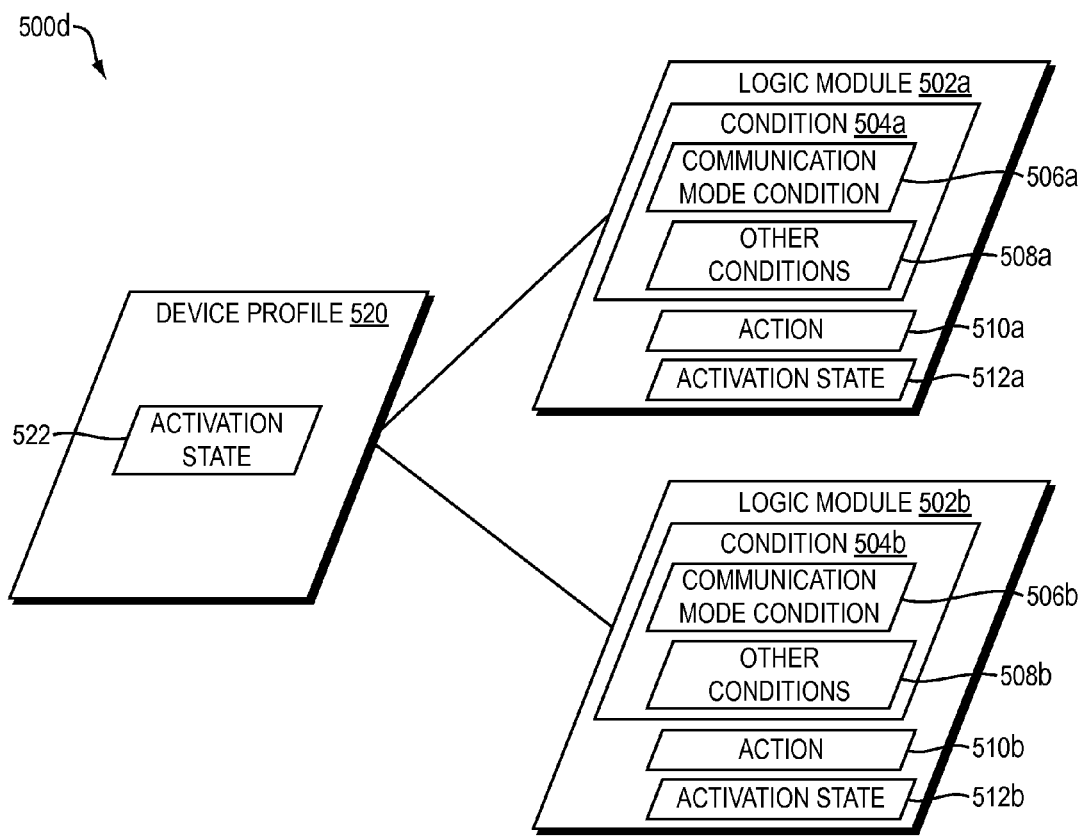

FIG. 5D shows an example of a system 500d in which a device profile 520 associated with logic modules 502a-c includes an activation state 522 (as in FIG. 5C), and in which the logic modules 502a-c include activation states 512a-c (as in FIG. 5B). As a result, when the device profile 520 is active, applying the device profile 520 includes applying only the active logic module(s) (if any) among logic modules 502a-c; when the device profile 520 is inactive, applying the device profile 520 does not include applying any of the logic modules 502a-c, even active logic modules. In other words, in the embodiment of FIG. 5D, the activation state 522 of device profile 520 overrides the activation states 512a-c of logic modules 502a-c.

Communications modes and examples thereof will be described in more detail below. Examples, however, of first and second communication modes, or of first, second, and third communication modes that may be specified by the communication mode condition specifiers disclosed above in connection with FIG. 5A are: (1) email and voice calls; (2) email and text messages; (3) voice calls and text messages; and (4) email, text messages, and voice calls.

The system 500a of FIG. 5A may, for example, be used to enable control of messages transmissible via multiple distinct communication modes. For example, as shown in FIGS. 5C and 5D, device profile 520 may be associated with two or more of the logic modules 502a-c. The techniques disclosed herein may then be used to apply the associated logic modules to messages transmissible via the device associated with the device profile, and thereby to control messages transmissible via multiple communication modes in accordance with the logic modules associated with the device profile. The same techniques may be applied if a system profile or a user profile, rather than a device profile, is associated with two or more of the logic modules 502a-c.

Figure 6A:
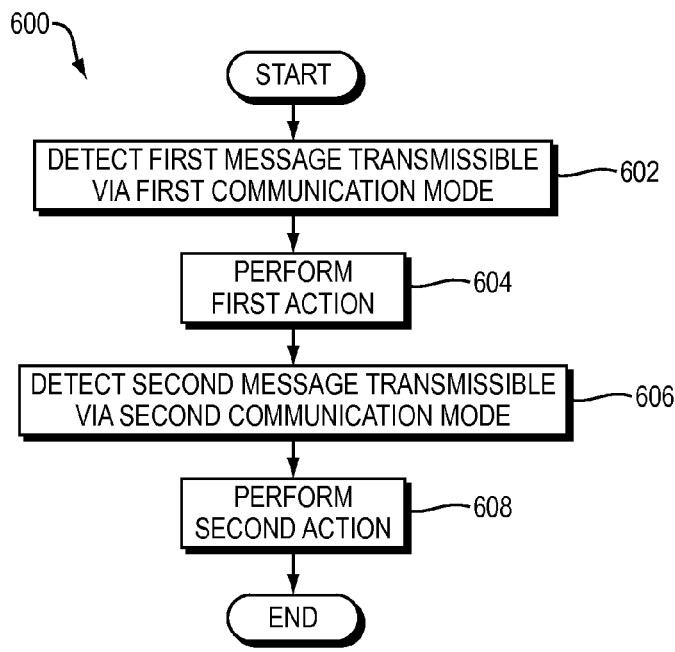
FIGS. 6A-6D are flowcharts of methods performed to execute profiles and logic modules according to embodiments of the present invention.

For example, FIG. 6A shows a flowchart of a method 600 that may be performed by the system 500a of FIG. 5A. The system 500a may detect a first message transmissible via the first communication mode (operation 602), in response to which the system 500a may perform the first action (operation 604). The system 500a may, for example, receive the first message, determine whether the first message is transmissible via the first communication mode, and perform operation 604 only if the first message is determined to be transmissible via the first communication mode. The system 500*a* may detect a second message transmissible via the second communication mode (operation 606), in response to which the system 500*b* may perform the second action (operation 608).

Figure 6B:
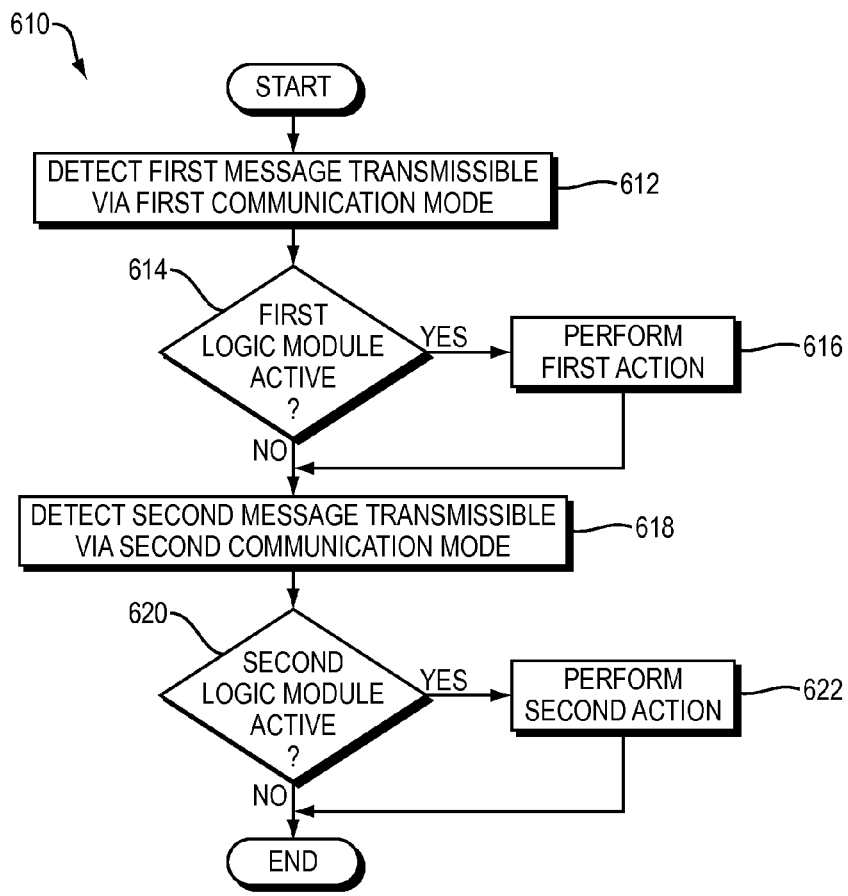

FIG. 6B shows a flowchart of a method 610 that may be performed by the system 500*b* of FIG. 5B. In the case of FIG. 5B, the system 500*b* may detect a first message transmissible via the first communication mode (operation 612). The system 500*b* may determine whether the first logic module 502*a* is active (operation 614). If the first logic module 502*a* is active, the system 500*b* may (in response to the determination) perform the first action (operation 616); otherwise, the system 500*b* may not perform the first action, even if the first message satisfies all of the conditions 504*a* of the first logic module 502*a*. The system 500*b* may detect a second message transmissible via the second communication mode (operation 618). The system 500*b* may determine whether the second logic module 502*b* is active (operation 620). If the second logic module 502*b* is active, the system 500*b* may (in response to the determination) perform the second action (operation 622); otherwise, the system 500*b* may not perform the second action, even if the second message satisfies all of the conditions 504*b* of the second logic module 502*a*.

Figure 6C:
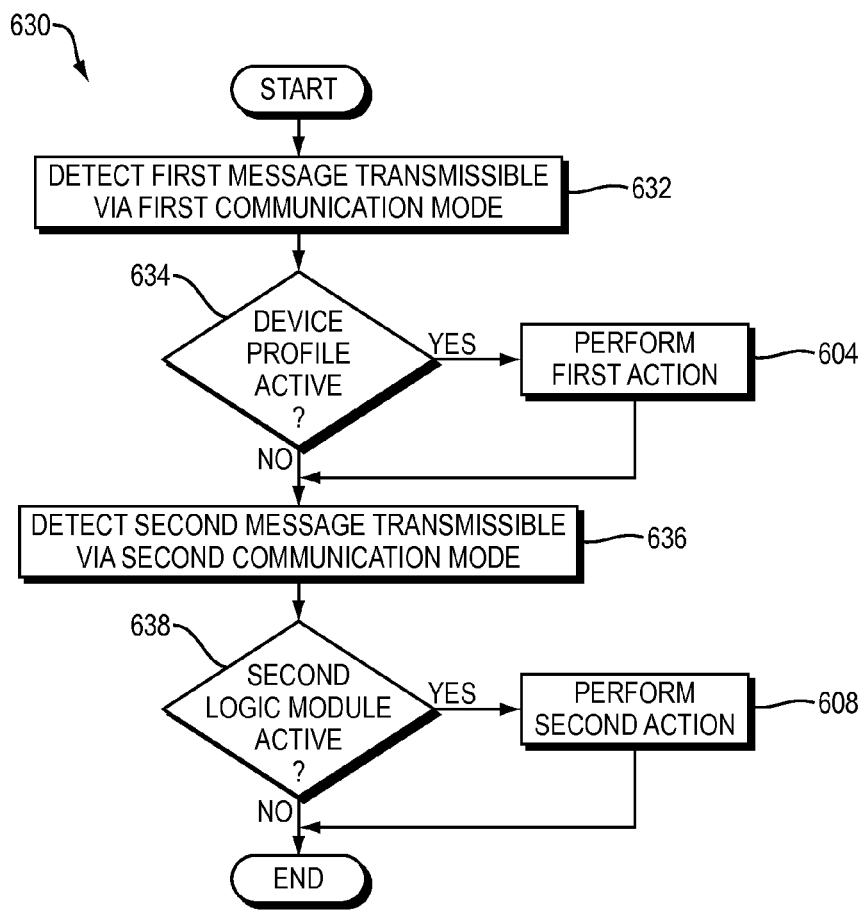

FIG. 6C shows a flowchart of a method 630 that may be performed by the system 500*c* of FIG. 5C. The system 500*c* may detect a first message transmissible via the first communication mode (operation 632). The system 500*b* may determine whether the device profile 520 is active (operation 634). If the device profile 520 is active, the system 500*c* may (in response to the determination) perform operation 604 as described above; otherwise, the system 500*c* may not perform operation 604, even if the first message satisfies all of the conditions 504*a* of the first logic module 502*a*. The system 500*c* may detect a second message transmissible via the second communication mode (operation 636). The system 500*c* may determine whether the device profile 520 is active (operation 638). If the device profile 520 is active, the system 500*c* may (in response to the determination) perform operation 608 as described above; otherwise, the system 500*c* may not perform operation 608, even if the second message satisfies all of the conditions 504*b* of the second logic module 502*a*.

The method 630 of FIG. 6C need not make multiple determinations whether the device profile 520 is active (e.g., operations 634 and 638). Instead, for example, operations 634 and 638 may be removed from method 630 and replaced with a single operation that is the same as operation 634 or 638, but which is performed before operation 632, so that operations 602-608 are not performed if the device profile 520 is determined to be inactive, even if the system 500*c* receives a message transmissible via the first communication mode or a message transmissible via the second communication mode. Similar techniques may be applied to any system disclosed herein, to any kind of profile, and to logic modules having activation states.

As yet another example, if device profile 520 is inactive, then the system 500*c* may not make any determination whether the device profile 520 is active while the device profile 520 is inactive, even if the system 500*c* receives a message transmissible via the first communication mode or a message transmissible via the second communication mode. An inactive device profile, in other words, may effectively be disabled so that the system 500*c* does not apply the device profile (e.g., determine whether the device profile's conditions are satisfied) while the device profile is inactive. Similar techniques may be applied to any system disclosed herein, to any kind of profile, and to logic modules having activation states.

Figure 6D:
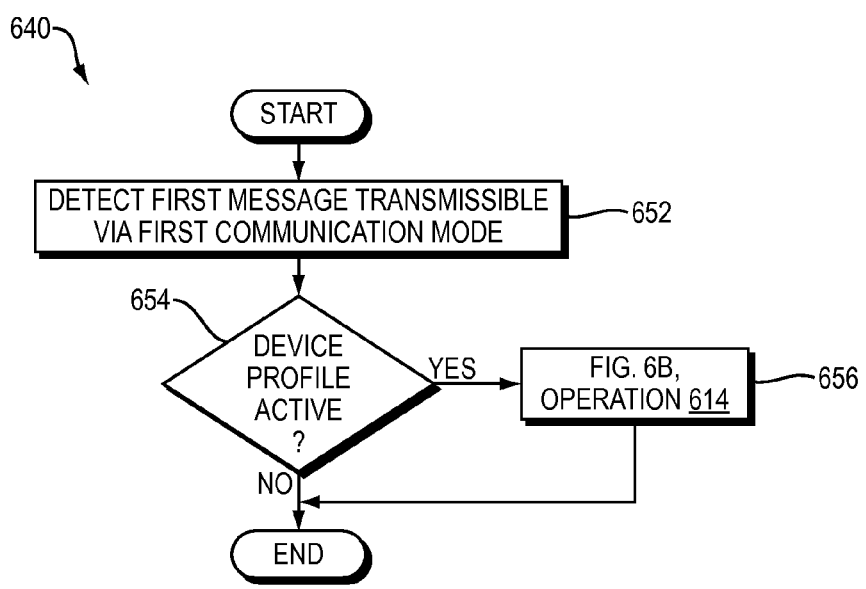

FIG. 6D shows a flowchart of a method 650 that may be performed by the system 500*d* of FIG. 5D. The system 500*d* may detect a first message transmissible via the first communication mode (operation 652). The system 500*d* may determine whether the device profile 520 is active (operation 654). If the device profile 520 is active, the system 500*d* proceed to operation 614 of FIG. 6B and perform the remainder of the method 610 of FIG. 6B (operation 656). Otherwise, the system 500*d* may not perform operation 656 and may not otherwise apply the device profile 520.

Changing activation states in the systems 500*b*-*d* of FIGS. 5B-5D may cause the systems 500*b*-*d* to change their handling of messages and other context. For example, consider the system 500*c* of FIG. 5C. If the device profile 520 is active at a first time, then the system 500*c* may, in response to receiving messages of the first and second communication modes, perform operations 602-604 and 606-608, as described above in connection with FIG. 6C. Then, if the activation state 522 of the device profile 520 is changed to inactive and the system 500*c* receives messages of the first and second communication modes, the system 500*c* may not perform operations 602-604 or 606-608, as described above in connection with FIG. 6C. The activation state 522 of the device profile 520 may, as described above, be changed in response to user input. As a result, a user may control whether the device profile 520 is active at any particular time and thereby control the manner in which the system 500*c* processes detected messages of various communication modes.

Condition specifiers, such as condition specifiers 508*a-c* in FIG. 5, may, for example, specify conditions that are satisfied by context data indicating that:

the current time is: a particular time of day, within a particular time period (e.g., 9:00 AM-5:00 PM) on any day, within a particular time period that satisfies an additional condition (e.g., 9:00 AM-5:00 PM on a weekday), within a particular day of the week, a particular day of any month (e.g., $1^{st}$ or $15^{th}$), on a holiday, within a user-specified time period (e.g., a birthday or anniversary), or within a time period delimited by a timer initiated at a previous time and having either a specified duration or a specified end time;

the current user: is a particular user (e.g., having a particular real name, user name, or other unique identifier contained within a list or satisfying other conditions), has particular privileges or access rights, or has provided credentials satisfying predetermined criteria;

the current device: is a particular device (e.g., having a particular serial number or unique identifier), is owned by or otherwise associated with a particular user or class of user, has or lacks particular communication capabilities (e.g., the ability to transmit messages via a particular communication mode), has or lacks hands-free capability (e.g., voice control), has or lacks a particular kind of output device (e.g., a touch screen or a text-to-speech reader), or has or lacks a particular kind of input device (e.g., a microphone or touchscreen);

any application executing on the current device or associated with the current user: is receiving input from a user (e.g., keyboard input or voice input), is providing output of any kind to a user, is providing message-related output to a user (e.g., manifesting a message or a notification of a message), is manifesting visual output, is manifesting auditory output, is transmitting a message, or includes means for transmitting messages (e.g., messages transmissible via one or more predetermined communication modes);

a message: is being composed by the current user; is being manifested to the current user; is being transmitted to or from the current user or any device associated with the current user; contains data (e.g., a body) satisfying predetermined criteria; contains meta-data (e.g., subject, headers) satisfying predetermined criteria; has a sender or recipient satisfying predetermined criteria; has a priority satisfying predetermined criteria; or has a time (e.g., time sent or time received) satisfying predetermined criteria;

a current or scheduled location of a device: is a particular location, is within a particular geographic area, is a particular category of location (e.g., home, work, classroom, restaurant, lecture hall, theater, vehicle, hospital), is an exterior location, is an interior location;

a first device is in proximity to (e.g., within no more than some predetermined maximum distance of) a second device, such as any other device, or another device associated with a user satisfying predetermined criteria (such as a user who is a friend, family member, colleague, or within the same online social network as the user associated with the first device);

a device is moving at a speed that is greater than or less than a predetermined maximum or minimum speed, respectively;

a device's acceleration is greater than or less than a predetermined maximum or minimum speed, respectively;

a current activity of a user: is a communicative activity (e.g., composing, sending, receiving, viewing, or reading a message), is a particular category of activity (e.g., home, work, leisure, study), includes providing any input to a device, or includes providing input to a device using a particular kind of input device (e.g., microphone, keyboard, or touchscreen);

a calendar indicates that: the current time is within an appointment on the calendar, an appointment on the calendar is scheduled to begin no more than some predetermined amount of time later than the current time (e.g., 1 minute, 5 minutes, 30 minutes, 1 hour, 4 hours, or 1 day), an appointment on the calendar was scheduled to begin no more than some predetermined amount of time earlier than the current time (e.g., 1 minute, 5 minutes, 30 minutes, 1 hour, 4 hours, or 1 day), or an appointment on the calendar was scheduled to end no more than some predetermined amount of time earlier than the current time (e.g., 1 minute, 5 minutes, 30 minutes, 1 hour, 4 hours, or 1 day);

user input indicates that: an activation state of a component (e.g., profile or logic module) should be changed, a timer should be started or stopped, a timer should have a specified duration, The items on the list above correspond to the context sensors 206*a-i*, but omit the user input sensor 206*j* because user input may contribute to or override any condition. For example, input received from a user may override the time sensor 206*a* by manually specifying a time other than the current time, in which case the context controller 204 may treat the time specified by the user as the current time instead of the time otherwise sensed by the time sensor 206*a*. As another example, the user may manually specify a location other than the user's actual current location, in which case the context controller 204 may treat the location specified by the user as the current location instead of the location otherwise sensed by the location sensor 206*f*.

As described above, any aspect of context data 202 may satisfy the condition specified by a logic module. In the particular example of FIG. 5, each logic module specifies at least one condition that is satisfied by a message transmissible via a particular communication mode. A message that satisfies such a condition is referred to below as a "triggering message." Action specifiers, such as action specifiers 510*a-c* in FIG. 5, may, for example, specify actions such as the following:

Block. Blocking a message may include any one or more of the following: preventing the message from being sent, placed in an output queue to be sent, provided to a software component adapted to send messages, created, edited, manifested, received, or downloaded. Blocking a message may include any one or more of the following: preventing a notification of the message from being generated, transmitted, or manifested.

Allow. Allowing a message may include, for example, not taking any action in connection with the message. As a result, associating an "allow" action type with a particular communication mode may have the same effect as deactivating the logic module whose condition is satisfied by messages transmissible via the communication mode, and may be implemented using the same techniques as deactivating the logic module whose condition is satisfied by messages transmissible via the communication mode. The effect of applying an "allow" action to a particular message may be that the message is acted upon (e.g., by a system external to the message control system 100) in a manner that is the same as or equivalent to the manner in which the message would have been acted upon if the message control system 100 were not present.

Forward. Forwarding a message may, for example, include transmitting the message to a new destination (e.g., user or device) that differs from the original destination of the message. The new destination may, for example, be explicitly specified by the action specifier, or be derived from a rule (e.g., "forward messages addressed to a recipient to that recipient's administrative assistant"). Optionally, forwarding a message may also include blocking the message. For example, forwarding an email message originally transmitted to a first user may include blocking the email message from being received by the first user and transmitting the email message to a second user.

Defer. Deferring a message may, for example, include blocking the message until a timer elapses or until a predetermined criterion is satisfied (e.g., until a predetermined time occurs) and then allowing the message. Deferral, therefore, is equivalent to and may be implemented using the same techniques as blocking followed by allowing. The deferral period may, for example, be explicitly specified by the action specifier or be derived by a process from the current context (e.g., "on weekdays, defer personal messages until 5 pm").

Change mode. Changing the mode of a message may, for example, include transmitting a message using a new mode that differs from the original mode by which the message was transmitted. For example, a message that was received at an email server using an email protocol may be transmitted to the recipient user or device using a text messaging protocol, either instead of or in addition to transmitting the message to the recipient user or device using an email messaging protocol. As this example illustrates, changing the mode of a message may include blocking the message. Changing the mode of a message may be implemented using the same techniques as forwarding a message but with the mode of the message changed.

Change contents. Changing the contents of a message may, for example, include modifying the contents of the message to produce a modified message and transmitting the modified message, either instead of or in addition to the original message. For example, an error message containing a numerical error code may be modified to include an English-language description that is easier for the recipient user to understand. Changing the contents of a message may be implemented using similar techniques to changing the mode of a message.

Respond. Responding to an original message may include sending a response message to the original message, either via the same or different communication mode from the original message. Optionally, responding to an original message may include blocking or deferring the original message. The contents of the response may, for example, be specified explicitly by the action specifier, or be derived by a process from the current context (e.g., "I am in a scheduled meeting until 4:00 pm and cannot respond to your email message until at least 4:15 pm").

Any of the types of actions listed above may, for example, include: (1) performing the action on a particular triggering message in response to detection of the triggering message; or (2) initiating performance of the action on current and future messages (e.g., messages transmissible via the same communication mode as the triggering message, or transmissible via communication modes that differ from the communication mode of the triggering messages) until a future time (e.g., until the elapse of a timer, until a predetermined time occurs, or until some other condition is satisfied).

Although some of the examples of actions described herein are actions that are applied to messages, this is not a limitation of the present invention. An action may be applied to an object other than a message. Examples of actions include, but are not limited to:

launching, logging into, exiting, or logging out of one or more applications, web sites, or accounts;

opening or closing files;

opening, displaying, closing, hiding, enabling, disabling, changing the display order of (e.g., bringing to the front or sending to the back), or changing the opacity, transparency, color, or emphasis of any one or more GUI elements (e.g., windows, menus, dialog boxes, taskbars, or buttons);

changing the state of a device, such as by turning on, shutting off, or changing the volume, brightness, contrast, or volume of a device;

enabling or disabling input devices (such as keyboards, mice, touchpads, touchscreens, microphones, or network adapters) or output devices (such as monitors, screens, speakers, printers, or network adapters).

An action specifier (such as any of the action specifiers 510*a-c*) may specify not only an action to perform but also the object of the action (i.e., the object to which the action is to be applied). The action specifier may, for example, include an object specifier (not shown) that specifies the object of the action. The object specifier may specify the object(s) of the action using a "condition" as that term is used herein, in which case the object(s) of the action may be selected as the object(s) that satisfy the condition.

If an action specifier does not specify an object of the action, then the object of the action may be identified in other ways, such as by identifying a default object or an object specified by another action specifier. For example, in various embodiments disclosed herein, the object of an action may be identified as the message that satisfied the condition that triggered the action and/or messages transmissible via the same communication mode as the triggering message.

Certain actions may be particularly useful to perform in connection with particular communication modes, such as:

Voice calls. For incoming calls: turning off the telephone ringer, changing (e.g., lowering) the ringer volume, changing the ring type (e.g., to vibrate or alarm), changing the ring tone (e.g., from a musical tone to a beeping or ringing tone), forwarding incoming calls directly to voicemail so that the telephone does not ring, putting the caller on hold, and disabling manifestation of notification of incoming voice calls. For outgoing calls: preventing the user from initiating outgoing calls (e.g., by disabling the dial pad, touchscreen, and/or other input means on the telephone) and queuing outgoing calls so that the user's speech is recorded and queued to be sent but deferred until outgoing voice calls are activated, at which point the outgoing call is automatically made and the user's recorded speech is transmitted on the call.

Email messages. For incoming email messages: preventing downloading of incoming email messages (or headers or other indications of incoming email messages) from an email server to an email client (optionally even if the user provides a manual instruction to download email, and optionally even if the email client is otherwise scheduled to download incoming email), allowing downloading of incoming email messages from the email server but preventing storing of the email messages in the recipient's email inbox, allowing downloading of incoming email messages from the email server and storing them in a folder within the recipient's email inbox, allowing incoming email messages to be added to the recipient's email inbox but preventing manifestation of a notification of such messages, preventing the user's inbox (or the bodies of messages contained in the inbox) from being manifested, preventing the user from issuing a command to receive email (such as by disabling a "send/receive" button), and exiting from (i.e., terminating) one or more email clients. For outgoing email, preventing new email messages from being created, edited, sent, and/or queued to be sent; in response to queuing of an outgoing email message to be sent, deferring sending of the email message (e.g., until blocking of sending email is deactivated); and exiting from (e.g., terminating) one or more email clients.

The ability of modern computing and communication devices to multitask (i.e., to engage in multiple tasks simultaneously or apparently simultaneously) can be beneficial, but can also reduce the efficiency of the devices' users at achieving desired results. To address this problem, certain embodiments of the present invention enforce unitasking (the performance of only one task at a time) on devices that otherwise are capable of multitasking.

For example, referring to FIG. 7, a diagram is shown of a system 700 including a plurality of devices 702*a-c*. Such devices 702*a-c* may include any of the components disclosed herein, but are only illustrated to contain certain components for ease of illustration. In particular, device 702*a* includes a communication mode module 704*a* which is capable of transmitting messages via a first communication mode, a communication mode module 706*a* which is capable of transmitting messages via a second communication mode, and a communication mode module 708*a* which is capable of transmitting messages via a third communication mode. No two of the first, second, and third communication modes are the same as each other.

Device 702*b* includes a communication mode module 704*b* which is capable of transmitting messages via the first communication mode and a communication mode module 706*b* which is capable of transmitting messages via the second communication mode. Device 702*c* includes a communication mode module 708*c* which is capable of transmitting messages with the third communication mode. The first, second, and third communication modes may, for example, be email, text messaging, and voice call communication modes.

The particular number and combination of devices, communication modes, and communication mode modules shown in FIG. 7 is merely an example and not a limitation of the present invention. For example, the system 700 may include fewer or greater than three communication devices (e.g., one or two communication devices). Furthermore, the number of communication modes represented by the communication mode modules in the system 700*c* may be any number greater than or equal to two. The particular distribution of communication mode modules among the devices 702*a*-*c* is also merely an example.

Each of communication mode modules 704*a*-*b*, 706*a*-*b*, 708*a*, and 708*c* may, for example, be hardware, a computer program, or any combination thereof. For example, an email communication mode module may include any combination of one or more of the following: email client software, one or more input devices for receiving email input (e.g., keyboard or touchscreen), one or more output devices for providing email output (e.g., monitor, touchscreen, or speakers), and one or more network communication devices (e.g., wired or wireless network card).

Multiple communication mode modules within a single device may be capable of executing in parallel with each other or substantially in parallel with each other (e.g., by utilizing multi-tasking capabilities of the device). For example, communication mode modules 704*a*, 706*a*, and 708*a* may be capable of executing in parallel with each other on device 702*a*, so that they can perform their communication mode-related functions in parallel with each other.

The system 700 also includes a system profile 710 that is associated with all of the devices 702*a*-*c*. The system profile 710 includes at least two logic modules; three such logic modules 712*a*-*c* are shown in FIG. 7 for purposes of example. Although the logic modules 712*a*-*c* may specify any conditions and any actions, a particular set of conditions and actions will now be described that may be used to enforce communication mode unitasking on and/or across the devices 702*a*-*c*. The term "communication mode unitasking" refers herein to engaging in (e.g., composing, reading, or transmitting) communication of messages transmissible via only one communication mode at any particular time. For example, the system 700*c* may prevent users of the system 700*c* from: (1) engaging in text messaging or voice call communication while engaged in email communication; (2) engaging in email communication or text messaging communication while engaged in voice call communication; and (3) engaging in voice call communication or email communication while engaged in text messaging communication. The system 700 may allow the user to switch from unitasking in connection with a first communication mode to unitasking in connection with a second communication mode; this is referred to here as "sequential communication mode unitasking."

Communication mode unitasking may, for example, be implemented by configuring any two or more of logic modules 712*a*-*c* as follows: (1) the conditions 714*a* of logic module 712*a* are satisfied by detection of an email message; (2) the action 716*a* of logic module 712*a* blocks text messages and voice calls; (3) the conditions 714*b* of logic module 712*b* are satisfied by detection of a voice call; (4) the action 716*b* of logic module 712*b* blocks email messages and text messages; (5) the conditions 714*c* of logic module 712*c* are satisfied by the detection of a text message; and (6) the action 716*c* of logic module 712*c* blocks email messages and voice calls.

Figure 8A:
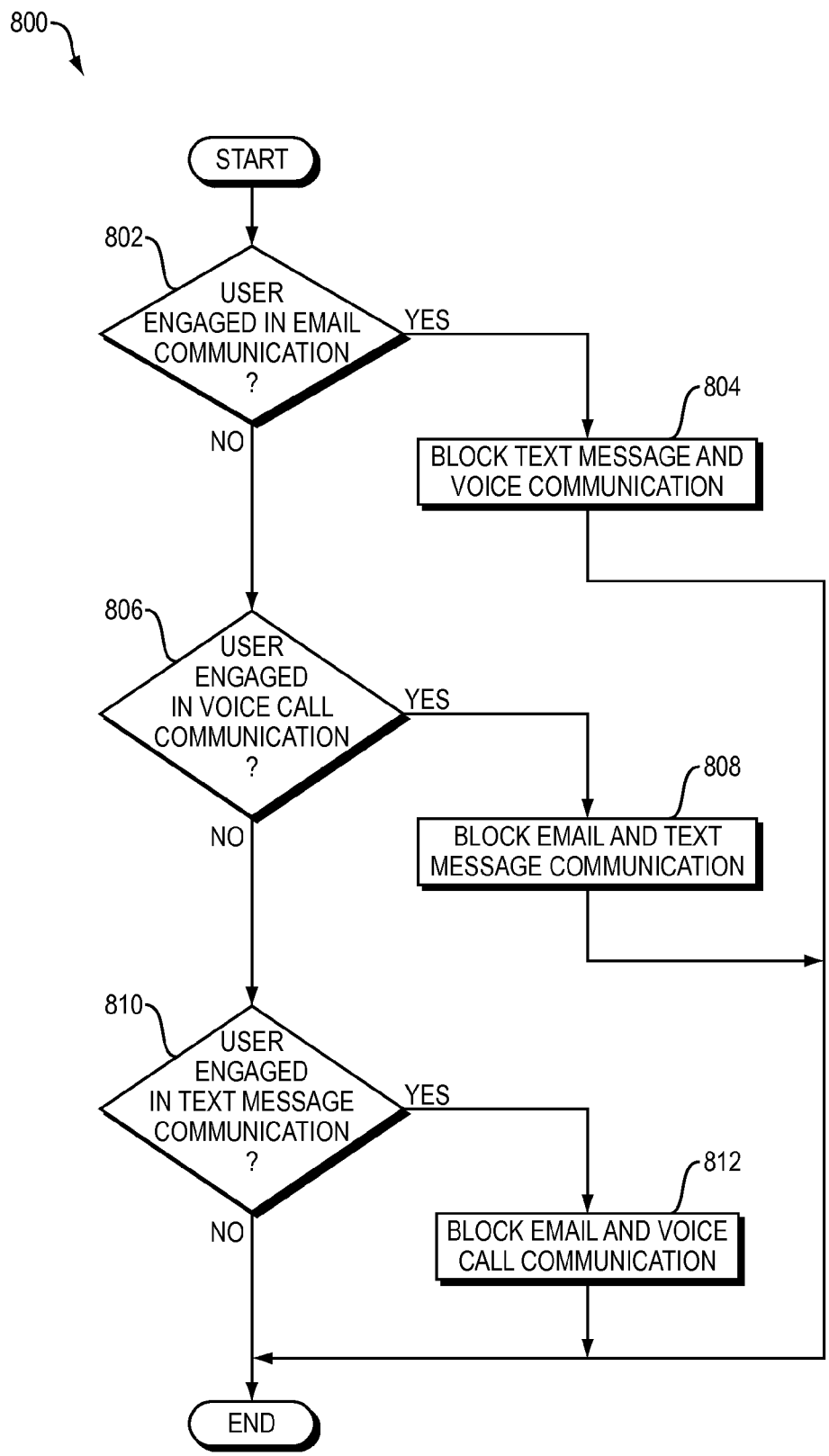
FIG. 8A is a flowchart of a method performed by the system of FIG. 7A according to one embodiment of the present invention.

An effect of implementing the system 700 is illustrated by the method 800 of FIG. 8, which may be performed by the system 700 by applying the techniques disclosed herein. The method 800 determines whether any of the devices 702*a*-*c* associated with the system profile 710 is engaged in email communication (operation 802), such as by analyzing the context data 202 to detect whether any of the devices 702*a*-*c* is composing, manifesting, or transmitting an email message. If any of the devices 702*a*-*c* is engaged in email communication, then the method 800 blocks text message communication and voice call communication on all of the devices 702*a*-*c* (operation 804).

The method 800 determines whether any of the devices 702*a*-*c* associated with the system profile 710 is engaged in voice communication (operation 806). If any of the devices 702*a*-*c* is engaged in voice communication, then the method 800 blocks email communication and text message communication on all of the devices 702*a*-*c* (operation 808). Finally, the method 800 determines whether any of the devices 702*a*-*c* associated with the system profile 710 is engaged in text message communication (operation 810). If any of the devices 702*a*-*c* is engaged in text message communication, then the method 800 blocks email communication and voice call communication on all of the devices 702*a*-*c* (operation 812).

The system 700 may block messages transmissible via a particular communication mode by, for example, performing any one or more of the following in connection with the communication mode module(s) in the system 700 that are capable of transmitting messages via the particular communication mode (the "blocked communication mode modules"): (1) disabling or shutting down the blocked communication mode modules; (2) intercepting incoming messages addressed to the blocked communication mode modules and preventing the intercepted messages from being provided to the blocked communication mode modules; (3) intercepting outgoing messages attempted to be sent by the blocked communication mode modules and preventing the intercepted messages from being provided to their intended destinations; (4) preventing the blocked communication mode modules from being used to compose messages of the corresponding communication mode; and (5) preventing the blocked communication mode modules from manifesting messages of the corresponding communication mode.

The blocking of a communication mode performed by FIG. 7 in method 800 may, but need not, include blocking of all messages transmissible via the communication mode, or blocking of all activities performed in connection with messages transmissible via the communication mode. For example, such blocking may include only blocking of incoming messages, only blocking of outgoing messages, only blocking of composing of messages, or only blocking of manifesting messages.

The blocking of a communication mode performed by FIG. 7 in method 800 may continue until manually discontinued in response to user input, or until the context data 202 satisfies some predetermined condition (such as the lapse of a timer). For example, a user of the devices 702*a*-*c* may engage in communication of a first communication mode (e.g., email)

and thereby cause the system 700 to block communications of the remaining communication modes (e.g., text message and voice calls). The system 700 may block incoming communications of the blocked communication modes unless and until the user of the devices 702a-c engages in activity related to one of the blocked communication modes, such as composing a message transmissible by one of the blocked communication modes or viewing an inbox of messages transmissible by one of the blocked communication modes. The system 700 may detect such activity by the user and treat it as an input to method 800, i.e., as an indication that the user now wants to unitask in the newly-engaged communication mode. In response, the system 700 may allow messages transmissible via the new communication mode but block messages transmissible via the remaining communication modes. In this way, the user may engage in sequential unitasking with a minimum of effort.

As another example, the system 700 may not allow the user to manually discontinue unitasking in connection with a particular communication mode. Instead, the system 700 may be configured only to discontinue unitasking entirely, or to discontinue unitasking in connection with one communication mode and initiate unitasking in connection with another communication mode, in response to satisfaction of a predetermined condition by the context data 202, where the predetermined condition is not based on user input (or at least that the predetermined condition is not based on user input provided by the user at or around the time at which the system 700 determines whether the predetermined condition is satisfied). In such an embodiment, the system 700 may or may not allow the user to effectively discontinue unitasking by changing the activation state of the system profile 710 and/or of other profiles in the system 700.

As another example, the actions defined by logic modules 712a-c may be "change mode" rather than block. As a result, in response to detecting that the user is engaged in email communication, the system 700 may perform a "change mode to email" action in connection with any messages transmissible via other communication modes (e.g., text messaging and voice calls) that the system 700 detects while the system 700 is unitasking in connection with email. Any incoming text messages received during this time may, therefore, be converted into email messages and delivered to the user's email inbox, and any incoming voice calls received during this time may, therefore be converted (using an automated speech recognition engine) into email messages and delivered to the user's email inbox (possibly in addition to storing a recording of the voice call as a voicemail message in the user's voicemail inbox). Similarly, in response to detecting that the user is engaged in live voice call communication, the system 700 may perform a "change mode to voice call" action in connection with any messages transmissible via other communication modes (e.g., text messaging and email) that the system 700 detects while the system 700 is unitasking in connection with live voice calls. Any incoming text messages or email messages received during this time may, therefore, be converted (using a text-to-speech engine) into live voice calls and/or voicemail messages that are delivered to the user. Similar techniques may be applied when the user is unitasking in connection with text messages.

Communication mode unitasking is merely one example of "enforced unitasking," as that term is used herein. Embodiments of the present invention may engage in enforced unitasking by limiting a system (e.g., a computing device or software) to performing only a subset of the set of tasks that the system inherently is capable of performing. The subset may include one, two, three, or any number of tasks fewer than the total number of tasks that the system inherently is capable of performing.

Figure 7B:
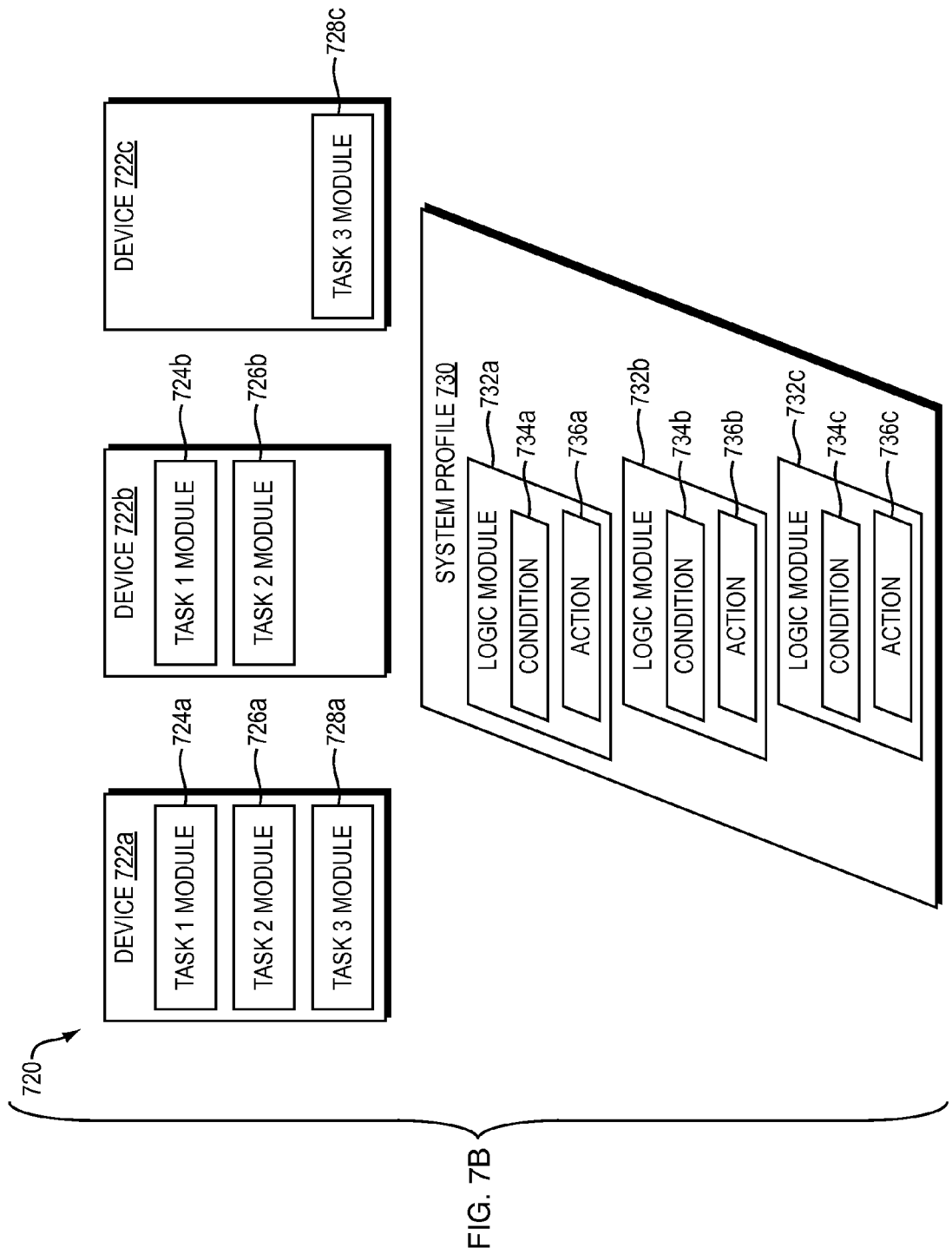
FIG. 7B is a diagram illustrating use of an embodiment of the present invention to enforce unitasking among one or more devices according to one embodiment of the present invention.

For example, referring to FIG. 7B, a diagram is shown of a system 720 including a plurality of computing devices 722a-c. Such devices 722a-c may include any of the components disclosed herein, but are only illustrated to contain certain components for ease of illustration. In particular, device 722a includes a first task module 724a which is capable of performing a first task, a second task module 726a which is capable of performing a second task, and a third task module 728a which is capable of performing a third task. No two of the first, second, and third tasks are the same as each other.

Device 722b includes a first task mode module 724b which is capable of performing the first task and a second task mode module 726b which is capable of performing the second task. Device 722c includes a third task module 728c which is capable of performing the third task.

The particular number and combination of devices and task modules shown in FIG. 7B is merely an example and not a limitation of the present invention. For example, the system 720 may include fewer or greater than three computing devices (e.g., one or two computing devices). Furthermore, the number of tasks represented by the task modules in the system 700 may be any number greater than or equal to two. The particular distribution of task modules among the devices 722a-c is also merely an example.

Each of task modules 724a-b, 726a-b, 728a, and 728c may, for example, contain or otherwise be associated with one or more hardware components, one or more computer programs, or any combination thereof. In other words, a particular task module may contain or otherwise be associated with any combination of hardware and/or software components for performing the particular task associated with the task module. A component of a task module need not be a standalone product. Rather, for example, a component of a task module may be a component or subset of a product. For example, if task module 724a is associated with the task of transmitting email messages, then task module 724a may include: (1) a computer program for transmitting email; and (2) an email client component of a web browser. Although task modules 724a, 724b, and 724c are associated with distinct tasks, the contents of task modules 724a, 724b, and 724c may overlap with each other. For example, if task module 724a is associated with the task of transmitting email messages and task module 724b is associated with the task of creating appointments on a calendar, then task modules 724a and 724b may contain (or otherwise be associated with) a computer program that includes both means for transmitting email messages and means for creating calendar appointments.

Multiple task modules within a single device may be capable of executing in parallel with each other or substantially in parallel with each other (e.g., by utilizing multitasking capabilities of the device). For example, task modules 724a, 726a, and 728a may be capable of executing in parallel with each other on device 722a, so that they can perform their respective tasks in parallel with each other.

The term "task," as that term is used herein, may refer, for example, to any one or more of the following:
  transmitting or attempting to transmit any message (e.g., sending a message and/or receiving a message), or transmitting or attempting to transmit a message that satisfies a particular condition;
  manifesting or attempting to manifest a message or a notification of a message;

creating a new message or attempting to create a new message;

editing an existing message or attempting to edit an existing message;

using a particular device for any purpose, or using a device to perform a task that satisfies a particular condition;

using a particular component (e.g., a particular input component or a particular output component) of a device for any purpose, or using a component of a device to perform a task that satisfies a particular condition;

using a particular application for any purpose, or using a particular application to perform a task that satisfies a particular condition;

using a particular user interface element for any purpose, or using a particular user interface element to perform a task that satisfies a particular condition.

The system 720 also includes a system profile 730 that is associated with all of the devices 722*a-c*. The system profile 730 includes at least two logic modules; three such logic modules 732*a-c* are shown in FIG. 7B for purposes of example. Although the logic modules 732*a-c* may specify any conditions and any actions, a particular set of conditions and actions will now be described that may be used to enforce unitasking on and/or across the devices 722*a-c*. In particular, the system 720 may prevent users of the system 720 from: (1) performing the second and third tasks (i.e., the tasks associated with task modules 726*a* and 728*b*, respectively) while performing the first task (i.e., the task associated with task module 704*a*); (2) performing the first and third tasks (i.e., the tasks associated with task modules 704*a* and 708*a*, respectively) while performing the second task (i.e., the task associated with task module 706*a*); and (3) performing the first and second tasks (i.e., the tasks associated with task modules 704*a* and 706*a*, respectively) while performing the third task (i.e., the task associated with task module 708*a*). The system 720 may allow the user to switch from unitasking in connection with one task to unitasking in connection with another task; this is referred to here as "sequential enforced unitasking."

Sequential enforced unitasking may, for example, be implemented by configuring any two or more of logic modules 732*a-c* as follows: (1) the condition 734*a* of logic module 732*a* is satisfied by detecting that any of the devices 722*a-c* is performing the first task; (2) the action 736*a* of logic module 732*a* prevents devices 702*a-c* from performing either or both of the second and third tasks (such as by disabling and/or reconfiguring task modules 706*a*, 708*a*, 706*b*, and 708*c*); (3) the condition 734*b* of logic module 732*b* is satisfied by detecting that any of the devices 722*a-c* is performing the second task; (4) the action 736*b* of logic module 732*b* prevents devices 702*a-c* from performing either or both of the first and third tasks (such as by disabling and/or reconfiguring task modules 704*a*, 708*a*, 704*b*, and 708*c*); (5) the condition 734*c* of logic module 732*c* is satisfied by detecting that any of the devices 722*a-c* is performing the third task; and (6) the action 736*c* of logic module 732*c* prevents devices 702*a-c* from performing either or both of the first and second tasks (such as by disabling and/or reconfiguring task modules 704*a*, 706*a*, 704*b*, and 706*b*).

Figure 8B:
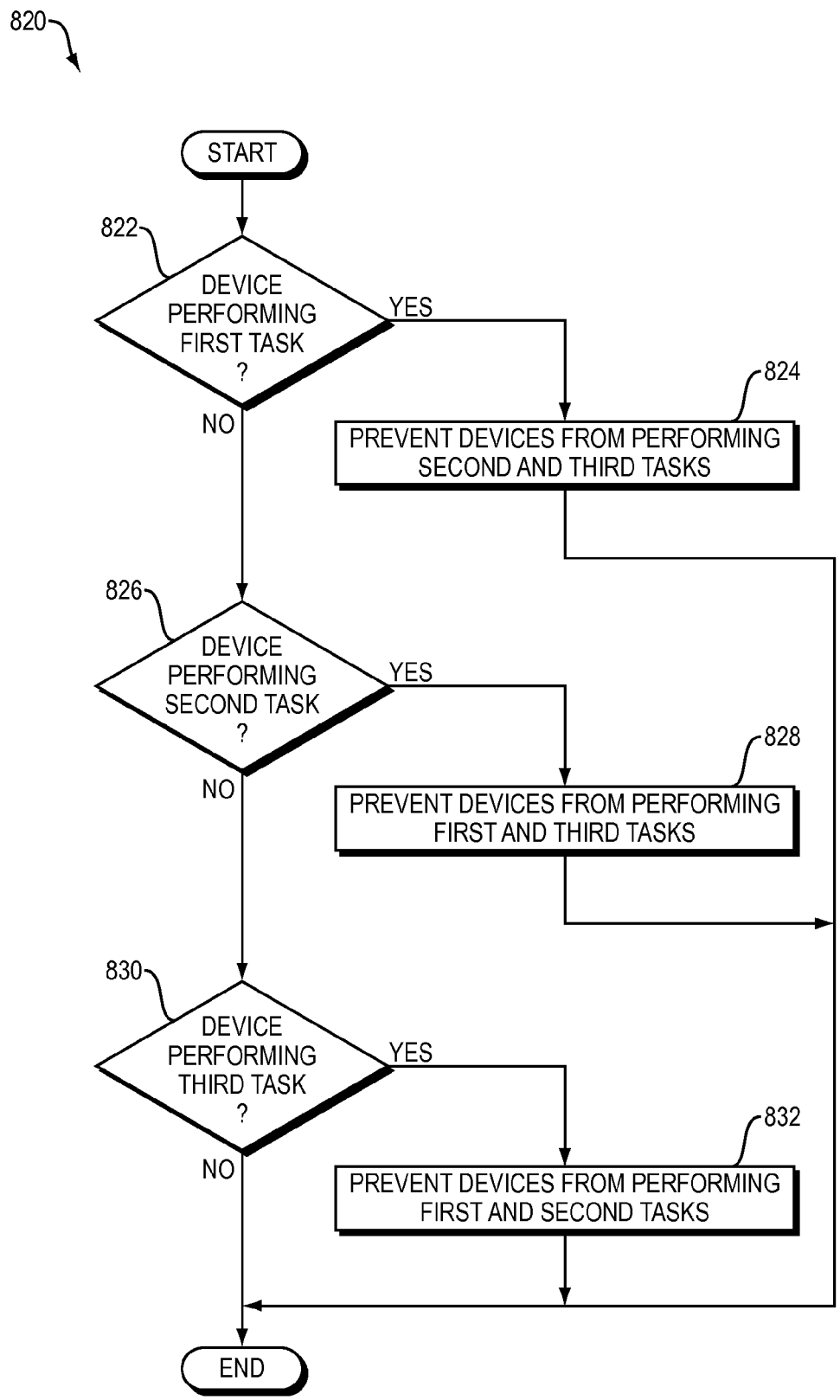
FIG. 8B is a flowchart of a method performed by the system of FIG. 7B according to one embodiment of the present invention.

An effect of implementing the system 720 is illustrated by the method 820 of FIG. 8B, which may be performed by the system 720 by applying the techniques disclosed herein. The method 820 determines whether any of the devices 722*a-c* associated with the system profile 730 is performing the first task (operation 822), such as by analyzing the context data 202 to detect whether any of the devices 722*a-c* is performing the first task. If any of the devices 722*a-c* is performing the first task, then the method 820 prevents the devices 722*a-c* from performing the second or third tasks (operation 824).

The method 820 determines whether any of the devices 722*a-c* associated with the system profile 730 is performing the second task (operation 826), such as by analyzing the context data 202 to detect whether any of the devices 722*a-c* is performing the second task. If any of the devices 722*a-c* is performing the second task, then the method 820 prevents the devices 722*a-c* from performing the first or third tasks (operation 828).

The method 820 determines whether any of the devices 722*a-c* associated with the system profile 730 is performing the third task (operation 830), such as by analyzing the context data 202 to detect whether any of the devices 722*a-c* is performing the third task. If any of the devices 722*a-c* is performing the third task, then the method 820 prevents the devices 722*a-c* from performing the first or second tasks (operation 832).

Once the method 800 of FIG. 8B has begun to prevent one or more tasks from being performed, the method 800 may continue to prevent such tasks from being performed until such prevention is discontinued by the method 800 in response to input provided manually by a user, or until the context data 202 satisfies some predetermined condition (such as the lapse of a timer, a change in location, or a change in speed).

As another example, the system 720 may not allow the user to manually discontinue unitasking in connection with a particular task. Instead, the system 720 may be configured only to discontinue unitasking entirely, or to discontinue unitasking in connection with one task and initiate unitasking in connection with another task, in response to satisfaction of a predetermined condition by the context data 202, where the predetermined condition is not based on user input (or at least that the predetermined condition is not based on user input provided by the user at or around the time at which the system 720 determines whether the predetermined condition is satisfied). In such an embodiment, the system 720 may or may not allow the user to effectively discontinue unitasking by changing the activation state of the system profile 730 and/or of other profiles in the system 720.

In the embodiment illustrated by FIGS. 7B and 8B, detection of the performance of a single task within a set of tasks causes the performance of all other tasks in the set to be prevented. This is merely one example and does not constitute a limitation of the present invention. Alternatively, for example, the detection of the performance of any one or more tasks may cause any one or more other tasks to be prevented. For example, referring to FIG. 7C, a diagram is shown of a plurality of unitasking specifiers 740*a-c*, each of which specifies one or more tasks to be prevented in response to detection of the performance of one or more other tasks.

More specifically, unitasking specifier 740*a* includes a triggering task list 742*a*, which specifies the task(s) that trigger the unitasking specifier 740*a*, and a prevented task list 746*a*, which specifies the task(s) that are prevented from being performed when the unitasking specifier 740*a* is triggered. In particular, the triggering task list 742*a* includes a single triggering task specifier 744*a*, which may specify any task. Furthermore, the prevented task list 746*a* includes three prevented task specifiers 748*a-c*, which may specify any three distinct tasks. The method 820 of FIG. 8B may be generalized so that operation 822 determines whether any of the devices 722*a-c* is performing any of the tasks specified by the triggering task list 746*a*, and so that operation 824 prevents the devices 722*a-c* from performing any of the tasks specified by the prevented task list 746*a*.

Unitasking specifier 740b includes a triggering task list 742b and a prevented task list 746b. In particular, the triggering task list 742b includes a first triggering task specifier 754a and a second triggering task specifier 754b, which may specify any two distinct tasks. Furthermore, the prevented task list 746b includes three prevented task specifiers 758a-c, which may specify any three distinct tasks. The method 820 of FIG. 8B may be generalized so that operations 826 and 828 apply to the triggering task list 742b and the prevented task list 746b, respectively.

Finally, unitasking specifier 740c includes a triggering task list 742c and a prevented task list 746c. In particular, the triggering task list 742c includes a first triggering task specifier 764a and a second triggering task specifier 764b, which may specify any two distinct tasks. Furthermore, the prevented task list 746b includes a single prevented task specifier 768a, which may specify any task. The method 820 of FIG. 8B may be generalized so that operations 830 and 832 apply to the triggering task list 742c and the prevented task list 746c, respectively.

As the examples in FIG. 7C illustrate, there may be a one-to-one, one-to-many, many-to-one, or many-to-many relationship between the tasks in the triggering task list of a unitasking specifier and the tasks in the prevented task list of that unitasking specifier. Furthermore, the triggering task list and the prevented task list of a particular unitasking specifier may be disjoint; in other words, the triggering task list may contain no tasks that are in the prevented task list, and the prevented task list may contain no tasks that are in the triggering task list.

Furthermore, the union of the triggering task list and the prevented task list of a particular unitasking specifier may specify fewer than all of the tasks that a particular one of the devices 722a-c in the system 720 (or the set of devices 722a-c in the system) is capable of performing. For example, the union of triggering task list 742a and prevented task list 746a may specify a set of tasks that does not include the task associated with task modules 728a and 728c in FIG. 7B. As a result, when the system 720 applies the unitasking specifier 740 to prevent the tasks specified by the prevented task list 746a from being performed by the devices 722a-c, such prevention may not include preventing task modules 728a and 728c from performing their associated task. As a result, task modules 728a and 728c may continue to perform their associated task even while the system 720 and method 820 prevent task modules 724a, 726a, 724b, and 726b from performing their respective tasks.

Unitasking-based features of embodiments disclosed herein may be used in connection with any other embodiments disclosed herein. Unitasking-based features of embodiments disclosed herein may, however, be used independently of various features disclosed herein. For example, unitasking-based features of embodiments disclosed herein may be used in connection with profiles or without the use of profiles.

Figure 9A:
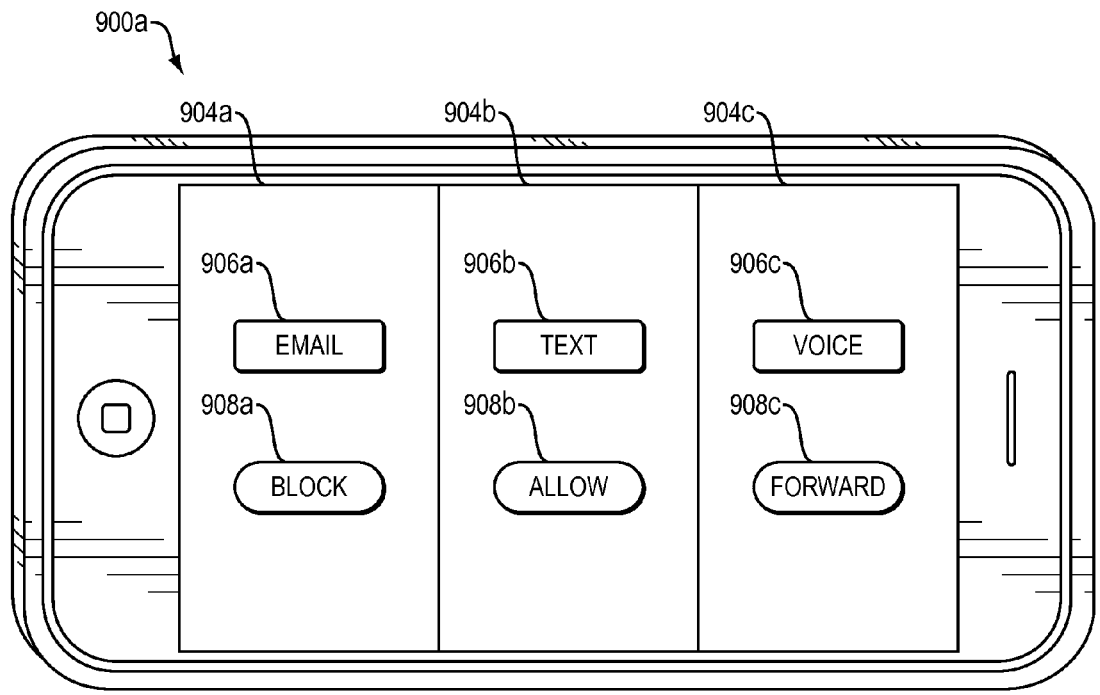
FIGS. 9A-9D are illustrations of user interfaces for interacting with profiles and logic modules according to one embodiment of the present invention.

Referring FIG. 9A, an example of a user interface 900a representing a particular profile (e.g., the system profile 710 in FIG. 7) is shown. This and other users interfaces disclosed herein are merely examples and not limitations of the present invention. The user interface 900a includes a first mode section 904a representing a first logic module (e.g., logic module 712a) having a first condition that is satisfied by a first communication mode; a second mode section 904b representing a second logic module (e.g., logic module 712b) having a second condition that is satisfied by a second communication mode; and a third mode section 904c representing a third logic module (e.g., logic module 712c) having a third condition that is satisfied by a third communication mode. In the example of FIG. 9A, the three communication modes are email, text messaging, and voice calls. In particular:

the first mode section 904a includes: (1) a mode identification element 906a indicating the mode that satisfies the condition specified by condition specifier 714a; and (2) a manifestation of the first mode action represented by the first mode action specifier 716a, namely an element 908a in the form of a circle containing the word "block";

the second mode section 904b includes: (1) a mode identification element 906b indicating the mode that satisfies the condition specified by condition specifier 714b; and (2) a manifestation of the first mode action represented by the first mode action specifier 716b, namely an element 908b in the form of a circle containing the word "allow"; and the third mode section 904c includes: (1) a mode identification element 906c indicating the mode that satisfies the condition specified by condition specifier 714c; and (2) a manifestation of the first mode action represented by the first mode action specifier 716c, namely an element 908c in the form of a circle containing the word "forward."

The user interface 900a, therefore, represents the contents of the corresponding profile at a particular time. The user interface 900a may also be used to receive user input for modifying the contents of the corresponding profile. In other words, the user interface 900a may be a mechanism for receiving, from a user, input to provide to a profile controller and thereby to cause the profile controller to modify the contents of the profile based on the input, as disclosed above in connection with FIGS. 1G and 3B.

For example, the user may provide input through the user interface 900a to modify the first condition specifier 714a by:

editing the text of the first mode identification element 906a to specify a communication mode that differs from the communication mode currently specified by the first mode specifier 906a (e.g., by editing the text "Email" to read "Fax");

selecting the first mode identification element 906a, thereby causing a drop-down list of available communication modes to be displayed, and by then selecting an alternate communication mode (e.g., "Fax") from the list; or selecting (e.g., clicking on) the first mode identification element 906a one or more times, thereby causing labels of available communication modes (e.g., "Email," "Text," "Voice," "Fax") to be manifested sequentially in response to each selection, until a label of the communication mode desired by the user is manifested.

Similarly, the user may, for example, provide input to the user interface 900a to modify the first action specifier 716a by:

selecting the first mode action element 908a, thereby causing a drop-down list of available actions (e.g., "Block," "Allow," "Forward," and "Defer") to be displayed, and then selecting an alternate action (e.g., "Allow") from the list; or selecting (e.g., clicking on) the first mode action element 908a one or more times, thereby causing labels of available actions (e.g., "Allow," "Forward," "Defer," and "Block") to be manifested sequentially in response to each selection, until a label of the action desired by the user is manifested.

Figure 9B:
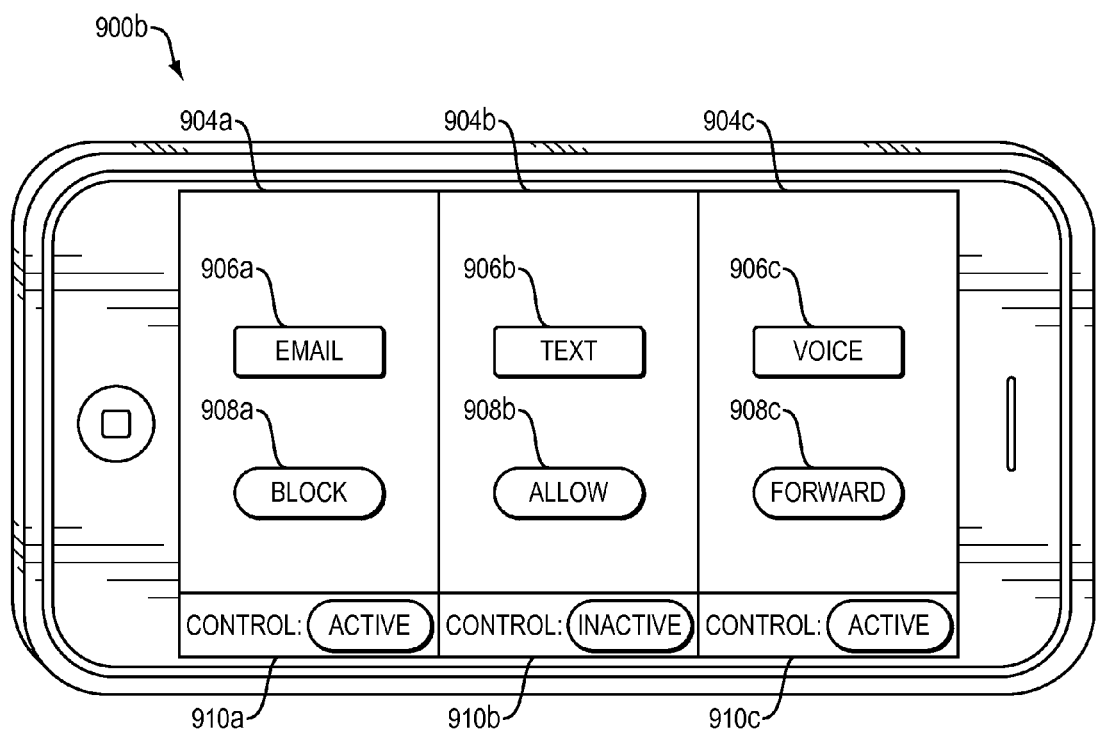

If individual logic modules in a profile have activation states (as in the case of FIG. 5B), such a profile may be manifested by the user interface 900b of FIG. 9B. The user interface 900b of FIG. 9B is similar to the user interface 900a of FIG. 9A, except that the user interface 900b of FIG. 9B includes first mode activation element 910a, which manifests an activation state of its corresponding logic module; second mode activation element 910b, which manifests an activation state of its corresponding logic module; and third mode activation element 910c, which manifests an activation state of its corresponding logic module. To modify the activation states of the first corresponding logic module, the user may select (e.g., click on) first mode activation element 910a, in response to which the corresponding logic module controller may toggle the value of the corresponding activation state specifier from its current value (e.g., "active") to its alternate value (e.g., "inactive").

Figure 9C:
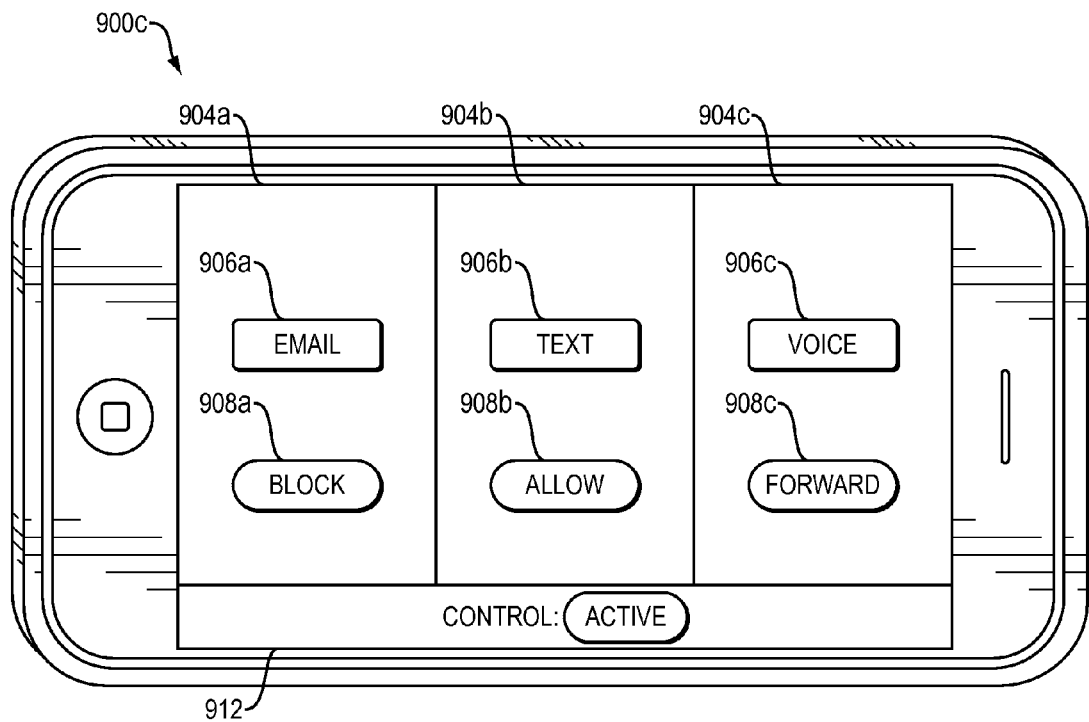

If a profile has an activation state (as in the case of FIG. 5C), such a profile may be manifested by the user interface 900c of FIG. 9C, which is similar to the user interface 900a of FIG. 9A, except that the user interface 200c of FIG. 9C further includes a profile activation element 912, which manifests the activation state of the corresponding profile. To modify the activation state of the corresponding profile, the user may select (e.g., click on) profile activation element 910c, in response to which the corresponding profile controller may toggle the value of the corresponding activation state specifier from its current value (e.g., "active") to its alternate value (e.g., "inactive").

Figure 9D:
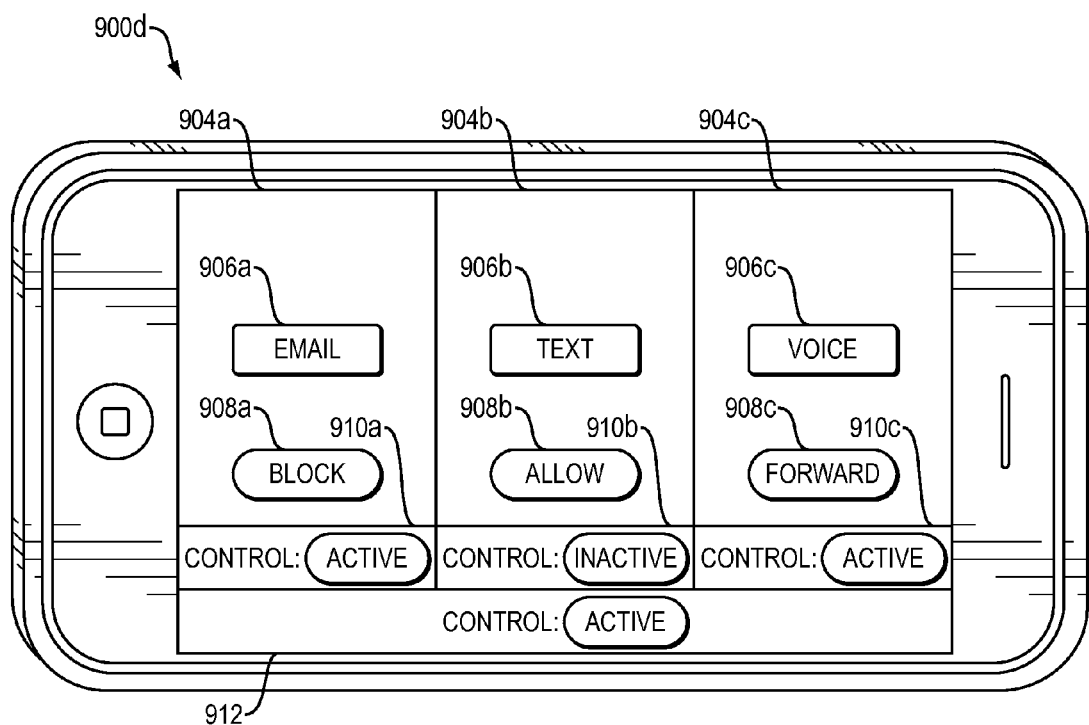

If both a profile and its associated logic modules have activation states (as in the case of FIG. 5D), such a profile and associated logic modules may be manifested by the user interface 900d of FIG. 9D, which combines elements of the user interfaces 900b (FIG. 9B) and 900c (FIG. 9C).

As another example, distinct profiles may have names or other unique identifiers, such as "work," "home," and "school," or "weekday" and "weekend." Embodiments of the present invention may provide user interfaces that enable a user to select a particular profile and thereby make the selected profile the active profile by selecting the profile's name, such as by selecting the name from a list or speaking the name of the profile. Such a user interface may also allow the user to select and activate/deactivate a profile by issuing a single command, such as "activate work" or "deactivate home." As yet another example, a user interface may enable a user to either deactivate all profiles or select a particular profile as the active profile by issuing a single command, e.g., by speaking a single word or phrase, or by selecting a single word or phrase from a list, where an example of such a list is: "Disable," "Home," "Work," and "Car." In this example, selecting "Disable" causes all profiles (e.g., all profiles, or all system, device, or user profiles) to be disabled, while selecting any one of "Home," "Work," and "Car" causes a corresponding profile to be selected as the active profile.

As another example, user interfaces may enable the user to select logic modules and/or to configure logic modules without the use of profiles. For example, a user interface may enable a user to select a particular combination of two or more logic profiles, such as by selecting such profiles from a list, where an example of such a list is: "Disable," "Email: Block, Text: Allow, Voice: Forward," "Email: Allow, Text: Allow: Voice: Block," and "Email: Forward, Text: Forward, Voice: Forward." In this example, selecting "Disable" causes all logic modules (e.g., all logic modules associated with a system, device, or user) to be disabled, while selecting any other entry from the list causes a corresponding combination of logic modules to be selected as the current logic modules.

Any of the techniques disclosed herein may be implemented, for example, as: (1) standalone components (e.g., hardware and/or computer programs), which may or may not interoperate with existing components (e.g., existing computing devices, existing messaging software); (2) plug-ins to existing components; or (3) integral modifications to existing components. Implementing plug-in embodiments may, for example, include installing the plug-in to the existing component using a plug-in interface provided by the existing component. Embodiments that are not implemented as integral modifications to existing components may, for example:

implement actions such as blocking messages by performing one or more of the following: (1) intercepting messages (and other input) addressed to such components and preventing such input from reaching such components; (2) intercepting messages (and other output) generated by such components and preventing such output from reaching its designated destination; (3) disabling or enabling such components, or sub-components thereof; and (4) modifying the configurations of such components, such as by using API calls; and implement actions such as allowing messages by performing one or more of the following: (1) intercepting messages (and other input) addressed to such components and forwarding such input to such components; (2) intercepting messages (and other output) generated by such components and forward such output to its designated destination; (3) enabling such components, or sub-components thereof, and then not intercepting input addressed to or output generated by such components; and (4) modifying the configurations of such components, such as by using API calls.

Embodiments of the present invention may respond in a variety of ways to changes in the activation states of profiles and logic modules. For example, if a logic module is inactive and then becomes active, the techniques disclosed herein may begin to apply the logic module to the context data 202. For example, if the condition specified by the logic module is satisfied by a particular class of messages, then the techniques disclosed herein may begin to perform the action specified by the logic module in response to detection of messages in the particular class.

It may, however, be desirable to take additional actions, or to modify the actions performed by the logic module, in anticipation of a future transition of the logic module from active to inactive. For example, if the action specified by the logic module is "block," then it may be desirable, upon a transition of the logic module from active to inactive, to "unblock" any messages that were blocked by the logic module while it was active. Such a result may be achieved by, for example, implementing a "block" action as a "defer" action, where the condition that terminates the "defer" action is the transition of the logic module from active to inactive. The "defer" action may, for example, store deferred messages in a deferral queue. Upon transition of the logic module from active to inactive, messages in the deferral queue may, for example, be delivered to their designated destination. For example, incoming messages that were prevented from being inserted into an inbox by the "defer" action may be inserted into the inbox upon transition of the logic module from active to inactive, and outgoing messages that were prevented from being transmitted to their destinations may be transmitted to their destinations upon transition of the logic module from active to inactive. More generally, in response to transition of a logic module from active to inactive, any actions that were prevented from being performed by the logic module while the logic module was active may be performed.

The same techniques may be applied in connection with changes in the activation state of a profile (e.g., a system, device, or user profile) that is associated with the logic module, assuming that the logic module is active. In other words, if a logic module is active, then the transition of a profile associated with the logic module from inactive to active may be implemented in the same way as a transition of the logic module from inactive to active, and the transition of the profile from active to inactive may be implemented in the same way as a transition of the logic module from active to inactive.

As another example, when a logic module (or associated profile) transitions from inactive to active, the state of components (such as email clients, instant messaging clients, web browsers, VoIP clients, desktop computers, laptop computers, smartphones, and tablet computers) that may be affected by the actions of the logic module may be stored. In particular, any state that is modified in response to a transition of a logic module from inactive to active may be saved before that state is modified. For example, when a logic module transitions from inactive to active, techniques disclosed herein may save the current ringer volume of a telephone before changing the ringer volume. In response to a transition of the logic module from active to inactive, such saved state may be restored to the system from which the state was saved, such as by restoring the telephone ringer volume to its saved state. As another example, when a logic module transitions from inactive to active, techniques disclosed herein may terminate an email client if the logic module specifies that transmission of email messages is to be blocked. In response to a transition of the logic module from active to inactive, such saved state may be restored by launching the email client that was terminated.

Examples of state that may be saved in response to a transition of a logic module or profile from inactive to active, and restored in response to a transition of a communication mode profile from active to inactive, include but are not limited to: ringer volume, ringer tone, automatic forwarding of voice calls to voicemail, enabled/disabled state of user interface elements (e.g., buttons, menus, and menu items), email send/receive schedule, enabled/disabled state of automatic email sending/receiving, and manifestation of receipt of messages.

As used herein, "manifesting" data refers to providing output, to a user, that represents such data. Such output may take any form, such as a visual form and/or an auditory form. For example, such output may include any one or more of the following in any combination: text, graphics, images, video, and audio. As this description makes clear, any output described herein as being "manifested," may, for example, solely include text, solely include graphics, solely include video, or solely include audio.

Having described message control profiles in general, techniques will next be described for using message control profiles to control transmission, reception, and notification of messages. First, however, the meaning of the term "communication mode" as used herein will be described.

In general, the "communication mode" of a particular message refers to any feature(s) of the method by which the message is transmitted (sent and/or received). A particular message having a particular communication mode is transmissible via the particular communication mode. For example, a message may be transmissible via a communication mode because the message is formatted in a manner that makes the message adapted for transmission via the communication mode (e.g., formatted according to a protocol for transmitting messages via the communication mode). If a message actually is transmitted via a communication mode, then the message necessarily is transmissible via the communication mode. A message need not, however, actually be transmitted via a communication mode to be transmissible via that communication mode. For example, a message that is formatted according to a protocol for transmitting messages via the communication mode is transmissible via the communication mode even if the message is deleted or otherwise blocked from being transmitted via the communication mode.

Terms such as "transmit" and "transmission" as applied to messages herein include sending and/or receiving messages. For example, "transmitting a message" includes solely sending a message, solely receiving a message, and both sending and receiving a message. Similarly, "transmitting messages" includes solely sending messages, solely receiving messages, and a combination of sending some messages and receiving other messages. Transmitting a message may include transmitting a message from one communication device to another over a network and/or transmitting a message within one communication device, e.g., from one application executing on the communication device to another application executing on the communication device.

The following examples of communication modes are exemplary and not exhaustive.

A communication mode may be defined by reference to one or more categories of message transmission. For example, the following categories are examples of communication modes: email, text message, live voice call, fax, and voice message. Because such modes are categories, a single mode may include, for example:

messages transmitted via multiple different messaging protocols (e.g., IMAP and POP3 in the case of email messages);
messages sent and messages received;
messages transmitted by multiple applications; and
messages transmitted by multiple devices.

Therefore, for example, if the communication mode specified by a particular communication mode profile is an "email" communication mode and the action associated with that communication mode profile is "block," then the message control system may apply that communication mode profile by blocking all email messages, regardless of the protocol by which they are transmitted (or attempted to be transmitted), regardless of whether they are sent or received, regardless of the application by which they are transmitted, and regardless of the device by which they are transmitted.

As another example, a communication mode may be defined by reference to one or more messaging protocols. For example, the IMAP email protocol is an example of a communication mode. Therefore, if the communication mode specified by a particular communication mode profile is "IMAP email," then the action specified by that communication mode profile will be performed only in connection with email received using the IMAP email protocol, and not, for example, email received using other email protocols. Messaging protocols that may define communication modes according to embodiments of the present invention include any messaging protocols at any layer of the OSI (Open Systems Interconnection) seven-layer model. Examples of messaging protocols that may define communication modes according to embodiments of the present invention include, but are not limited to, Ethernet, GFP (Generic Framing Procedure), OTN (Optical Transport Network), IP (Internet Protocol), TCP (Transmission Control Protocol), UDP (User Datagram Protocol), HTTP (Hypertext Transfer Protocol), IMAP (Internet Message Access Protocol), IRC (Internet Relay Chat), POP3 (Post Office Protocol Version 3), and SMTP (Simple Mail Transfer Protocol), VoIP (Voice over Internet Protocol).

As another example, a communication mode may be defined by reference to one or more messaging services, such as SMS (Short Message Service), MMS (Multimedia Messaging Service), and EMS (Enhanced Messaging Service).

As another example, a communication mode may be defined by reference to a direction of transmission (i.e., send or receive). For example, if the communication mode specified by a particular communication mode profile is "receive," then the action specified by that communication mode profile will be performed in connection with received messages but not in connection with sent messages. Note that, for example, such a "receive" communication mode may include messages in multiple categories (e.g., email messages, text messages, and voice calls), transmitted using multiple protocols, and transmitted using multiple devices.

As another example, a communication mode may be defined by reference to one or more communication accounts. For example, messages transmissible via a first email account may be transmissible via a first communication mode, messages transmissible via a second email account may be transmissible via a second communication mode, and messages transmissible via a first text messaging account may be transmissible via a third communication mode.

As another example, a communication mode may be defined by reference to one or more types of message content, such as any of the following: text, image, video, and audio. Such content types may be further divided. For example, audio content may be divided into voice and non-voice content, each of which may define a separate mode.

Similarly, a communication mode may be defined by reference to one or more types of content manifestation, by which is meant the type of content that is used to manifest a particular message. For example, a voice call that is manifested by playing the audio through a speaker is manifested using an "audio" type of content. Similarly, a text message that is converted into speech by a text-to-speech engine is also manifested using an "audio" type of content, even though the text message itself has a "text" type of content.

Similarly, a communication mode may be defined by reference to the application that generated, sent, received, and/or manifested a message. For example, a communication mode may be defined by reference to one or more named applications (e.g., Microsoft Outlook, Mozilla FireFox, Facebook), one or more application types (e.g., email client, web browser, text messaging client), and/or the installation/execution location of the application (e.g., installed locally on the user's computer or installed and executing remotely, such as in the case of cloud-based applications, such as Facebook and Twitter). The definition of such a communication mode may encompass any one or more of generating, sending, receiving, and manifesting messages. For example, a communication mode may be defined to include messages generated, sent, received, and manifested by a particular named application (e.g., Microsoft Outlook), or only to include messages received by such an application but not to messages generated, sent, or manifested by such an application.

Any of the characteristics of communication modes described above may be combined with each other in any way. For example, a communication mode may be defined by reference to a message category (e.g., email) and transmission direction (e.g., receive) to define a communication mode that encompasses "received email."

The description herein refers to "detecting" a message. Such detection may include, for example, any one or more of the following: detection of an instruction to send the message, detection of an attempt to send the message, detection of the message in the process of being sent, detection that the message has been sent, detection of a scheduled time to send the message, detection of an instruction to receive the message, detection of an attempt to receive the message, detection of the message in the process of being received, detection that the message has been received, and detection of a scheduled time to receive the message.

A "communication device" may be any device that is capable of performing any one or more of the following functions: transmitting messages, receiving messages, and providing notifications of messages. Examples of communication devices include desktop computers, laptop computers, tablet computers, cellular telephones (including smartphones), and personal digital assistants (PDAs), and combinations thereof.

Embodiments of the present invention may be applied to messages, notifications of messages, or both. A notification of a message is any output derived from a message that is intended to provide information about the message. For example, when an email client displays the subject line of an email message but not the remainder of the email message, the displayed subject line is an example of a notification of the email message. In this example, the notification is output to a user, but this is not required. Instead, for example, a notification may be transmitted between two computing devices or two computer programs. A notification of a message may contain some or all of the content of the message. A notification of a message may contain information that is derived from, but not contained within the content of the message. A notification may be manifested in any of the ways disclosed herein. Any of the actions disclosed herein may be performed on notifications. A notification may itself be a message.

Embodiments of the present invention have a variety of advantages. For example, conventional out of office assistants and other auto-responders typically respond to all messages, or to no messages, regardless of the current context of the recipient. Although some auto-responders provide the ability to send responses only during a particular period of time manually specified by the user, such limited configurability imposes significant restrictions on the ability of users to rely on such auto-responders to decide whether to respond automatically to messages in accordance with the users' preferences. As a result, recipients must manually turn such auto-responders on and off as necessary to enable such auto-responders to send automatic responses when such responses are desired to be sent and not when such responses are not desired to be sent. Requiring such extensive manual activation and de-activation by users can result in failing to send auto-responses when desired (e.g., if the user forgets to turn on the auto-responder when needed) and in sending auto-responses when not desired (e.g., if the user forgets to turn off the auto-responder when not needed). As a result, conventional auto-responders typically are used and are useful only for sending automatic responses during relatively long, contiguous blocks of time, such as entire days or weeklong vacations, but are not used or suitable for sending automatic responses only during short periods of time, particularly when such periods of time are not planned by the user in advance.

In contrast, embodiments of the present invention may be used to automatically send auto-responses when, and only when, the recipient's current context satisfies a predetermined condition, such as a predetermined condition specified in advance by the recipient. Such a condition may, for example, specify that auto-responses are to be sent whenever the recipient is in an appointment scheduled on the recipient's calendar, whenever the recipient is not in the recipient's office (as may be determined, for example, using a GPS module in the recipient's smart phone to identify the recipient's current location automatically and in real-time), whenever the recipient is driving or otherwise traveling (as may be determined, for example, using a GPS module in the recipient's smart phone to identify the recipient's current velocity and to conclude in real-time that the recipient is driving or otherwise traveling if the recipient's currently velocity is greater than some predetermined minimum threshold, e.g., ten miles per hour). Embodiments of the present invention may use such conditions to dynamically and automatically decide whether to send responses automatically to any particular message transmitted to the recipient based on the recipient's current context at the time of receipt of the message. As a result, embodiments of the present invention may achieve an effect that is similar to turning a conventional auto-responder on and off automatically over time in response to changes in the recipient's context over time, in a way that reflects the user's expressed preferences, and without requiring the user to turn the auto-responder on and off manually. This feature of embodiments of the present invention enables users to obtain the benefits of an auto-responder (such as the ability to acknowledge receipt of messages and to set the expectations of the senders of such messages promptly and respectfully) in a much wider range of circumstances than with conventional auto-responders, with less effort on the part of users, and in a way that may result in fewer false positives (i.e., sending auto-responses when such responses are not desired by the recipient) and fewer false negatives (i.e., not sending auto-responses when such responses are desired by the recipient) than conventional auto-responders.

As another example, when conventional out of office assistants and other auto-responders send automatic responses, they typically send the same automatic response to all senders. Microsoft Outlook has the ability to send one message to senders within the recipient's organization and another message to recipients outside the recipient's organization. Otherwise, however, Outlook lacks the ability to send different auto-response messages based on the current context of the recipient. Such limited configurability imposes significant restrictions on the ability of users to provide informative and helpful auto-response messages. For example, most users configure Outlook with a generic auto-response message informing senders that the recipient is out of the office and will respond to messages upon returning to the office, or perhaps that the recipient will check messages at some specified frequency (e.g., once per day) while out of the office. Such auto-response messages provide senders with only generic information about the reason for the recipient's absence and the time at which the sender should expect to receive a response from the recipient. As a result, senders may resort to sending multiple copies of the same message to the recipient during the recipient's absence, and possibly to contacting the recipient via multiple communication modes (e.g., email, text message, and voice message) during the recipient's absence due to the sender's uncertainty about the time at which the recipient will respond to the sender.

In contrast, embodiments of the present invention may be used to automatically tailor the content of an auto-response message sent in response to a particular incoming message based on the context of the recipient at the time when the incoming message is received or otherwise detected. For example, if the incoming message is received while the recipient is in a meeting (as indicated by a scheduled appointment in the recipient's calendar), embodiments of the present invention may automatically generate and send to the sender a response message which: (1) informs the sender that the recipient currently is in a meeting, (2) informs the sender of the scheduled end time of the meeting; and (3) notifies the sender that the recipient will not be able to respond to the sender until at least the scheduled end time of the meeting. If, after conclusion of such a meeting, the recipient enters another scheduled meeting and receives another message during the other scheduled meeting, embodiments of the present invention may automatically respond to such a message with a response message which differs from the previous response message, such as by including the end time of the new meeting, without requiring the user to take any action to change the auto-response message based on the new context.

As a result, embodiments of the present invention may be used to reduce or eliminate the uncertainty and unease felt by senders of messages who receive no responses to such messages or who receive only generic auto-responses to such messages by providing such senders with information about the recipient's context at the time the senders' messages are received by the recipients. In this way, embodiments of the present invention may be used not only to provide auto-responses that are more informative to and respectful of senders, but also to reduce the number of redundant messages sent by senders to recipients, by providing senders with a concrete expectation of the time at which (or at least not before which) they should expect to receive a response from the recipient. Embodiments of the present invention may also reduce some of the pressure on recipients to respond immediately to incoming messages, by providing recipients with the knowledge that the expectations of the senders of such messages have been influenced with respect to the time at which they should expect to receive responses.

As another example, embodiments of the present invention may be used to perform actions, such as blocking messages, during particular predetermined times specified by a user, such as times corresponding to appointments on the user's calendar. The actions may be designed to eliminate or reduce distractions to the user. Because the user may specify such times in advance of the occurrence of such times (such as by scheduling appointments on the user's calendar in advance of the occurrence of such times), the user may engage in activities during such times free of undesired distractions without needing to take any further action. In other words, embodiments of the present invention may automatically perform the distraction-limiting actions previously specified by the user at the times previously specified by the user, thereby freeing the user from such distractions during the previously-specified times, freeing the user from the need to manually activate desired distraction-limiting features upon the onset of the previously-specified times, and freeing the user from the need to manually deactivate the desired distraction-limiting features upon the conclusion of the previously-specified times.

Another advantage of embodiments of the present invention is that they may be used to "time shift" the transmission (e.g., receiving or sending) of messages to or from a user. For example, embodiments of the present invention may be used to defer the receipt of email messages by a user during a particular appointment on the user's calendar. In such a situation, during the appointment an embodiment of the present invention may receive incoming email messages addressed to the user but prevent such messages from being delivered to the user and/or prevent notifications of such messages from being provided to the user, such as by holding such messages in a queue other than the user's email inbox and/or by suppressing notifications of such messages. Then, upon the conclusion of the appointment, the embodiment of the present invention may provide the held messages to the user and/or notify the user of such messages, such as by inserting such messages into the user's email inbox and/or by providing notifications of such messages to the user. As a result, the messages and corresponding notifications are provided to the user, but at times of the user's choosing, which may differ from the times at which the messages and their corresponding notifications would have been provided to the user if the messages were not held initially. In other words, the reception time of such messages is shifted.

One benefit of time-shifting embodiments of the present invention is that, unlike existing systems for blocking messages, the time-shifting embodiments do not necessarily prevent messages from being received or sent by the user. Instead, they may merely change the time at which such messages are transmitted to/from the user and/or provided to the user. This differs from, for example, anti-spam systems which either delete incoming spam messages or move incoming spam messages into a queue other than the user's inbox. Such systems never move spam messages back into the user's inbox because the user does not desire to receive such messages. Time-shifting embodiments of the present invention, in contrast, may initially move messages into a queue other than the user's inbox but subsequently move such message into the user's inbox because the user may desire to receive such messages, only not at the time desired by the messages' senders. Time-shifting embodiments of the present invention may, therefore, shift control over the time of message receipt and/or notification from the sender to the recipient of messages, and thereby enabling the recipient to handle such messages more efficiently than by attending to them at the times dictated by their senders.

Time-shifting embodiments of the present invention may simply defer messages until a later time, such as a time during which the user has no scheduled appointments. Time-shifting embodiments of the present invention may, however, perform more complex operations on time-shifted messages. For example, embodiments of the present invention may both time-shift and time-sort messages. As one example, assume that any particular message may have a high priority, a medium priority, or a low priority. Next, consider a stream of incoming messages having the following priorities: low, low, medium, high, medium, high, low, medium, high. Assume that an embodiment of the present invention receives such a message stream while a user is in a scheduled appointment, and that the embodiment therefore defers such messages while the user is in the appointment. Upon conclusion of the appointment, the embodiment may provide the three high-priority messages (but not any of the low-priority or medium-priority messages) to the user during a first time window (e.g., of 10 minutes); then provide the three medium-priority messages (but not any of the low-priority messages) to the user during a second time window (e.g., of 10 minutes); and then provide the three low-priority messages to the user. This example, which may be implemented using logic of the kind described above, is an example in which messages are both time-shifted and time-sorted, where a set of messages is "time sorted" by re-arranging the temporal sequence in which the messages in the set are transmitted or provided, or in which notifications of the messages are provided, in accordance with one or more sort criteria. As a result of time sorting a set of messages, the messages may be transmitted or provided, or notifications of the messages may be provided, in a different temporal sequence than the temporal sequence originally intended.

The ability of modern computing devices to engage in multitasking has a variety of benefits. For example, the user of a multitasking device can use that device to perform multiple tasks, without the need to purchase or use multiple devices. The ability of a device to multitask, however, can generate interruptions and other distractions that can decrease the user's productivity in connection with the activity in which the user currently is engaged. One benefit of embodiments of the present invention is that they enable the user to focus on one activity at a time, free from interruptions and other distractions. Such embodiments may, therefore, increase the user's productivity.

Embodiments of the present invention need not, however, limit the user to using a multitasking device to perform only one task. Instead, embodiments of the present invention may limit the user to using the multitasking device to perform only one task at a time, while still allowing the user to switch from one task to another over time. As a result, the user may still obtain the benefit of a single device that is capable of performing multiple tasks by using such a device to perform those tasks sequentially. While the user is using the device to perform any particular task as part of an activity in which the user is engaged, the user may remain focused on that activity, even if the user subsequently uses the device to perform a different task.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more non-transitory computer-readable media, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Terms such as "computer," "computing device," and "communication device," as used herein refer, for example, to desktop computers, laptop computers, cellular telephones and smartphones, personal digital assistants (PDAs), and tablet computers.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by at least one computer processor, the method comprising:
   (A) detecting a first incoming message, wherein the first incoming message is associated with a first sender and a first recipient;
   (B) identifying first context data associated with the first recipient at a first time;
   (C) determining whether a first condition is satisfied by the first context data;
   (D) if the first condition is determined to be satisfied by the first context data, then:
      (D)(1) selecting a first response message based on the first context data;
      (D)(2) sending the first response message to the first sender; and
      (D)(3) blocking a notification of the first incoming message;
   (E) detecting a second incoming message, wherein the second incoming message is associated with the first sender and the first recipient;
   (F) identifying second context data associated with the first recipient at a second time, wherein the second context data differs from the first context data;
   (G) determining whether the first condition is satisfied by the second context data;
   (H) if the first condition is determined to be satisfied by the second context data, then:
      (H)(1) selecting a second response message based on the second context data, wherein the first response message differs from the second response message; and
      (H)(2) sending the second response message to the first sender;
   wherein (D)(1) comprises selecting the first response message independently of content of the first incoming message; and
   wherein (H)(1) comprises selecting the second response message independently of content of the second incoming message.

2. The method of claim 1, wherein (D)(1) comprises generating the first response message based on the first context data.

3. The method of claim 1, wherein (D) (1) comprises:
   (D) (1) (a) before (A), receiving response template data including: (a) fixed content specification data; and (2) variable content specification data;
   (D) (1) (b) after (B), generating the first response message based on the first context data, comprising:
      (D) (1) (b) (i) including, in the first response message, data derived from the fixed content specification data independently of the first context data; and
      (D) (1) (b) (ii) including, in the first response message, data derived from the variable content specification and the first context data.

4. The method of claim 1, wherein (D)(1) comprises selecting the first response message based on the first time.

5. The method of claim 1, wherein (D)(1) comprises selecting the first response message based on an appointment associated with the first recipient.

6. The method of claim 1, wherein (D) (1) comprises:
   (D) (1) (a) identifying a first task performed by a device associated with the first recipient at the first time; and
   (D)(1)(b) selecting the first response message based on the first task.

7. The method of claim 1:
   wherein (A) comprises detecting a first incoming message transmitted via a first communication mode; and
   wherein (D)(2) comprises sending the first response message to the first sender via the first communication mode.

8. The method of claim 7, wherein (D) further comprises:
   (D)(4) generating a derived message based on the first incoming message; and
   (D) (5) transmitting the derived message to a second recipient via a second communication mode that differs from the first communication mode.

9. The method of claim 1:
   wherein (A) comprises detecting a first incoming message transmitted via a first communication mode; and
   wherein (D)(2) comprises sending the first response message to the first sender via a second communication mode that differs from the first communication mode.

10. The method of claim 1, wherein (D) further comprises:
    preventing transmission of the first incoming message to a device associated with the first recipient; and
    after preventing transmission of the first incoming message to the device associated with the first recipient, allowing transmission of the first incoming message to the device associated with the first recipient in response to determining that the first condition is not satisfied by the second context data.

11. The method of claim 1, wherein blocking the notification of the first incoming message comprises:
    preventing the notification of the first incoming message from being manifested.

12. The method of claim 11, further comprising:
    (I) after preventing the notification of the first incoming message from being manifested, allowing the notification of the first incoming message to be manifested in response to determining that the first condition is not satisfied by the second context data.

13. The method of claim 12, wherein allowing the notification of the first incoming message to be manifested comprises allowing the notification of the first incoming to be manifested in response to determining that the first condition is not satisfied by the second context data.

14. The method of claim 11, wherein detecting the first incoming message comprises receiving the first incoming message before (D)(3).

15. The method of claim 11, further comprising:
(I) before (D)(3), receiving the notification of the first incoming message.

16. The method of claim 1, wherein (D) further comprises:
(D)(4) forwarding the first incoming message to a second recipient.

17. The method of claim 1:
wherein (A) comprises detecting transmission of the first incoming message via a first communication mode; and
wherein the method further comprises:
(I) generating a derived message from the first incoming message; and
(J) transmitting the derived message to the first recipient via a second communication mode that differs from the first communication mode.

18. A non-transitory computer-readable medium comprising computer program instructions tangibly stored on the non-transitory computer-readable medium, wherein the instructions are executable by at least one computer processor to perform a method comprising:
(A) detecting a first incoming message, wherein the first incoming message is associated with a first sender and a first recipient;
(B) identifying first context data associated with the first recipient at a first time;
(C) determining whether a first condition is satisfied by the first context data;
(D) if the first condition is determined to be satisfied by the first context data, then:
(D)(1) selecting a first response message based on the first context data;
(D)(2) sending the first response message to the first sender; and
(D)(3) blocking a notification of the first incoming message;
(E) detecting a second incoming message, wherein the second incoming message is associated with the first sender and the first recipient;
(F) identifying second context data associated with the first recipient at a second time, wherein the second context data differs from the first context data;
(G) determining whether the first condition is satisfied by the second context data;
(H) if the first condition is determined to be satisfied by the second context data, then:
(H)(1) selecting a second response message based on the second context data, wherein the first response message differs from the second response message; and
(H)(2) sending the second response message to the first sender;
wherein (D)(1) comprises selecting the first response message independently of content of the first incoming message; and
wherein (H)(1) comprises selecting the second response message independently of content of the second incoming message.

19. The non-transitory computer-readable medium of claim 18, wherein (D)(1) comprises generating the first response message based on the first context data.

20. The non-transitory computer-readable medium of claim 18, wherein (D)(1) comprises:
(D) (1) (a) before (A), receiving response template data including: (a) fixed content specification data; and (2) variable content specification data;
(D) (1) (b) after (B), generating the first response message based on the first context data, comprising:
(D) (1) (b) (i) including, in the first response message, data derived from the fixed content specification data independently of the first context data; and
(D) (1) (b) (ii) including, in the first response message, data derived from the variable content specification and the first context data.

21. The non-transitory computer-readable medium of claim 18, wherein (D)(1) comprises selecting the first response message based on the first time.

22. The non-transitory computer-readable medium of claim 18, wherein (D)() comprises selecting the first response message based on an appointment associated with the first recipient.

23. The non-transitory computer-readable medium of claim 18, wherein (D)(1) comprises:
(D) (1) (a) identifying a first task performed by a device associated with the first recipient at the first time; and
(D)(1)(b) selecting the first response message based on the first task.

24. The non-transitory computer-readable medium of claim 18:
wherein (A) comprises detecting a first incoming message transmitted via a first communication mode; and
wherein (D)(2) comprises sending the first response message to the first sender via the first communication mode.

25. The non-transitory computer-readable medium of claim 24, wherein (D) further comprises:
(D)(4) generating a derived message based on the first incoming message; and
(D) (5) transmitting the derived message to a second recipient via a second communication mode that differs from the first communication mode.

26. The non-transitory computer-readable medium of claim 18:
wherein (A) comprises detecting a first incoming message transmitted via a first communication mode; and
wherein (D)(2) comprises sending the first response message to the first sender via a second communication mode that differs from the first communication mode.

27. The non-transitory computer-readable medium of claim 18, wherein (D) further comprises:
preventing transmission of the first incoming message to a device associated with the first recipient; and
after preventing transmission of the first incoming message to the device associated with the first recipient, allowing transmission of the first incoming message to the device associated with the first recipient in response to determining that the first condition is not satisfied by the second context data.

28. The non-transitory computer-readable medium of claim 18, wherein blocking the notification of the first incoming message comprises:
preventing the notification of the first incoming message from being manifested.

29. The non-transitory computer-readable medium of claim 28, wherein detecting the first incoming message comprises receiving the first incoming message before (D)(3).

30. The non-transitory computer-readable medium of claim 28, wherein the method further comprises:
(I) before (D)(3), receiving the notification of the first incoming message.

31. The non-transitory computer-readable medium of claim 18, further comprising:
(I) after preventing the notification of the first incoming message from being manifested, allowing the notification of the first incoming message to be manifested in response to determining that the first condition is not satisfied by the second context data.

32. The non-transitory computer-readable medium of claim 31, wherein allowing the notification of the first incoming message to be manifested comprises allowing the notification of the first incoming to be manifested in response to determining that the first condition is not satisfied by the second context data.

33. The non-transitory computer-readable medium of claim 18, wherein (D) further comprises:
- (D)(4) forwarding the first incoming message to a second recipient.

34. The non-transitory computer-readable medium of claim 18:
- wherein (A) comprises detecting transmission of the first incoming message via a first communication mode; and
- wherein the method further comprises:
- (I) generating a derived message from the first incoming message; and
- (J) transmitting the derived message to the first recipient via a second communication mode that differs from the first communication mode.

\* \* \* \* \*

UNITED STATES PATENT AND TRADEMARK OFFICE
CERTIFICATE OF CORRECTION

PATENT NO. : 9,065,786 B2
APPLICATION NO. : 13/709017
DATED : June 23, 2015
INVENTOR(S) : Plotkin Page 1 of 1

It is certified that error appears in the above-identified patent and that said Letters Patent is hereby corrected as shown below:

On the title page, item 73, under "Assignee", in Column 1, Line 1, delete "Barre, MA (US)" and insert -- Concord, MA (US) --, therefor.

In the drawings

In Fig. 4A, Sheet 11 of 28, for Tag "422", in Lines 1-2, delete "TRIGGER TRIGGER" and insert -- TRIGGER --, therefor.

In the claims

In Column 57, Line 4, in Claim 16, delete "16.. The" and insert -- 16. The --, therefor.

In Column 58, Line 12, in Claim 22, delete "(D)()" and insert -- (D)(1) --, therefor.

Signed and Sealed this
First Day of December, 2015

Michelle K. Lee
*Director of the United States Patent and Trademark Office*